(12) United States Patent
Fujimoto

(10) Patent No.: US 8,385,455 B2
(45) Date of Patent: Feb. 26, 2013

(54) MULTI-ANTENNA WIRELESS COMMUNICATION METHOD, MULTI-ANTENNA WIRELESS COMMUNICATION SYSTEM, AND MULTI-ANTENNA WIRELESS COMMUNICATION DEVICE

(75) Inventor: Atsushi Fujimoto, Tokyo (JP)

(73) Assignee: Iwatsu Electric Co., Ltd., Tokyo (JP)

( * ) Notice: Subject to any disclaimer, the term of this patent is extended or adjusted under 35 U.S.C. 154(b) by 193 days.

(21) Appl. No.: 13/058,402

(22) PCT Filed: Jul. 24, 2009

(86) PCT No.: PCT/JP2009/003497
§ 371 (c)(1),
(2), (4) Date: Feb. 10, 2011

(87) PCT Pub. No.: WO2010/018657
PCT Pub. Date: Feb. 18, 2010

(65) Prior Publication Data
US 2011/0150066 A1    Jun. 23, 2011

(30) Foreign Application Priority Data

Aug. 11, 2008  (JP) ................................ 2008-207341
Jun. 12, 2009  (JP) ................................ 2009-140897

(51) Int. Cl.
*H04B 7/02* (2006.01)
*H04L 1/02* (2006.01)
(52) U.S. Cl. .................... 375/267; 375/259; 375/260
(58) Field of Classification Search .................. 375/267
See application file for complete search history.

(56) References Cited

U.S. PATENT DOCUMENTS 6,173,190 B1    1/2001  Usui
(Continued)

FOREIGN PATENT DOCUMENTS

JP            10-178367 A        6/1998
(Continued)

OTHER PUBLICATIONS

Notification of Transmittal of Translation of the International Preliminary Report on Patentability (Form PCT/IB/338) of International Application No. PCT/JP20091003497 mailed Apr. 28, 2011 with Form PCT/IPEA/409.

(Continued)

*Primary Examiner* — Erin File
(74) *Attorney, Agent, or Firm* — Westerman, Hattori, Daniels & Adrian, LLP

(57) ABSTRACT

Wireless communication devices A and B perform wireless communication with the MIMO technology. The wireless communication devices A and B determine the optimal diversity combining information that optimizes a diversity reception state through a two-way training signal transfer. This determination can be made based on reception level information, baseband reception IQ information, correlation information between a diversity-combining received signal and a predetermined information sequence, or the like, which are obtained when the diversity combining information with respect to each antenna is sequentially changed. The optimal diversity combining information can be determined by receiving training frames or symbols (the number of antennas+1) times.

20 Claims, 33 Drawing Sheets

U.S. PATENT DOCUMENTS

| | | | |
|---|---|---|---|
| 6,850,741 B2* | 2/2005 | Lei et al. ................... 455/101 |
| 7,193,562 B2 | 3/2007 | Shtrom et al. |
| 7,676,007 B1* | 3/2010 | Choi et al. ................. 375/347 |
| 2004/0095907 A1* | 5/2004 | Agee et al. ................. 370/334 |
| 2004/0139897 A1 | 7/2004 | Nakaya et al. |
| 2005/0184906 A1 | 8/2005 | Nakaya et al. |
| 2006/0270343 A1 | 11/2006 | Cha et al. |
| 2007/0189412 A1 | 8/2007 | Xia et al. |
| 2008/0144733 A1* | 6/2008 | ElGamal et al. ........... 375/267 |
| 2008/0261522 A1* | 10/2008 | Dankberg et al. .......... 455/13.1 |
| 2009/0058724 A1 | 3/2009 | Xia et al. |
| 2009/0175243 A1* | 7/2009 | Han et al. ................... 370/335 |
| 2010/0246656 A1* | 9/2010 | Hammerschmidt ......... 375/229 |

FOREIGN PATENT DOCUMENTS

| | | |
|---|---|---|
| JP | 2002-076748 A | 3/2002 |
| JP | 2004-015179 A | 1/2004 |
| JP | 2004-221733 A | 8/2004 |
| JP | 2005-160030 A | 6/2005 |
| JP | 2005-244339 A | 9/2005 |
| JP | 2008-160532 A | 7/2008 |
| WO | 2006/110737 A2 | 10/2006 |
| WO | 2007/094633 A1 | 8/2007 |

OTHER PUBLICATIONS

Draft Standard for Information Technology—Telecommunications and Information exchange between systems—Local and metropolitan area networks—Specific requirements ( Part 11: Wireless LAN Medium Access Control (MAC) and Physical Layer (PHY) specifications:) Amendment 5: Enhancements for Higher Throughput; IEEE P802.11ntm/D5.0; May 2008; pp. 1-547.

"Air Interface for fixed and Mobile Broadband Wireless Access Systems" Amendment 2: Physical and Medium Access Control Layers for Combined Fixed and Mobile Operation in Licensed Bands; IEEE Standard 802.16eTM-2005 and IEE Standard 802.16TM-2004/Cor Jan. 2005; pp. 1-864.

"Propagation data and prediction methods for the planning of indoor radiocommunication systems and radio local area networks in frequency range 900MHz to 100 GHz"; Recommendation ITU-R P. 1238-2; pp. 1-15.

International Search Report of PCT/JP2009/003497, date of mailing Sep. 8, 2009.

Japanese Office Action dated Mar. 17, 2010, issued in corresponding Japanese Patent Application No. 2009-140897 ( With Partial Translation).

* cited by examiner

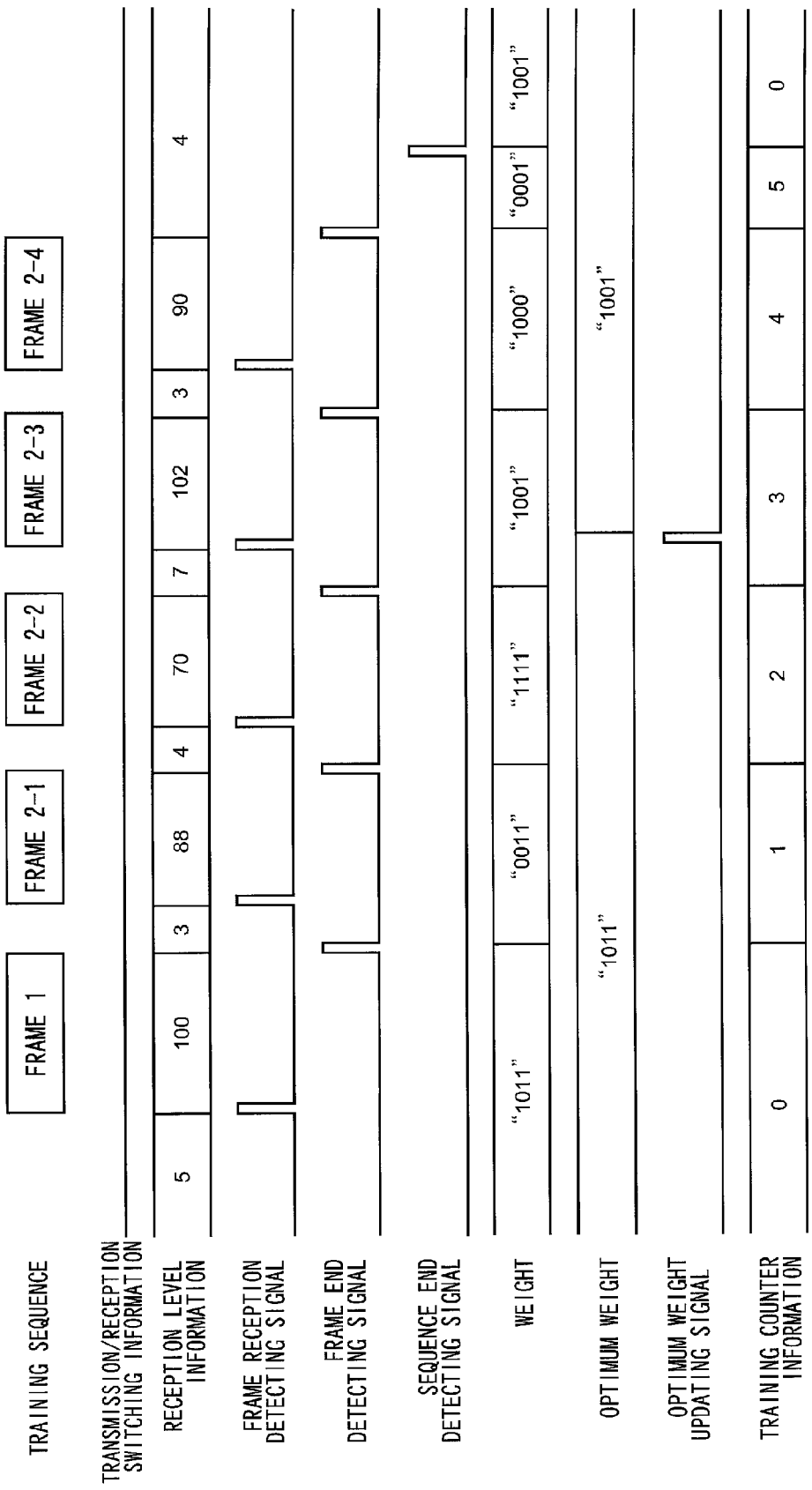

RECEPTION SIGNAL VECTOR OF FRAME 1
"1011"
(100)

RECEPTION SIGNAL VECTOR
OF FRAME 2-1
"0011"
(88)

RECEPTION SIGNAL VECTOR
OF FRAME 2-2
"1111"
(70)

RECEPTION SIGNAL VECTOR
OF FRAME 2-3
"1001"
(102)

RECEPTION SIGNAL VECTOR
OF FRAME 2-4
"1000"
(90)

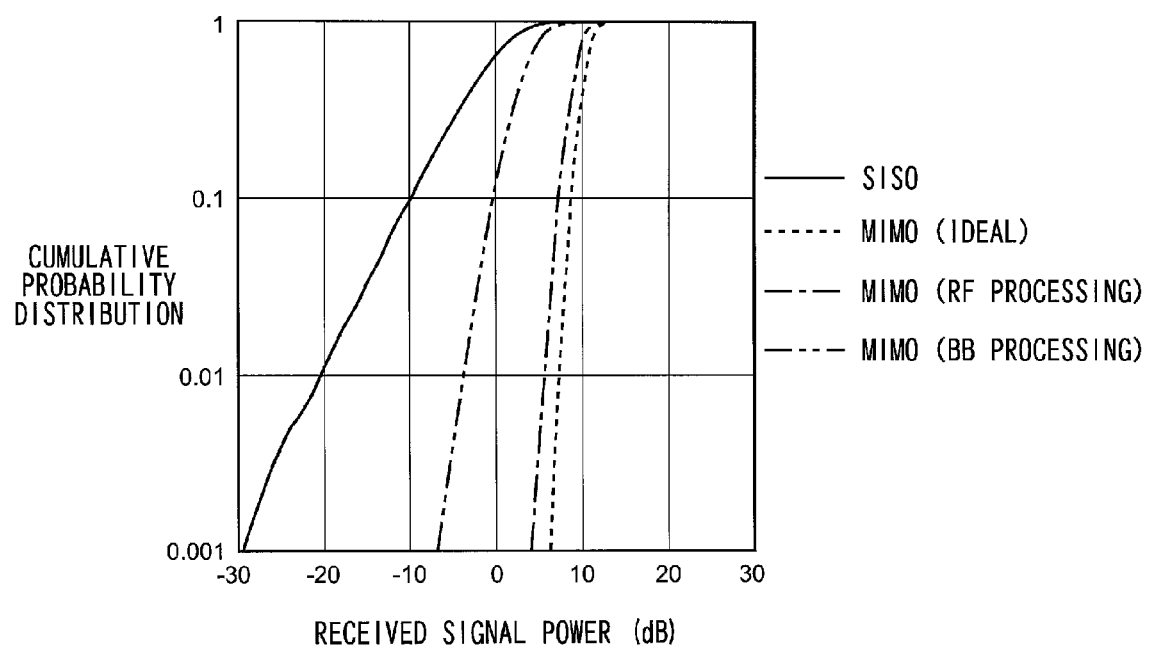

MULTI-ANTENNA WIRELESS COMMUNICATION METHOD, MULTI-ANTENNA WIRELESS COMMUNICATION SYSTEM, AND MULTI-ANTENNA WIRELESS COMMUNICATION DEVICE

TECHNICAL FIELD

The present invention relates to a wireless communication method, a wireless communication system, and a wireless communication device, each of which uses multiple antennas and realizes high-throughput and highly-reliable wireless communication by use of MIMO (Multiple Input Multiple Output) technology in which multiple antennas for transmission and multiple antennas for reception are used, and, more particularly, relates to a multi-antenna wireless communication method, a multi-antenna wireless communication system, and a multi-antenna wireless communication device each of which is capable of realizing eigenbeam transmission with which a large MIMO gain can be obtained without transferring information relative to a channel matrix between wireless communication devices between which transmission/reception are performed and each of which is capable of obtaining a large MIMO gain by optimizing a phase shifter using a small number of training frames.

BACKGROUND ART

A cellular phone system has been put to practical use as a wireless system that provides a voice communication service, and, recently, various data services, such as e-mails and Internet access, have become available in addition to the voice communication service. The spread of a broadband wireless communication makes it possible to transmit and receive higher-definition video information, and new services are expected to be created.

Although the capacity in a wireless communication system has become larger, and the throughput in wireless communication has become higher through the development of wireless communication technology, there remains a big problem. The problem is that a service area becomes much smaller in a broadband wireless communication system than a conventional wireless system in which voice communication service is provided.

This problem mainly results from the fact that, when voice is transferred by using the broadband wireless system, voice having a frequency bandwidth of at most several kilohertz is transferred by using a frequency bandwidth of several tens of megahertz, and therefore excessive noise occurs in a receiver. This noise can be reduced by using baseband processing by use of redundancy. However, if such baseband processing is used, a very low-transmission rate wireless communication will be performed while using a frequency bandwidth of several tens of megahertz, and the wireless communication system will become extremely low in transmission efficiency.

There is also OFDMA (Orthogonal Frequency Division Multiple Access) technology that can provide a combination of a broadband service and a narrowband service, such as a voice communication service. However, even using the OFDMA technology, the communication area of the broadband service is provided in very narrow area.

Although both a voice communication service and a data service have been already provided by using a wireless LAN service conforming to IEEE 802.11 that is the only broadband wireless communication system being in practical use at the present time, these services using the wireless LAN conforming to IEEE 802.11 have not been satisfactorily spread because there is a bottleneck in the fact that the service area of the voice communication service is narrow.

An area expanding technology developed by, for example, Xirrus, Inc. of the United States has already existed as the technology of expanding the service area of the wireless LAN conforming to IEEE 802.11, and a wireless base station provided with this technology has already been commercialized.

A block diagram of a wireless base station based on the technology of Xirrus Inc. is shown in FIG. 35. This station has sixteen access points (AP), each of which has a directional antenna. Directivity of each directional antenna of the AP differs from each other. Different frequency channels from each other are assigned to the access points, respectively. A controller controls the access points and the sixteen directional antennas. According to the structure of FIG. 35, it is reported that an antenna gain of about 12 dB can be obtained, and the radius of the service area can be extended about twice as long as a structure in which an omnidirectional antenna is used.

Area expanding technology developed by Ruckus Wireless Inc. of the United States exists as another example of the technology of expanding the service area of the wireless LAN, and, likewise, a wireless base station provided with this technology has already been commercialized. This technology is disclosed in Patent Literature 1.

A block diagram of a wireless base station based on the technology of Ruckus Wireless Inc. is shown in FIG. 36. The technology of Ruckus Wireless Inc. is the same as that of Xirrus, Inc. in the fact that the wireless base station uses sixteen directional antennas and that the service area is widened by the antenna gain. However, the technology of Ruckus Wireless Inc. differs from that of Xirrus, Inc. in the fact that an access point for each antenna is not provided and that the antennas are used while appropriately changing a combination of these antennas by use of a radio frequency switch. What is required of this structure is to provide one access point for each wireless base station, and therefore costs and power consumption can be reduced.

If the service-area expanding technology of the wireless LAN mentioned above is applied to the wireless base station that is to say the access point of the broadband wireless communication system, the radius of the service area can be extended several times. Nevertheless, its service area will be smaller than that of the current narrow band wireless communication system which is used mainly for a voice communication service.

As a concrete example, a description will be given of the service area of a wireless LAN conforming to IEEE 802.11a (hereinafter, referred to as an "IEEE 802.11a system") and the service area of the current wireless communication system (PHS system) which is used mainly for a voice communication service.

FIG. 37 shows a relationship between a wireless-base-station-to-wireless-terminal distance (i.e., distance between a wireless base station and a wireless terminal) and received-signal power in the IEEE 802.11a system and in the PHS system, and shows reception sensitivity in each system. Herein, an indoor propagation model of ITU-R P.1238-2 was used as a radio propagation model, and general values in product specifications were used as specifications of each system. As shown in FIG. 37, the received signal power is reduced in proportion to an increase in the wireless-base-station-to-wireless-terminal distance. The radius of the service area of each system is obtained as a wireless-base-station-to-wireless-terminal distance when the received signal power coincides with the reception sensitivity of that system.

The received signal power given by the radio propagation model is a mean value of the received signal power. Actually, a variation by Rayleigh fading is superimposed on that model. Therefore, if the radius of the service area is determined by use of the mean value of the received signal power, the received signal power will fall below the reception sensitivity with an about ½ probability near the boundary of the service area. Preferably, in order to prevent this, under the condition that a variation by Rayleigh fading is superimposed, an electric power value (hereinafter, referred to as a "1% value") in which the cumulative probability of received-signal power becomes 1% is calculated, and a wireless-base-station-to-wireless-terminal distance obtained when the resulting value coincides with the reception sensitivity of the system is set as the radius of the service area.

In FIG. 37, the mean value of received signal power is shown by the broken line, and the 1% value thereof is shown by the solid line. The wireless-base-station-to-wireless-terminal distance at a point at which the solid line (1% value) intersects with the straight line showing the reception sensitivity of each system is the radius of the service area. From FIG. 37, the radius of the service area of the IEEE 802.11a system and that of the PHS system are 18 meters and 114 meters, respectively. In each system, the probability with which the received signal power falls below the reception sensitivity inside the service area is less than 1%, and an excellent speech quality can be obtained there.

As is apparent from the foregoing description, the radius of the service area of the IEEE 802.11a system is about ⅙ of that of the PHS system, and, in terms of area ratio, the IEEE 802.11a system is about 1/40 of the PHS system. At the boundary of the service area of the PHS system (i.e., point at which the wireless-base-station-to-wireless-terminal distance is 114 meters), the 1% value of the IEEE 802.11a system is about −111 dBm, which is lower by 24 dB than −87 dBm that is the reception sensitivity of the IEEE 802.11a system. In other words, in order to achieve a service area having a size equivalent to that of the current PHS system, the IEEE 802.11a system is required to make a 24 dB dynamic-range improvement.

A dynamic-range improvement obtained when the service-area expanding technology mentioned above is applied to the wireless base station is at most 12 dB (corresponding to a power gain 16) even when sixteen directional antennas, for example, are used. From FIG. 37, it is understood that a dynamic-range improvement of 12 dB makes it possible to extend the service-area radius to 42 meters. Thus, the service-area radius can be extended to more than twice as long as the service-area radius of the current IEEE 802.11a system by applying the service-area expanding technology mentioned above. Nevertheless, the service-area radius of the IEEE 802.11a system is about ⅓ of that of the PHS system, and the area of the IEEE 802.11a system is about ⅛ of that of the PHS system, and hence the IEEE 802.11a system remains small in the service area.

In order to obtain a service area equivalent to that of the PHS system, the wireless base station is required to be provided with 256 or more directional antennas (correspond to a gain of 24 dB). However, this is not realistic. A great dynamic-range improvement of about 24 dB can also be achieved by providing each of the wireless base station and the wireless terminal with at least 16 directional antennas (corresponding to a gain of 12 dB). However, a dimensionally wide space is required in order to form a directional antenna having a high gain of about 12 dB, and hence the volume of the wireless terminal must also be increased in order to mount 16 directional antennas each of which has such a high gain thereon.

Additionally, if radio waves come from various directions under a multipath environment, and all of these radio waves are intended to be received, the antenna gain will disadvantageously become small. In other words, in the technology developed by Ruckus Wireless Inc. in which directional antennas are used in a combined manner so as to achieve optimal directivity, the antenna gain becomes smaller in proportion to the approach of the probability distribution of the arrival angle of radio waves to uniform distribution, and, disadvantageously, the dynamic-range improvement becomes lower than 24 dB. On the other hand, although such a problem does not occur in the technology developed by Xirrus, Inc., 16 wireless transceivers correlated with 16 access points are required to be mounted on wireless terminals, and, disadvantageously, costs and power consumption are raised.

As described above, in the broadband wireless communication system, a very great dynamic-range improvement of about 24 dB is required in order to provide a voice communication service in the same service area as the conventional narrow band wireless communication system in addition to a wireless communication having a very high throughput of several tens of megabits per second. However, a technology that can achieve this improvement does not exist at the present time.

In recent years, in the field of the broadband wireless communication, a system that has introduced the MIMO technology has been generalized with the aim of increasing a transmission capacity or enhancing reliability. Although a system conforming to IEEE 802.11a or IEEE 802.11g based on the OFDM (Orthogonal Frequency Division Multiplexing) technology is dominant in, for example, a wireless LAN conforming to the IEEE 802.11 standard that has continued to spread in homes and offices under the present situation, IEEE 802.11n that is a new standard having introduced the MIMO technology has also been formulated. Recently, products equipped with the MIMO technology conforming to a draft of IEEE 802.11n have also begun to be released. The draft of IEEE 802.11n is shown in Non-Patent Literature 1.

Additionally, in the near future, the MIMO technology is also intended to be introduced in standards, such as mobile WiMAX or next-generation PHS, that will be introduced in a 2.5-GHz-band broadband mobile access system that is scheduled to be launched. This is described in Non-Patent Literature 2.

Still additionally, in the cellular phone, the MIMO technology is expected to be introduced into broadband-enabled "Super 3G" (name of the next-generation cellular system of NTT DOCOMO) and broadband-enabled "Ultra 3G" (name of the next-generation cellular system of KDDI) and into their later versions. Thus, it is predicted that the MIMO technology will be rapidly expanded with the spread of the broadband wireless communication.

As described above, in the broadband wireless communication, the introduction of the MIMO technology will probably be generalized in the future. It is known that a very large antenna gain and a very large diversity gain can be obtained if the MIMO technology is applied with a large number of antennas.

In the wireless communication system to which the MIMO technology is applied, signals transmitted from plural antennas of an opposite wireless communication device disposed on an opposite side of a communication link are received by plural antennas, thereafter each of the received signals is multiplied by diversity combining information (complex weight), and the signals are added together, thus generating a diversity-combining received signal. Optimal diversity combining information with respect to the signal of each antenna is calculated based on a channel matrix that is estimated from, for example, an already-known training sequence of received signals. The diversity-combining received signal is obtained by combining together signals the number of which is (the number of antennas of the opposite communication device× the number of antennas of the own wireless communication device). If the number of antennas of the opposite wireless communication device is N, and the number of antennas of the own wireless communication device is N, the number of signals combined together in the diversity combination is proportional to $N^2$, and therefore a large MIMO gain can be obtained by increasing the number N.

FIG. 38 is a view showing a relationship between the number N of antennas and a MIMO gain in a case in which a wireless channel between a wireless base station and a wireless terminal is for over-the-horizon propagation (also termed "non-line-of-sight propagation") and in which received signal power conforms to Rayleigh distribution. In FIG. 38, the abscissa axis exhibits received signal power standardized by the mean value of the received signal power when N=1, and the ordinate axis exhibits the cumulative probability distribution of received signals. The sum total of transmitted signal power from antennas is assumed as constant without depending on the number N of the antennas. As shown in FIG. 38, the graph of the cumulative probability distribution not only shifts rightwardly, but also inclines more steeply in proportion to an increase in the number N of the antennas. The rightward shift of the graph results mainly from an antenna gain in transmission and reception, whereas the change in inclination of the graph results mainly from a diversity gain. In comparison with a case in which N=1 at the 1% value, the MIMO gain is increased by 18 dB when N=2, and the MIMO gain is increased by 27 dB when N=4, and the MIMO gain is increased by 32 dB when N=8. From this fact, it is understood that, in a Rayleigh environment, a great dynamic-range improvement that exceeds 24 dB can be obtained by setting both the number of the antennas of the wireless base station and the number of the antennas of the wireless terminal at four or more.

As described above, in the broadband wireless communication system, a huge dynamic-range improvement that exceeds 24 dB is required in order to provide a video communication service in the same service area as the conventional narrow band wireless communication system in addition to a wireless communication having a high throughput of several tens of megabits per second. In order to achieve this improvement, the MIMO technology with four or more antennas is required to be applied onto both the wireless base station and the wireless terminal.

On the other hand, in the MIMO technology, it is necessary to optimally set diversity combining information with respect to the signal of each antenna and an eigenbeam-transmission line. This optimal diversity combining information has been obtained according to a conventional process in which the correlation matrix of a channel matrix is first calculated, and then an eigenvector corresponding to the maximum eigenvalue of the correlation matrix is calculated, and is set as diversity combining information with respect to the signal of each antenna.

Herein, the calculation amount in calculation of the correlation matrix increases in proportion to the square of the number of antennas, and the calculation amount in calculation of the eigenvector increases in proportion to the cube of the number of antennas. The calculation amount to calculate optimal diversity combining information sharply increases correspondingly to an increase in the number of antennas in this way, and therefore the increase in the number of antennas is limited.

Additionally, if the maximum frequency of multipath fading is assumed as 50 Hz (corresponding to ten kilometers per hour), transmission must be performed within several milliseconds from transmission-line matrix estimation in order to restrict a transmission-line estimation error to a small one, and a calculation to the eigenvector must be performed during the several milliseconds. If the number of antennas is five or more, the eigenvector cannot be analytically calculated and found, and a solution through an iterative process is required, and hence calculation time therefor becomes larger and it may come degradation of eigenvector.

Additionally, although a very large gain can be obtained by performing eigenbeam transfer by use of MIMO, information about a transmission line matrix must be shared between transmission and reception in order to perform eigenbeam transfer, and therefore information thereabout is required to be transferred. The amount of information about a transmission line matrix increases in proportion to an increase in the number of antennas. In a high-speed multipath fading environment, information thereabout is required to be frequently transferred, and the efficiency of the whole of the system is greatly deteriorated.

From the foregoing viewpoint, the upper limit of the number of antennas is four or so under the present situation. Actually, the maximum number of antennas in MIMO transfer is four in IEEE 802.11n or IEEE 802.16 that is a standard of wireless communication into which the most advanced MIMO technology of today has been introduced.

Additionally, diversity combining is performed by baseband processing in the conventional MIMO technology, and therefore an input signal of a transmitting/receiving circuit becomes a received signal prior to diversity combining In other words, in an input signal of a transmitting/receiving circuit, neither a diversity gain nor a MIMO gain can be obtained. The received signal is required to be detected in the transmitting/receiving circuit without transmission-beamforming at the initial acquisition stage before forming an eigenbeam. Therefore, in the conventional MIMO technology, the communication area has been limited to an area in which an eigenbeam can be formed by initial acquisition.

CITATION LIST

Patent Literature

[Patent Literature 1] Circuit board having a peripheral antenna apparatus with selectable antenna elements (U.S. Pat. No. 7,193,562)

Non Patent Literature

[Non Patent Literature 1] IEEE802.11n Draft 5.0
[Non Patent Literature 2] IEEE802.16e-2005
[Non Patent Literature 3] Propagation data and prediction methods for the planning of indoor radio communication systems and radio local area networks in the frequency range 900 MHz to 100 GHz (ITU-R P.1238-2)

SUMMARY OF INVENTION

Technical Problem

In the wireless communication system, not only audio communication but also various data services, such as e-mails and Internet access, have become available. If broadband wireless communication spreads in the future, it is conceivable that even higher-definition dynamic-image information can be transmitted and received, and hence new services will be produced. However, disadvantageously, in the broadband service according to the conventional technology, the service area becomes much narrower than that of the communication system in which audio communication is mainly exchanged. In other words, there is a problem in the fact that the same wide service area as the wireless communication system that provides the current audio communication service cannot be provided in a wireless communication service having a very high throughput of several tens to several hundred megabits per second.

In order to obtain a service area equivalent to that of the current wireless system, the MIMO technology having a large number of antennas must be applied to both the wireless base station and the wireless terminal so as to obtain a large MIMO gain. However, the conventional MIMO technology has a process in which the correlation matrix of a transmission line matrix is first calculated, and then an eigenvector corresponding to the maximum eigenvalue of the correlation matrix is calculated, and is set as diversity combining information with respect to the signal of each antenna. According to this process, the amount of processing in the calculation of eigenvectors becomes huge if the number of antennas is increased, and therefore it has been difficult to apply the MIMO technology especially under a high-speed multipath fading environment.

Additionally, the conventional MIMO technology has a problem in the fact that the communication area is limited to an area in which an eigenbeam can be formed by initial acquisition.

It is an object of the present invention to solve the above-mentioned problems and provide a multi-antenna wireless communication method, a multi-antenna wireless communication system, and a multi-antenna wireless communication device each of which has a simple structure that enables the construction of a broadband wireless communication system that has a service area equivalent to that of the current wireless system.

Solution to Problem

To achieve the object, the present invention has a feature in that a multi-antenna wireless communication method in which a plurality of antennas for transmission and a plurality of antennas for reception are used and in which wireless communication is performed by MIMO (Multiple Input Multiple Output) technology, the multi-antenna wireless communication method comprising, a first step of determining diversity combining information with respect to each signal of the plurality of antennas that optimizes a diversity reception state as a value optimum thereof in each wireless communication device through a two-way training signal transfer between the wireless communication devices that perform transmission and reception; a second step of setting a value optimum of each diversity combining information determined by the first step for each wireless communication device; and a third step of enabling each wireless communication device to perform beamforming and diversity combining for a time of data transmission/reception in a state set by the second step.

Further, the multi-antenna wireless communication method according to the present invention has a feature in that in the first step, diversity combining information with respect to a signal of each of the plurality of antennas is sequentially changed when each wireless communication device receives a training signal from an opposite wireless communication device disposed on an opposite side of a communication link, and a value optimum of the diversity combining information is determined based on reception level information of a diversity-combining received signal with respect thereto.

Further, the multi-antenna wireless communication method according to the present invention has a feature in that in the first step, diversity combining information with respect to a signal of each of the plurality of antennas is sequentially changed when each wireless communication device receives a training signal from an opposite wireless communication device disposed on an opposite side of a communication link, and a value optimum of the diversity combining information is determined based on baseband reception IQ information of a diversity-combining received signal with respect thereto or based on both the baseband reception IQ information and reception level information.

Further, the multi-antenna wireless communication method according to the present invention has a feature in that in the first step, diversity combining information with respect to a signal of each of the plurality of antennas is sequentially changed when each wireless communication device receives a training signal from an opposite wireless communication device disposed on an opposite side of a communication link, and a value optimum of the diversity combining information is determined based on correlation information between a received baseband IQ signal with respect thereto and a predetermined information sequence or based on both the correlation information and reception level information.

Furthermore, the present invention has a feature in that a multi-antenna wireless communication device in which a plurality of antennas for transmission and a plurality of antennas for reception are used and in which wireless communication is performed by MIMO (Multiple Input Multiple Output) technology, the multi-antenna wireless communication device comprising: a diversity combining information generating unit that outputs diversity combining information with respect to a signal of each of the plurality of antennas while sequentially changing the diversity combining information with respect thereto when diversity reception is performed in a two-way training signal transfer between a wireless communication device and an opposite wireless communication device disposed on an opposite side of a communication link; a diversity combining information setting unit that controls an amplitude and a phase of a signal of each of the plurality of antennas based on the diversity combining information; a signal distributing/synthesizing unit that performs beamforming transmission and diversity reception in combination with the diversity combining information setting unit; a reception-state determining unit that determines a diversity reception state in each setting based on reception level information of a training signal received in a diversity reception manner when each diversity combining information output by the diversity combining information generating unit is set; a diversity combining information determining unit that determines diversity combining information that optimizes a diversity reception state determined by the reception-state determining unit as a value optimum of the diversity combining information; and a diversity combining information value optimum setting unit that sets a value optimum of the diversity combining information determined by the diversity combining information determining unit for beamforming and diversity combining at a time of data transmission/reception.

Further, the multi-antenna wireless communication device according to the present invention has a feature in that in which a plurality of antennas for transmission and a plurality of antennas for reception are used and in which wireless communication is performed by MIMO (Multiple Input Multiple Output) technology, the multi-antenna wireless communication device comprising: a diversity combining information generating unit that outputs diversity combining information with respect to a signal of each of the plurality of antennas while sequentially changing the diversity combining information with respect thereto when diversity reception is performed in a two-way training signal transfer between a wireless communication device and an opposite wireless communication device disposed on an opposite side of a communication link; a diversity combining information setting unit that controls an amplitude and a phase of a signal of each of the plurality of antennas based on the diversity combining information; a signal distributing/synthesizing unit that performs beamforming transmission and diversity reception in combination with the diversity combining information setting unit; a training receiving state holding unit that holds a diversity reception state in each setting based on baseband reception IQ information of a training signal received in a diversity reception manner when each diversity combining information output by the diversity combining information generating unit is set or based on both the baseband reception IQ information and reception level information; a diversity combining information determining unit that determines diversity combining information that optimizes a diversity reception state as a value optimum of the diversity combining information based on information relative to the diversity reception state held by the training receiving state holding unit; and a diversity combining information value optimum setting unit that sets a value optimum of the diversity combining information determined by the diversity combining information determining unit for beamforming and diversity combining at a time of data transmission/reception.

Further, the multi-antenna wireless communication device according to the present invention has a feature in that the diversity combining information is 1-bit information, and the diversity combining information generating unit outputs diversity combining information with respect to a signal of each of the plurality of antennas while sequentially subjecting the diversity combining information to phase inversion, and the reception-state determining unit makes a comparison between reception level information obtained before performing the phase inversion and reception level information obtained after performing the phase inversion, and determines a diversity reception state from this comparison, and the diversity combining information determining unit determines a value optimum of the diversity combining information in the antenna based on the diversity reception state determined by the reception-state determining unit.

Further, the multi-antenna wireless communication device according to the present invention has a feature in that the diversity combining information is n-bit information (n is a natural number of 2 or greater), and the diversity combining information generating unit outputs diversity combining information with respect to a signal of each of the plurality of antennas while sequentially subjecting the diversity combining information to phase inversion, and the training receiving state holding unit holds baseband reception IQ information obtained before and after performing the phase inversion or holds both the baseband reception IQ information and reception level information, and the diversity combining information determining unit determines a value optimum of the diversity combining information in the antenna based on a diversity reception state held by the training receiving state holding unit.

Further, the multi-antenna wireless communication device according to the present invention has a feature in that if a value optimum of the diversity combining information has been set through an immediately previous two-way training signal transfer, the diversity combining information generating unit sequentially performs the phase inversion while using this value optimum of the diversity combining information as an initial value, and, if a value optimum of the diversity combining information has not been set, the diversity combining information generating unit sequentially performs the phase inversion while using a random initial value.

Further, the multi-antenna wireless communication device according to the present invention has a feature in that a first training sub-signal is transmitted in data transmission/reception to/from the wireless communication device disposed on a side of a base station.

Further, the multi-antenna wireless communication device according to the present invention has a feature in that in the diversity combining information generating unit, the phase inversion is sequentially performed while always using a random initial value.

Further, the multi-antenna wireless communication device according to the present invention has a feature in that in transmission of broadcast frames or multicast frames from the wireless communication device disposed on the side of the base station that performs wireless communication with a plurality of wireless communication devices, a same frame is transmitted a plurality of times by using a plurality of pieces of diversity combining information that differ from each other.

Further, the multi-antenna wireless communication device according to the present invention has a feature in that in transmission of broadcast frames or multicast frames from the wireless communication device disposed on the side of the base station that performs wireless communication with a plurality of wireless communication devices, each of the broadcast frames or each of the multicast frames is transmitted to each of the plurality of wireless communication devices by use of a value optimum of the diversity combining information that has been determined by the diversity combining information determining unit and that has been set by the diversity combining information value optimum setting unit through a two-way training signal transfer.

Further, the multi-antenna wireless communication device according to the present invention has a feature in that in the wireless communication device disposed on a base station that performs wireless communication with a plurality of wireless communication device, a diversity combining information value optimum storing unit is provided for storing a value optimum of the diversity combining information determined by the diversity combining information determining unit in each wireless communication device disposed on the side of the terminal that performs wireless communication with the base station, and, before data transmission/reception to and from a terminal-side wireless communication device disposed on a side of a terminal, a value optimum of the diversity combining information with respect to this terminal-side wireless communication device that is held by the diversity combining information value optimum storing unit is set by the diversity combining information value optimum setting unit.

Further, the multi-antenna wireless communication device according to the present invention has a feature in that the reception-state determining unit determines a diversity reception state while using a diversity-combining received signal level or a gain of an AGC amplifier as an indicator.

Further, the multi-antenna wireless communication device according to the present invention has a feature in that the training signal is a plurality of frames or symbols, and the reception-state determining unit determines a diversity reception state while using an amplitude of a baseband IQ signal or an IF signal of each frame or each symbol as an indicator.

Further, the multi-antenna wireless communication device according to the present invention has a feature in that a demodulating part that demodulates RF received data and a demodulating part that demodulates an RF training signal are shared with each other.

Further, the multi-antenna wireless communication device according to the present invention has a feature in that the diversity combining information setting unit and the signal distributing/synthesizing unit operate in an RF band, and multi-antenna beamforming transmission and multi-antenna diversity reception are performed by use of a single transmission/reception system.

Further, the multi-antenna wireless communication device according to the present invention has a feature in that the diversity combining information setting unit and the signal distributing/synthesizing unit operate in a baseband, and beamforming transmission and diversity reception are simultaneously performed between a plurality of wireless communication devices by use of a single MIMO transmission/reception system.

Advantageous Effects of Invention

In the present invention, the value optimum of diversity combining information in each wireless communication device is determined through two-way training signal transfer between wireless communication devices that perform transmission and reception, and therefore the value optimum of diversity combining information can be easily calculated, and a large MIMO gain can be obtained by performing data transfer by use of this value optimum of diversity combining information even when the number of antennas of the wireless communication device is large.

In the present invention, the amount of processing in which the value optimum of diversity combining information in each wireless communication device is determined through two-way training signal transfer is proportional to the number of antennas, and therefore the amount of arithmetic processing can be reduced.

Additionally, if diversity combining is performed in a radio-frequency band, a wireless transmitting/receiving circuit and a modulating/demodulating circuit can also be used for transmitting and receiving a training signal and a data transmission signal, and therefore the structure can be made simple, and costs and power consumption can be reduced.

Additionally, if diversity combining is performed in a radio-frequency band, multi-antenna beamforming transmission and multi-antenna diversity reception can be realized by only one transmission/reception system, and therefore eigenbeam transfer with respect to a maximum eigenvalue can be approximately realized as described later. In the conventional technology, this eigenbeam transfer is performed by use of transmission/reception systems meeting the number of antennas, and therefore the present invention makes it possible to greatly reduce costs and power consumption.

Eigenbeam transfer can be realized without increasing the number of transmission/reception systems, and therefore MIMO with a large number of antennas can be performed, and a large MIMO gain, which cannot be realized in the conventional technology, can be realized. As a result, although the conventional technology is limited by the fact that the area of broadband communication is narrow, the present invention has a very great advantage in the fact that broadband communication can be performed in a wide communication area equivalent to that of conventional narrowband communication.

Still additionally, if diversity combining is performed in a radio-frequency band, it is possible to produce the advantage that the communication area is not limited to an area in which an eigenbeam can be formed by initial acquisition.

FIG. 39 shows a comparison of reception level distributions at an initial acquisition stage between the conventional MIMO technology and the present invention. Herein, the wireless transmission line is assumed to be under a Rayleigh fading environment, and the number of transmitting/receiving antennas of each wireless communication device is assumed as four. For reference, FIG. 39 shows reception level distributions when the SISO system and the optimal weight are used. From FIG. 39, it is understood that the reception level at the initial acquisition stage in the conventional MIMO technology is improved by 16 dB higher than SISO, and is deteriorated by 11 dB lower than a MIMO gain in the optimum weight. The reason is that a transmission beam is not formed and that diversity combining is not performed during reception, and, as a result, an improvement is made by the gain of four-branch selection diversity higher than SISO.

On the other hand, when diversity combining information in the present invention is set in a radio-frequency band, a gain near the MIMO gain in the approximately optimum weight can be obtained at the initial acquisition stage. A deterioration from the MIMO gain in the optimum weight results not from the fact that an eigenvector is used as a complex weight but from the fact that a complex weight is set by use of a phase shifter.

As described above, in the conventional MIMO technology, the MIMO gain is not satisfactorily effectively used to widen the communication area. However, in the present invention, the communication area can be widened by the MIMO gain when diversity combining information is set in a radio-frequency band.

Additionally, in the conventional MIMO technology, information about a transmission line matrix must be shared between the transmitting side and the receiving side, and eigenbeam transfer has difficulty in being applied under the high-speed multipath fading environment. However, according to the present invention, advantageously, information about a transmission line matrix is not required to be shared therebetween, and eigenbeam transfer can be applied under the high-speed multipath fading environment.

BRIEF DESCRIPTION OF DRAWINGS

FIG. 8 is a timing chart showing an example of the operation of the weight generating unit for beamforming of FIG. 7.

FIG. 39 is a view showing a comparison of the reception level distribution at the initial acquisition stage between the conventional MIMO technology and the present invention.

DESCRIPTION OF EMBODIMENTS

Figure 1:
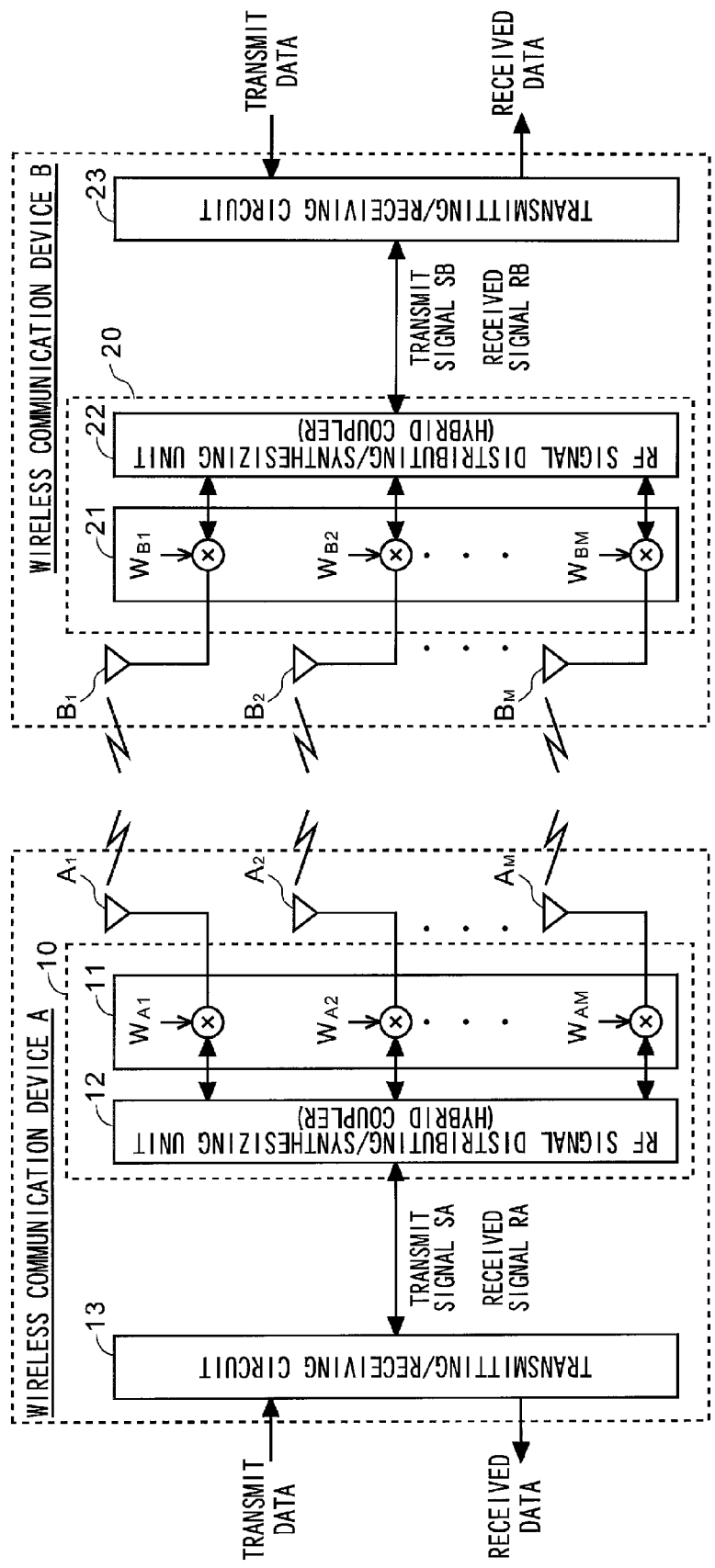
FIG. 1 is a block diagram showing a basic structure of a wireless communication system according to the present invention.

The present invention will be hereinafter described with reference to the drawings. FIG. 1 is a block diagram showing a basic structure of a wireless communication system according to the present invention. The present invention can be embodied not only as a wireless communication system but also as a wireless communication method, and is characterized also as a wireless communication device.

The wireless communication system that is a basic structure of the present invention includes two wireless communication devices A and B that perform two-way wireless communication via a wireless transmission line. The wireless communication devices A and B may be two wireless base stations, or may be a wireless base station and a wireless terminal, or may be two wireless terminals.

The wireless communication device A includes M antennas $A_1, A_2, \ldots, A_M$ (M is an integer of 2 or greater), a weight processing unit 11, an RF signal distributing/synthesizing unit (hybrid coupler) 12, and a transmitting/receiving circuit 13. The wireless communication device B includes N antennas $B_1, B_2, \ldots, B_N$ (N is an integer of 2 or greater), a weight processing unit 21, an RF signal distributing/synthesizing unit (hybrid coupler) 22, and a transmitting/receiving circuit 23. A group of the weight processing unit 11 and the RF signal distributing/synthesizing unit 12 and a group of the weight processing unit 21 and the RF signal distributing/synthesizing unit 22 form a diversity circuit 10 and a diversity circuit 20, respectively. In this example, although the antennas $A_1, A_2, \ldots, A_M, B_1, B_2, \ldots, B_N$ are used both for transmission and for reception, transmitting antennas and receiving antennas may be provided separately from each other.

Additionally, either a transmission power amplifier or a reception LNA (Low Noise Amplifier), or both of them may be inserted between the RF signal distributing/synthesizing unit 12 and the weight processing unit 11 or between the weight processing unit 11 and the antennas $A_1, A_2, \ldots, A_M$ so as to increase transmitting power or improve reception sensitivity. Likewise, either a transmission power amplifier or a reception LNA (Low Noise Amplifier), or both of them may be inserted between the RF signal distributing/synthesizing unit 22 and the weight processing unit 21 or between the weight processing unit 21 and the antennas $B_1, B_2, \ldots, B_N$ so as to increase transmitting power or improve reception sensitivity.

The weight processing units 11 and 21 include a plurality of multipliers in each of which received signals from each of the antennas $A_1, A_2, \ldots, A_M, B_1, B_2, \ldots, B_N$ or transmit signals from the RF signal distributing/synthesizing units 12 and 22 are multiplied by complex weights $W_{A1}, W_{A2}, \ldots, W_{AM}, W_{B1}, W_{B2}, \ldots, W_{BN}$. In the following description, the complex weight is referred to as "diversity combining information." Each multiplier changes the amplitude and phase of an input signal in accordance with diversity combining information $W_{A1}, W_{A2}, \ldots, W_{AM}, W_{B1}, W_{B2}, \ldots, W_{BN}$, and outputs the resulting signal. A 1-bit phase shifter can be used as the multiplier. In this case, diversity combining information is one bit of "0" or "1," and an input signal is output in accordance with, for example, diversity combining information "0" or "1" without being changed or after being subjected to phase inversion.

Figure 2:
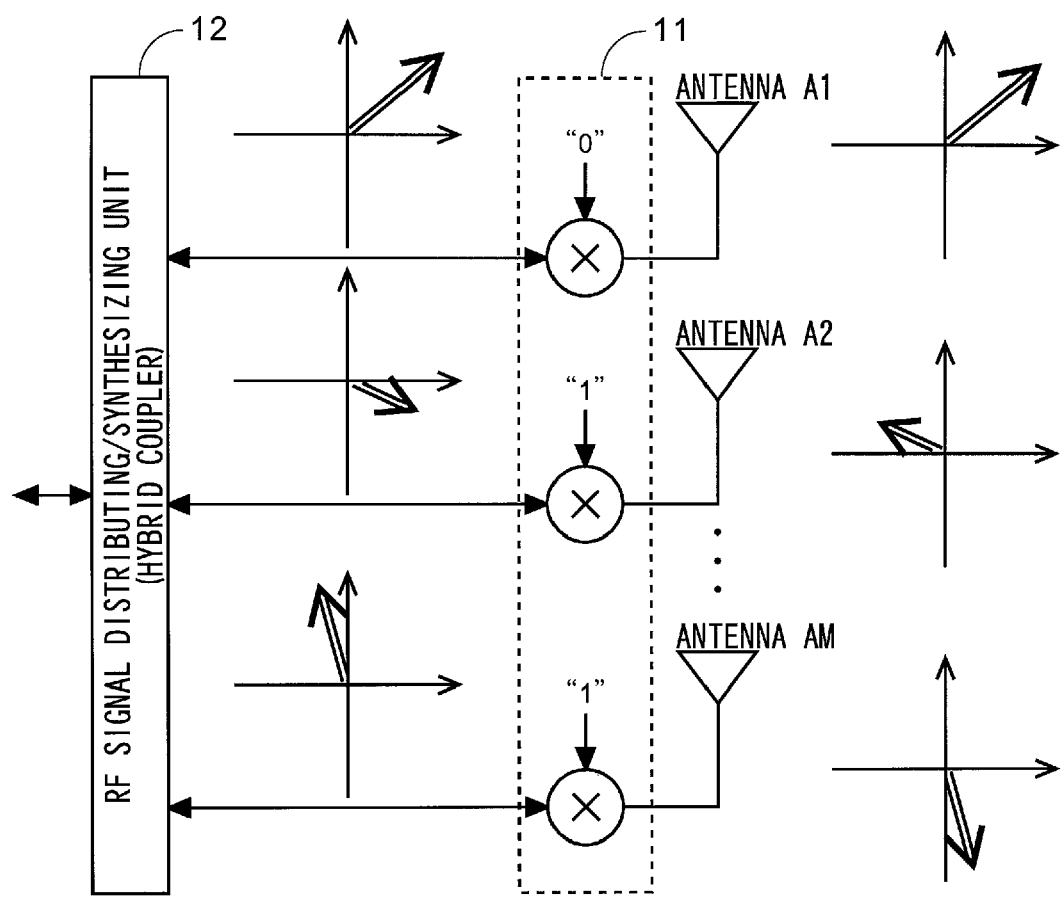
FIG. 2 is a view conceptually showing the operation performed when a 1-bit phase shifter is used in a weight processing unit.

FIG. 2 is a view conceptually showing the operation performed when a 1-bit phase shifter is used in the weight processing unit 11. Signals from the antennas $A_1, A_2, \ldots, A_M$ or signals from the RF signal distributing/synthesizing unit 12 are input to the weight processing unit 11. The weight processing unit 11 outputs an input signal without being changed or after being subjected to phase inversion, depending on whether diversity combining information $W_{A1}, W_{A2}, \ldots, W_{AM}$ is "0" or "1." FIG. 2 shows a case in which a signal is output without being changed when diversity combining information is "0," and a signal is output after being subjected to phase inversion when diversity combining information is "1."

Figure 3:
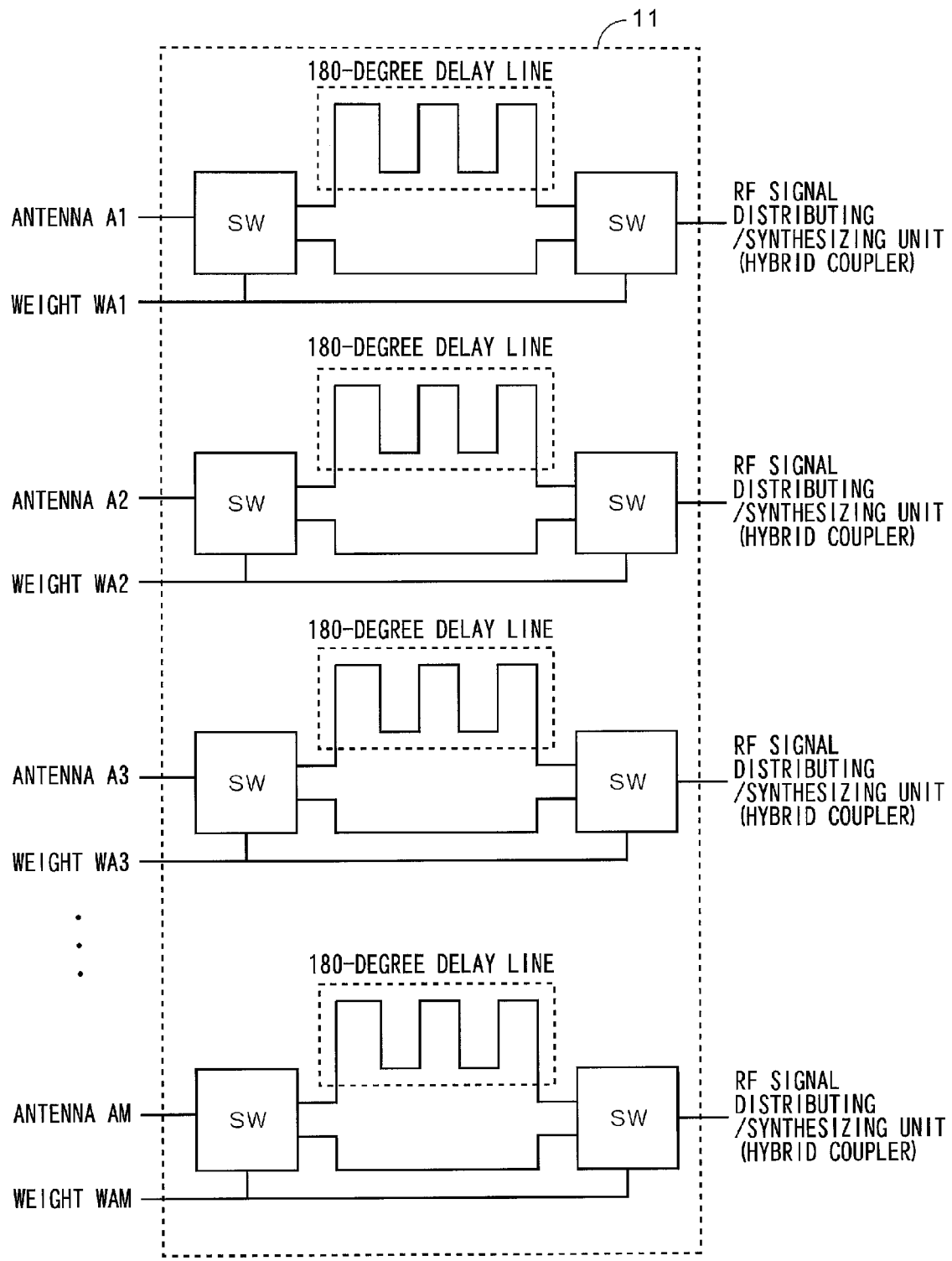
FIG. 3 is a block diagram showing an example of a concrete structure of the weight processing unit.

FIG. 3 is a block diagram showing an example of a concrete structure of the weight processing unit 11. Each multiplier of the weight processing unit 11 is composed of two change-over switches and a 180-degree delay line. The two change-over switches are simultaneously changed over in accordance with diversity combining information $W_{A1}, W_{A2}, \ldots, W_{AM}$. Signals from each of the antennas $A_1, A_2, \ldots, A_M$ or from the hybrid coupler 12 are sent toward the other side without being passed through the 180-degree delay line when diversity combining information $W_{A1}, W_{A2}, \ldots, W_{AM}$ is "0," whereas signals therefrom are sent toward the other side through the 180-degree delay line when diversity combining information $W_{A1}, W_{A2}, \ldots, W_{AM}$ is "1."

Referring again to FIG. 1, in case of transmission, the hybrid coupler 12 allows transmit signals $S_A$ from the transmitting/receiving circuit 13 to energetically undergo M distributions, and outputs the resulting signals to each multiplier of the weight processing unit 11, whereas, in case of reception, the hybrid coupler 12 allows output signals from each multiplier to be synthesized (i.e., be vector-added), and outputs the resulting signals to the transmitting/receiving circuit 13 as diversity-combining received signals $R_A$. On the other hand, in case of transmission, the hybrid coupler 22 allows transmit signals $S_B$ from the transmitting/receiving circuit 23 to energetically undergo N distributions, and outputs the resulting signals to each multiplier of the weight processing unit 21, whereas, at a time of reception, the RF signal distributing/synthesizing unit 22 allows output signals from each multiplier to be synthesized (i.e., be vector-added), and outputs the resulting signals to the transmitting/receiving circuit 23 as diversity-combining received signals $R_B$. In other words, each of the RF signal distributing/synthesizing units 12 and 22 is a two-way hybrid circuit, and acts as a distributor at a time of transmission, and acts as a synthesizer at a time of reception. More specifically, a Wilkinson distributing/synthesizing circuit can be used as each of the RF signal distributing/synthesizing units 12 and 22.

The transmitting/receiving circuits 13 and 23 use transmit data as an input, and output transmit signals $S_A$ and $S_B$ to the signal distributing/synthesizing units 12 and 13 at a time of transmission, whereas the transmitting/receiving circuits 13 and 23 generate received data from the diversity-combining received signals $R_A$ and $R_B$ at a time of reception.

Each of the wireless communication devices A and B determines the value optimum of diversity combining information through two-way training signal transfer, then sets the value optimum of diversity combining information determined thereby in each multiplier of the weight processing units 11 and 21, and performs beamforming and diversity combining for a time of data transmission/reception.

A training signal is used to determine the value optimum of diversity combining information in the wireless communication devices A and B. A single training signal is composed of a plurality of training sub-signals. Each training sub-signal is received in a state in which pieces of diversity combining information, which are different from each other, are set in the weight processing units 11 and 21, respectively, and the value optimum of diversity combining information is determined by use of either reception level information or baseband reception IQ information, or by use of both of them obtained at this time. Something that can obtain reception level information or baseband reception IQ information with respect to an already-known signal can be used as a training signal, and hence an arbitrary frame, a symbol, a subcarrier, a diffusion signal, etc., can be used thereas. A concrete example of the training signal will be described in detail later.

The weight processing units 11 and 21 equivalently multiply pieces of diversity combining information together by use of multipliers. This diversity combining information is used both for transmission and for reception. In other words, transmission beamforming is performed by the multiplication of these pieces of diversity combining information at a time of transmission, whereas diversity combining is performed by the multiplication of these pieces of diversity combining information at a time of reception.

Figure 4:
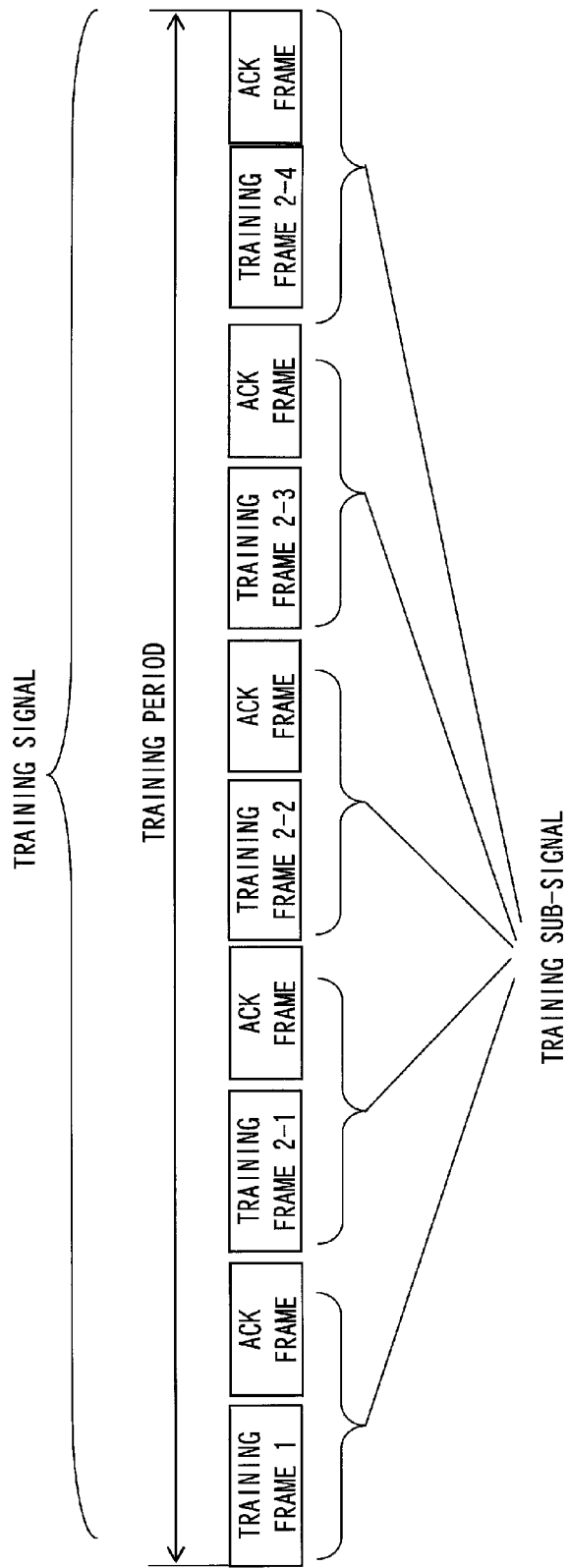
FIG. 4 is a view showing an example of a training signal.

FIG. 4 is a view showing a concrete example of a training signal transmitted and received between the wireless communication devices during one training period. FIG. 4 shows one example of a training signal used when the number of antennas of the receiving-side wireless communication device is four. As shown in FIG. 4, the training signal consists of combinations of five training frames 1, 2-1 to 2-4 and ACK frames (Acknowledgement frames). A training sub-signal consists of combinations of one training frame and an ACK frame relative to this one training frame. When a training frame is received without error in a opposite wireless communication device for which the training frame is destined, an ACK frame is transmitted from the opposite wireless communication device. If a transmission error is detected when the training frame is received in the opposite wireless communication device, the ACK frame is not transmitted, and the training signal is ended at that time. If a transmission error is detected when an ACK frame is received in a initiation wireless communication device, a next training frame is not transmitted, and the training signal is ended at that time. The training signal is used to obtain reception level information when diversity reception is performed by use of current diversity combining information, and is used to obtain reception level information when diversity reception is performed while changing the current diversity combining information in accordance with a predetermined algorithm. Each wireless communication device receives a training signal for one training period, and, as a result, can determine the value optimum of diversity combining information by which a diversity reception state is optimized at that time.

The foremost training frame 1 is allowed to contain pieces of information, such as a initiation address, a destination address, and a frame type. Reception level information when diversity reception is performed by current diversity combining information is obtained by use of this training frame 1. The training frames 2-1 to 2-4 are used to measure a diversity reception state when diversity reception is performed while changing diversity combining information in accordance with a predetermined algorithm. Reception level information is obtained by use of a predetermined preamble pattern or by use of a part of the predetermined preamble pattern. The training signal is used to obtain reception level information when a signal transmitted from the opposite wireless communication device is received in a diversity reception manner by use of predetermined diversity combining information, and hence is not limited to a signal having a form shown in FIG. 4. The training frames 1, 2-1 to 2-4 are not necessarily limited to frames specially prepared for training. For example, a plurality of symbols contained in a preamble of a header of a frame may be used as a training signal.

For example, when the value optimum of diversity combining information in the wireless communication device A is determined in FIG. 1, the wireless communication device A receives frames 1, 2-1 to 2-4 transmitted from the wireless communication device B in a diversity reception manner, and returns each ACK. The frame 1 is received in a diversity reception manner by use of current diversity combining information $W_{A1}, W_{A2}, \ldots, W_{AM}$, and the frames 2-1 to 2-4 are received in a diversity reception manner by use of diversity combining information $W_{A1}, W_{A2}, \ldots, W_{AM}$ obtained by changing the current diversity combining information $W_{A1}, W_{A2}, \ldots, W_{AM}$ in accordance with a predetermined algorithm. Based on a diversity reception state at this time, the value optimum of the diversity combining information $W_{A1}, W_{A2}, \ldots, W_{AM}$ is determined. If ACK frames are not returned, training is ended then. The frames 2-1 to 2-M that meet the predetermined number M of antennas may always be transmitted without using ACK frames. An example in which ACK frames are not used will be described later.

Next, a description will be given of the operation of determining the value optimum of diversity combining information in the wireless communication system of FIG. 1. Herein, a description will be given of a case in which the value optimum of diversity combining information in the wireless communication device A is determined by use of a training signal having a form shown in FIG. 4. Additionally, herein, diversity combining is assumed to be performed by equal gain combining by use of a 1-bit phase shifter for the weight processing unit 11. An arbitrary combining method, such as highly-accurate equal gain combining or maximal ratio combining, can also be used as diversity combining.

First, the wireless communication device B transmits a training signal from each of the antennas $B_1, B_2, \ldots, B_N$ by use of substantially optimal diversity combining information obtained by the nearest past training. The diversity combining information of the wireless communication device B is assumed to be fixed during one training period during which the wireless communication device A updates it to the value optimum of diversity combining information at that time. If communication between the wireless communication devices A and B is performed from a complete initial state, the wireless communication devices A and B transmit and receive a training signal to and from each other so that drawing into the value optimum of diversity combining information can be performed, as described later.

First, the wireless communication device A receives the first training frame 1 transmitted from each of the antennas $B_1, B_2, \ldots, B_N$ of the wireless communication device B through the M antennas $A_1, A_2, \ldots, A_M$, and returns an ACK frame relative to the frame 1. Each multiplier of the weight processing unit 11 multiplies each received signal from the antennas $A_1, A_2, \ldots, A_M$ by diversity combining information $W_{A1}, W_{A2}, \ldots, W_{AM}$. If the diversity combining information is "0," each multiplier outputs an input signal without changes, and, if the diversity combining information is "1," each multiplier allows an input signal to undergo phase inversion, and outputs the resulting signal. Information obtained by the nearest past training is used as the diversity combining information $W_{A1}, W_{A2}, \ldots, W_{AM}$ when the first training frame 1 is received. This diversity combining information $W_{A1}, W_{A2}, \ldots, W_{AM}$ can be regarded as a substantially value optimum even under the current state. However, the diversity combining information $W_{A1}, W_{A2}, \ldots, W_{AM}$ used at this time can be arbitrarily set. As described later, the diversity combining information $W_{A1}, W_{A2}, \ldots, W_{AM}$ is further updated to a value optimum through the diversity reception of a plurality of subsequent training frames 2-1 to 2-4.

The RF signal distributing/synthesizing unit 12 adds a received signal multiplied by the diversity combining information $W_{A1}, W_{A2}, \ldots, W_{AM}$ by the weight processing unit 11 so as to generate a received signal $R_A$.

Thereafter, only the diversity combining information $W_{A1}$ with respect to a signal of one antenna, e.g., with respect to a signal of the antenna $A_1$ is inverted ($0 \Leftrightarrow 1$) from the value optimum $W_{A1}$ of the preceding diversity combining information. The subsequent training frame 2-1 is received in a diversity reception manner by use of this new diversity combining information $W_{A1}, W_{A2}, \ldots, W_{AM}$, and an examination is made of whether the receiving state at this time has been made better than when the value optimums $W_{A1}, W_{A2}, \ldots, W_{AM}$ of the preceding diversity combining information are used. If the receiving state at this time has not been made better than when the value optimums $W_{A1}, W_{A2}, \ldots, W_{AM}$ of the preceding diversity combining information are used, the value optimums $W_{A1}, W_{A2}, \ldots, W_{AM}$ of the preceding diversity combining information are held without changes, and, if the receiving state at this time has been made better, the value optimums $W_{A1}, W_{A2}, \ldots, W_{AM}$ of the diversity combining information are updated to have the value obtained this time and are held. Accordingly, the value optimum $W_{A1}$ of the diversity combining information with respect to the signal of the antenna $A_1$ is determined.

Whether the receiving state has been improved can be determined by reception level information, such as a level of the received signal $R_A$, a gain of an AGC amplifier of a wireless receiving unit of the transmitting/receiving circuit 13, or a level obtained by converting it into level information, which serves as an indicator. Although the reception level information is not necessarily required to be proportional to the level of a received signal or its logarithm, the reception level information is required to have a monotone increasing relationship or a monotone decreasing relationship with the level of the received signal.

Thereafter, an ACK frame with respect to the training frame 2-1 is returned, and then the diversity combining information $W_{A1}$ with respect to the signal of the antenna $A_1$ determined above is allowed to remain without changes, and only the diversity combining information $W_{A2}$ with respect to a signal of any antenna excluding the antenna $A_1$, e.g., with respect to a signal of the antenna $A_2$ is inverted from the value optimum $W_{A2}$ of the preceding diversity combining information ($0 \Leftrightarrow 1$). The subsequent training frame 2-2 is received in a diversity reception manner by use of this new diversity combining information $W_{A1}, W_{A2}, \ldots, W_{AM}$, and an examination is made of whether the receiving state at this time has been made better than when the value optimums $W_{A1}, W_{A2}, \ldots, W_{AM}$ of the preceding diversity combining information are used. If the receiving state at this time has not been made better than when the value optimums $W_{A1}, W_{A2}, \ldots, W_{AM}$ of the preceding diversity combining information are used, the value optimums $W_{A1}, W_{A2}, \ldots, W_{AM}$ of the preceding diversity combining information is held without changes, and, if the receiving state at this time has been made better, the value optimums $W_{A1}, W_{A2}, \ldots, W_{AM}$ of the diversity combining information are updated to have the value obtained this time and are held. Accordingly, the value optimum $W_{A2}$ of the diversity combining information with respect to the signal of the antenna $A_2$ is determined.

Likewise, the training frames 2-3 and 2-4 are sequentially received, and, based on reception level information received at this time, the value optimums $W_{A3}$ and $W_{A4}$ of diversity combining information with respect to the signals of the antennas $A_3$ and $A_4$ are sequentially determined, respectively. In more detail, the training frame 2-3 transmitted from each of the antennas $B_1, B_2, \ldots, B_N$ of the wireless communication device B is received, and the value optimum $W_{A3}$ of diversity combining information with respect to the signal of the antenna $A_3$ is determined from a receiving state obtained at this time. Thereafter, the training frame 2-4 is received, and the value optimum $W_{A4}$ of diversity combining information with respect to the signal of the antenna $A_4$ is determined from a receiving state obtained at this time.

Every time the training frames 1, 2-1 to 2-M are sequentially received in this way, and ACK frames relative thereto are returned, the pieces of diversity combining information $W_{A1}, W_{A2}, \ldots, W_{AM}$ with respect to signals of the antennas $A_1, A_2, \ldots, A_M$ are sequentially changed (inverted) one by one. Receiving states at this time are determined, and the value optimums $W_{A1}, W_{A2}, \ldots, W_{AM}$ of diversity combining information are sequentially determined. According to this, the value optimums $W_{A1}, W_{A2}, \ldots, W_{AM}$ of diversity combining information with respect to signals of all antennas $A_1, A_2, \ldots, A_M$ can be determined by frame reception operations performed (the number M of antennas+1) times. Accordingly, in the wireless communication device A, the value optimums $W_{A1}, W_{A2}, \ldots, W_{AM}$ of diversity combining information with respect to signals of the antennas $A_1, A_2, \ldots, A_M$ can be determined.

Thereafter, the wireless communication device A transmits the training frames 1, 2-1 to 2-N to the wireless communication device B by use of the value optimums $W_{A1}, W_{A2}, \ldots, W_{AM}$ of diversity combining information. This time, the wireless communication device B receives the training frames 1, 2-1 to 2-N transmitted from each of the antennas $A_1, A_2, \ldots, A_M$ of the wireless communication device A, and the value optimums $W_{B1}, W_{B2}, \ldots, W_{BN}$ of diversity combining information with respect to signals of the antennas $B_1, B_2, \ldots, B_N$ are sequentially determined. This operation is the same as that of the wireless communication device A, and therefore a description of this operation is omitted. Furthermore, a two-way training signal transfer is performed between the wireless communication devices A and B, and, as a result, the value optimums $W_{A1}, W_{A2}, \ldots, W_{AM}, W_{B1}, W_{B2}, \ldots, W_{BN}$ of diversity combining information can be further optimized.

When data is transmitted and received, the wireless communication devices A and B perform beamforming and diversity combining by use of the value optimums $W_{A1}, W_{A2}, \ldots, W_{AM}, W_{B1}, W_{B2}, \ldots, W_{BN}$ of diversity combining information determined as above.

Figure 5:
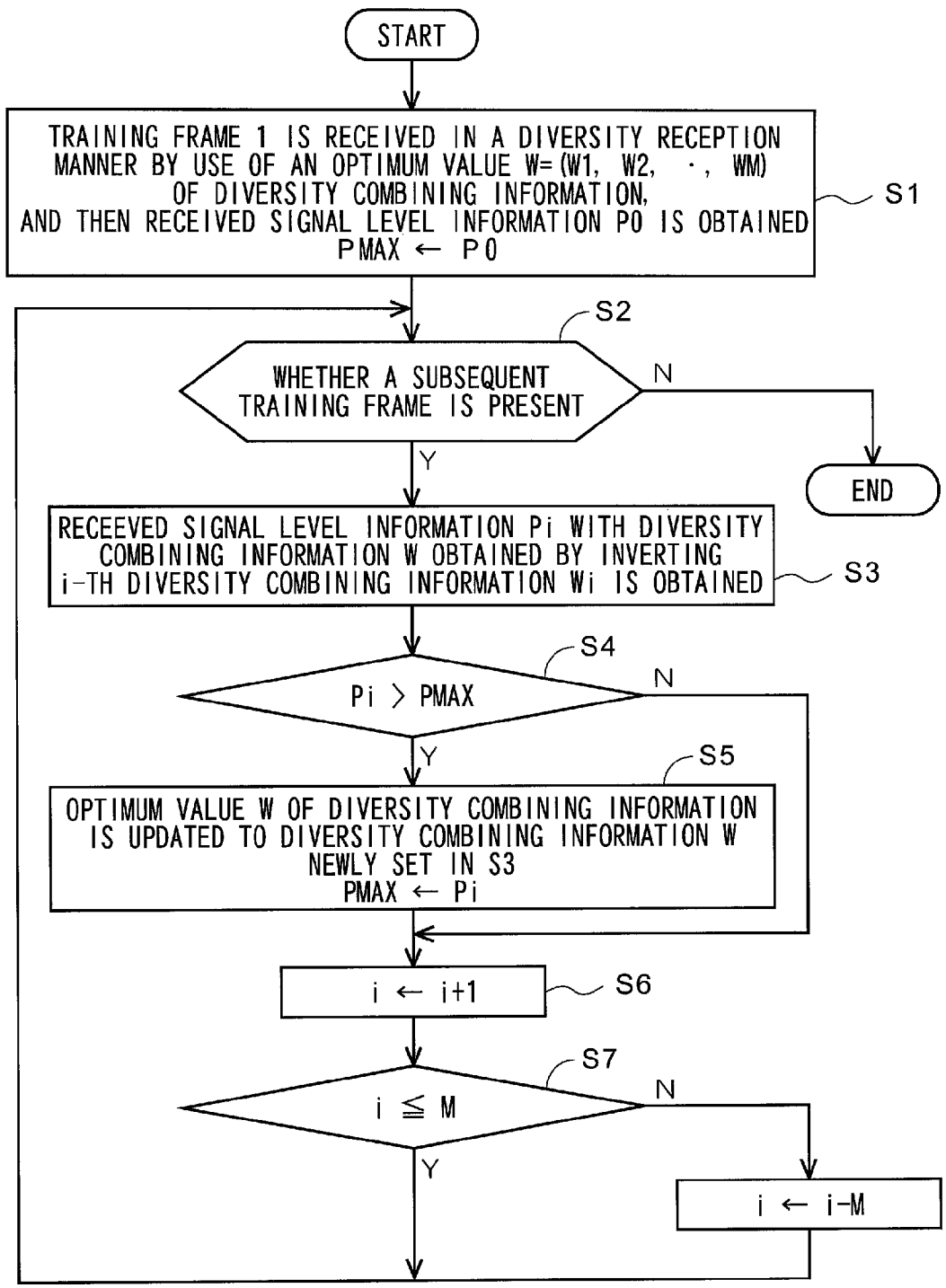
FIG. 5 is a flowchart showing a process of determining a value optimum of diversity combining information in a first embodiment.

FIG. 5 is a flowchart showing a process of determining the value optimum of diversity combining information in the wireless communication device A. Herein, a flow is shown in a case in which the number of antennas is M and in which a 1-bit phase shifter is used as a multiplier of the weight processing unit 11.

First, the foremost training frame 1 is received in a diversity reception manner by use of a value optimum $W=(W_1,$ $W_2, \ldots, W_M$) of diversity combining information, and then reception level information $P_0$ is obtained, and this information $P_0$ is held as the maximum value $P_{MAX}$ of reception level information. Additionally, 1 is substituted for variable i (i←1) (S1). Variable i prescribes that a loop consisting of the following steps is performed M times that correspond to the number M of antennas. $W=(W_1, W_2, \ldots, W_M)$ is an initial value optimum of diversity combining information. Herein, it is supposed that the multiplier of the weight processing unit 11 is a 1-bit phase shifter, and hence each of the value optimums $W_1, W_2, \ldots, W_M$ of diversity combining information is one bit (i.e., "0" or "1").

Thereafter, it is determined whether a subsequent training frame is present (S2). If it is determined that a subsequent training frame is present in S2, the process proceeds to S3, and, if it is determined that a subsequent training frame is not present, training is ended. In S3, a training frame is received by diversity combining information W obtained by inverting i-th diversity combining information $W_i$ ("-th" is a suffix used to form an ordinal number), and reception level information $P_i$ at that time is obtained.

Thereafter, the reception level information $P_i$ is compared with the maximum value $P_{MAX}$ of reception level information obtained up to this time (S4). If $P_i > P_{MAX}$, the value optimum W of diversity combining information is updated to diversity combining information W newly set in S3. At the same time, the maximum value $P_{MAX}$ of reception level information is updated to the reception level information $P_i$ (S5). Thereafter, the process proceeds to S6. If a comparison result obtained in S4 is not $P_i > P_{MAX}$, the process proceeds to S6 without updating the value optimum W of diversity combining information. In S6, an increment of 1 is given to variable i (i←i+1). Thereafter, it is determined whether variable i is the number M of antennas or smaller (S7). If it is determined in S7 that variable i is smaller than the number M of antennas, the process returns to S2 in which processing is repeatedly performed. If it is determined that variable i is not smaller than the number M of antennas, i–M is substituted for variable i (i←i–M), i.e., variable i is allowed to be 1 again. Thereafter, the process returns to S2 in which processing is repeatedly performed.

Through the foregoing flow, the pieces of diversity combining information $W_{A2}, W_{A3}, \ldots, W_{AM}$ with respect to the signal of each of the antennas $A_1, A_2, \ldots, A_M$ can be optimized one by one every time training frames following the first training frame 1 are received. Therefore, when the number of antennas is M, the diversity combining information $W=(W_1, W_2, \ldots, W_M)$ can be optimized by the diversity reception of (M+1) training frames in total.

Diversity combining information $W_{B1}, W_{B2}, \ldots, W_{BN}$ with respect to the signal of each of the antennas $B_1, B_2, \ldots, B_N$ in the wireless communication device B can be optimized by the diversity reception of (N+1) training frames in total in accordance with the same flow.

If an ACK frame is not returned during training, training is ended there. In order to perform training again, it is recommended to perform training continuously from the time at which training has been ended. This can be achieved by holding variable i at the time at which the last training has been ended and setting this variable i when the next training is performed.

As described above, in the wireless communication system of the present invention, each value optimum of diversity combining information is determined through a two-way training signal transfer between two wireless communication devices, and beamforming and diversity combining for a time of data transmission/reception are performed by use of the thus determined diversity combining information.

Although the first training frame 1 in training can be received by substantially optimal diversity combining, diversity combining information is intentionally deviated from a substantially optimal value in reception after the training frame 2-1 subsequent to that frame, and therefore there is a possibility that the reception level will be lowered. A case in which most of the training frame 2-1 and the sequent frames cannot be received will be caused especially in the periphery of a communication area in which communication can be barely exchanged by optimal diversity combining reception. In this case, if an ACK frame is assumed to be returned to each training frame as shown in FIG. 4, training will be ended by one training frame, i.e., will be ended only by the training frame 1.

However, even in this case, training can be performed in the periphery of the communication area if an antenna optimized by receiving the first training frame 2-1 among the training frame 2-1 and the sequent frames is not fixed as a first antenna, and if training is started from an antenna subsequent to an antenna by which training has been performed last time. Nevertheless, in this case, diversity combining information cannot be optimized by one-time training, and training is required to be performed a plurality of times including training frames the number of which exceeds at least the number of antennas. If training frames corresponding to the predetermined number of antennas are always transmitted subsequently to the training frame 1 without using ACK frames, or if symbols that correspond to the number of antennas and that are contained in a preamble of a header of a data frame are used, training can, of course, be performed in the periphery of the communication area.

Pieces of diversity combining information about wireless communication devices performing transmission and reception are each optimized through a two-way training signal transfer between the wireless communication devices, and therefore beamforming and diversity combining are performed by use of this diversity combining information when data is transmitted and received, and, as a result, data can be transferred while concentrating all energy on a proper transmission line corresponding to the maximum eigenvalue of a transmission line matrix formed of a transfer function between antennas of the two wireless communication devices, and a large MIMO gain can be obtained. Therefore, it is possible to not only widen a communication service area but also improve the quality of two-way real-time communication, such as audio communication. The MIMO gain includes a transmitting antenna gain, a receiving antenna gain, and a diversity gain.

The present invention shares a common feature with the conventional MIMO technology in the idea that data is transferred while concentrating all energy on a proper transmission line corresponding to the maximum eigenvalue of a transmission line matrix in wireless communication. However, in the present invention, value optimums of diversity combining information are determined through a two-way training signal transfer without calculating the correlation matrix of a transmission line matrix or without calculating an eigenvector corresponding to the maximum eigenvalue of a correlation matrix, and therefore MIMO can be realized without increasing the calculation amount and the calculation time to determine the value optimum of diversity combining information, without increasing an information transfer for sharing channel information between both wireless communication devices, and without increasing the number of transmitting/receiving circuits having great power consumption. Accordingly, a limitation on the number of antennas can be reduced, and a MIMO gain can be easily increased.

Figure 6:
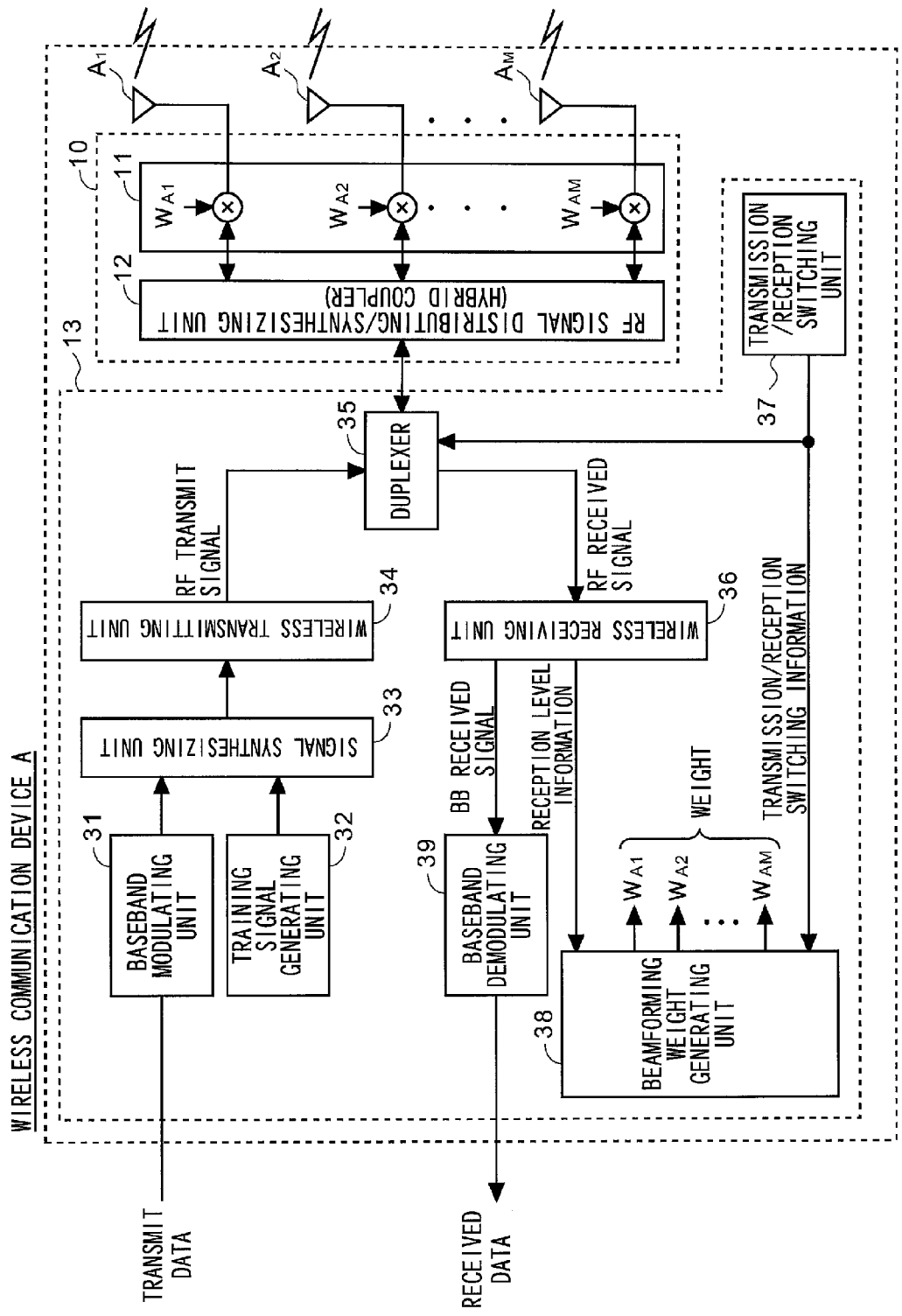
FIG. 6 is a block diagram showing a structure of the first embodiment of a wireless communication device according to the present invention.

FIG. 6 is a block diagram showing a structure of the first embodiment of a wireless communication device according to the present invention. In FIG. 6, the same reference numeral is given to the same or equivalent element as in FIG. 1. In the first embodiment, the multiplier of the weight processing unit 11 of the wireless communication device is a 1-bit phase shifter. An n-bit phase shifter (n is a natural number of two or greater) can be used as the multiplier of the weight processing unit 11, and an embodiment using this shifter will be described later. Although the wireless communication device A is shown herein, the wireless communication device B has the same structure as the wireless communication device A.

The wireless communication device A of this embodiment includes M antennas $A_1$ to $A_M$ (M is an integer of 2 or greater), a diversity circuit 10, and a transmitting/receiving circuit 13. The diversity circuit 10 includes the weight processing unit 11 and the RF signal distributing/synthesizing unit 12. The diversity circuit 10 performs beamforming and diversity combining by use of the value optimum of diversity combining information, and transmits and receives training signals or data.

The transmitting/receiving circuit 13 includes a baseband modulating unit 31, a training signal generating unit 32, a signal synthesizing unit 33, a wireless transmitting unit 34, a duplexer 35, a wireless receiving unit 36, a transmission/reception switching unit 37, a beamforming weight generating unit 38, and a baseband demodulating unit 39. The constituent elements excluding the weight processing unit 11 and the beamforming weight generating unit 38 are used in a generally-used wireless communication device. Herein, the diversity circuit 10 is operated in an RF band, so that the only one transmitting/receiving circuit 13 is used. In other words, the wireless communication device A performs multi-antenna beamforming and multi-antenna diversity reception by use of only one transmission/reception system.

The baseband modulating unit 31 receives the input of transmit data, and outputs a modulation signal. The modulation signal is a baseband IQ signal. This baseband IQ signal is input to the wireless transmitting unit 34 via the signal synthesizing unit 33.

The training signal generating unit 32 generates a training signal required to execute training and allow an opposite wireless communication device to perform beamforming. The training signal generated here is a baseband IQ signal. This baseband IQ signal is also input to the wireless transmitting unit 34 via the signal synthesizing unit 33.

The baseband modulating unit 31 can be used not only for modulating transmit data but also for modulating a training signal, and therefore the structure can be made simple, and costs and power consumption can be reduced.

The signal synthesizing unit 33 temporally synthesizes a baseband IQ signal emitted from the baseband modulating unit 31 and a baseband IQ signal emitted from the training signal generating unit 32, and outputs the resulting signal. When a baseband IQ signal is output from the baseband modulating unit 31, the signal synthesizing unit 33 outputs this signal as a baseband transmission IQ signal, and, when a baseband IQ signal is output from the training signal generating unit 32, the signal synthesizing unit 33 outputs this signal. Practically, it is permissible to provide a training-transmission-data generating unit, and apply a signal obtained by temporally synthesizing this output signal and transmit data to the baseband modulating unit 31, and give this output signal directly to the wireless transmitting unit 34.

The wireless transmitting unit 34 subjects a signal input through the signal synthesizing unit 33 to frequency conversion into an RF band, and inputs the resulting signal to the duplexer 35 as an RF transmit signal. In other words, the wireless transmitting unit 34 subjects transmit data and a training signal to frequency conversion into an RF band.

The duplexer 35 performs switching between the transmission of RF transmit signals and the reception of RF received signal s in a TDD (Time Division Duplex) transfer. For example, transmission/reception switching information, which becomes "1" during transmission and which becomes "0" during reception, is received from the transmission/reception switching unit 37. If the transmission/reception switching information is "1," an RF transmit signal emitted from the wireless transmitting unit 34 is output to the RF signal distributing/synthesizing unit 12, and, if the transmission/reception switching information is "0," an RF received signal emitted from the RF signal distributing/synthesizing unit 12 is output to the wireless receiving unit 36.

The wireless receiving unit 36 receives the input of an RF received signal from the duplexer 35, then subjects this signal to frequency conversion, and outputs the resulting signal. The wireless receiving unit 36 outputs reception level information about each training frame of the RF received signal. In detail, the wireless receiving unit 36 demodulates RF received data to a baseband IQ signal, and obtains reception level information from each training frame of a training signal. When reception level information is obtained after demodulating a training signal to a baseband IQ signal, the demodulation of RF received data and the demodulation of an RF training signal can be performed by a single demodulator.

Reception level information is input to the beamforming weight generating unit 38. No limitations are imposed on reception level information if this information is concerned with the reception level of each training frame of a diversity-combining received signal. Therefore, it is possible to use, for example, RSSI (Received Signal Strength Information) information, information obtained by converting this RSSI information into a level, a gain of an AGC amplifier of the wireless receiving unit 36, or information obtained by converting this gain into a level. These pieces of information can be obtained from the wireless receiving unit 36. In other words, the wireless receiving unit 36 has a structure that functions as a "reception-state determining unit" in the wireless communication device of the present invention.

The transmission/reception switching unit 37 is a part of a wireless access control unit that is an indispensable component of the wireless communication device, and outputs transmission/reception switching information, for example, which becomes "1" during transmission and which becomes "0" during reception, to the duplexer 35 and to the beamforming weight generating unit 38.

Based on transmission/reception switching information output from the transmission/reception switching unit 37, the beamforming weight generating unit 38 generates pieces of diversity combining information $W_{A1}, W_{A2}, \ldots, W_{AM}$ that are different from each other with respect to each training frame of a training signal, and, based on reception level information output from the wireless receiving unit 36, the beamforming weight generating unit 38 determines the value optimums $W_{A1}, W_{A2}, \ldots, W_{AM}$ of diversity combining information. The value optimums $W_{A1}, W_{A2}, \ldots, W_{AM}$ of diversity combining information generated here are given to each multiplier of the weight processing unit 11. The details of the beamforming weight generating unit 38 will be described later. The beamforming weight generating unit 38 functions as a "diversity combining information generating unit," as a "diversity combining information determining unit," and as a "diversity combining information value optimum setting unit" in the wireless communication device of the present invention.

The baseband demodulating unit 39 demodulates a baseband (BB) reception IQ signal emitted from the wireless receiving unit 36, and sends received data. The baseband demodulating unit 39 can be used not only for demodulating received data but also for demodulating a training signal, and therefore the structure can be made simple, and costs and power consumption can be reduced.

The weight processing unit 11 applies weight processing to an RF received signal and to an RF transmit signal in accordance with the value optimums $W_{A1}, W_{A2}, \ldots, W_{AM}$ of diversity combining information given from the beamforming weight generating unit 38. In more detail, the weight processing unit 11 applies weight processing to an RF received signal of each of the antennas $A_1$ to $A_M$, and outputs the resulting signal to the RF signal distributing/synthesizing unit 12, whereas the weight processing unit 11 applies weight processing to an RF transmit signal emitted from the RF signal distributing/synthesizing unit 12, and outputs the resulting signal to each of the antennas $A_1$ to $A_M$. The weight processing in the weight processing unit 11 can be realized by 0-degree or 180-degree-phase-shifting processing by use of the 1-bit phase shifter. The weight processing unit 11 functions as a "diversity combining information setting unit" in the wireless communication device of the present invention.

The RF signal distributing/synthesizing unit 12 distributes and synthesizes RF transmit/received signals. In more detail, the RF signal distributing/synthesizing unit 12 receives the input of M RF received signals from the weight processing unit, and outputs a signal obtained by synthesizing these signals to the duplexer 35, whereas the RF signal distributing/synthesizing unit 12 receives the input of an RF transmit signal from the duplexer 35, and outputs M distributions of the signal to the weight processing unit 11. The level of the RF received signal, which is synthesized by the RF signal distributing/synthesizing unit 12 and is then output to the duplexer 35, becomes $1/\sqrt{M}$ by impedance conversion in the weight processing unit 11, whereas the level of the RF transmit signal, which undergoes M distributions and is then output to the weight processing unit 11, becomes $1/\sqrt{M}$ with respect to the level of the RF transmit signal emitted from the duplexer 35. The RF signal distributing/synthesizing unit 12 functions as a "signal distributing/synthesizing unit" in the wireless communication device of the present invention.

Figure 7:
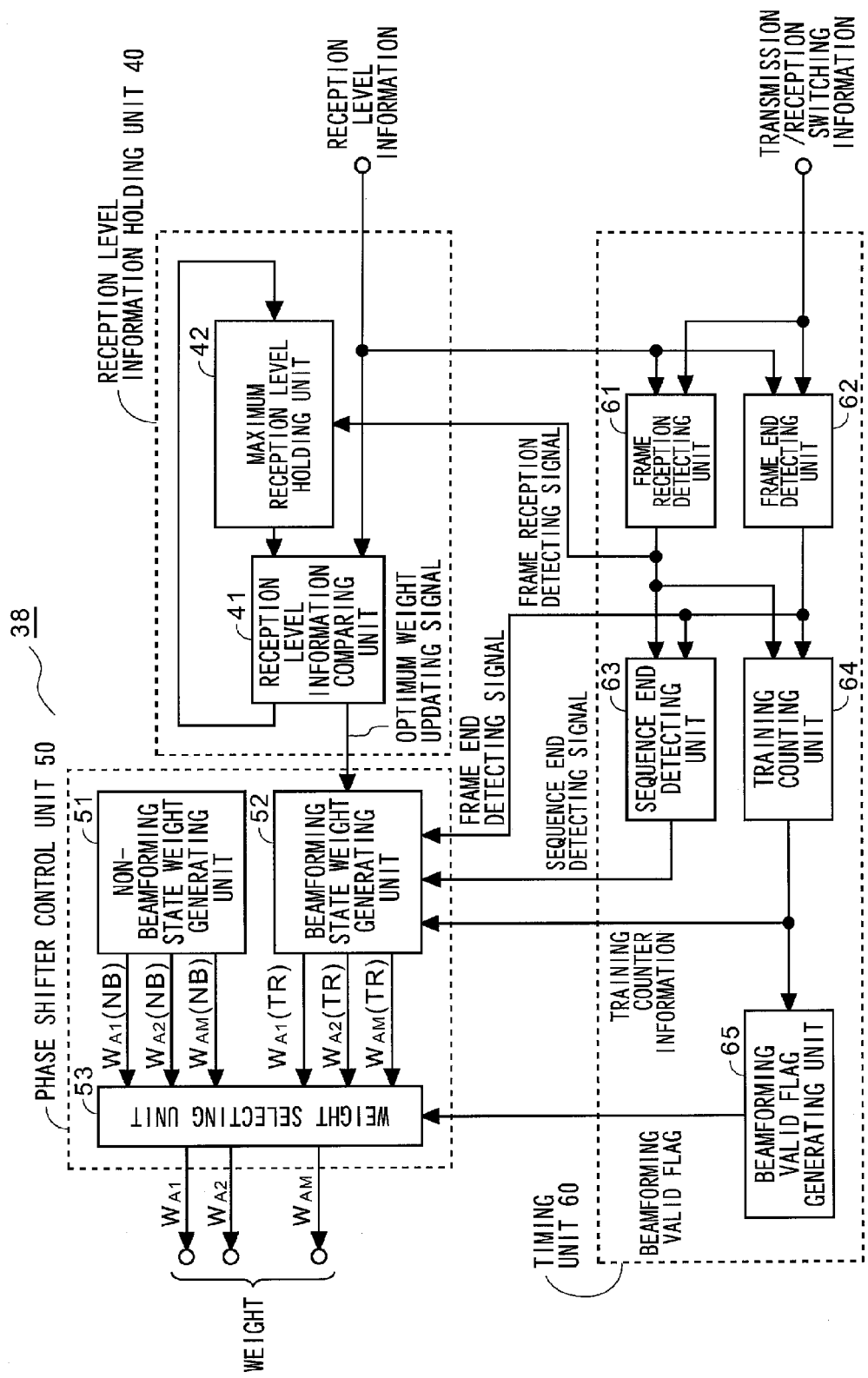
FIG. 7 is a block diagram showing a concrete structure of a weight generating unit for beamforming in the first embodiment.

FIG. 7 is a block diagram showing a concrete structure of the beamforming weight generating unit 38. The beamforming weight generating unit 38 includes a reception level information holding unit 40, a phase shifter control unit 50, and a timing unit 60, and determines the value optimum of diversity combining information for beamforming and diversity combining through a two-way training signal transfer.

The reception level information holding unit 40 includes a reception level information comparing unit 41 and a maximum reception level holding unit 42.

The reception level information comparing unit 41 compares reception level information about each training frame of a training signal with reception level information held by the maximum reception level holding unit 42. If reception level information that has been newly input is greater, the reception level information held by the maximum reception level holding unit 42 is updated to this greater reception level information, and an optimum weight updating signal is output to a beamforming state weight generating unit 52 of the phase shifter control unit 50. Reception level information of the foremost training frame of a training signal is used as an initial value for finding the maximum reception level information.

The reception level information held by the maximum reception level holding unit 42 is sequentially updated to greater reception level information, and becomes the maximum reception level information at the end of training.

The phase shifter control unit 50 includes a non-beamforming state weight generating unit 51, the beamforming state weight generating unit 52, and a weight selecting unit 53.

In order to perform drawing from a complete initial state to the value optimum of diversity combining information, it is necessary to first receive a training signal containing at least (the number of antennas+1) training frames from an opposite wireless communication device disposed on an opposite side of a communication link. However, a training signal transmitted by the opposite wireless communication device cannot be necessarily received from the first. Therefore, the opposite wireless communication device is contrived to be able to receive at least one training signal ((the number of antennas+1) training frames) transmitted by an own wireless communication device even in a complete initial state. This can be achieved by transmitting a plurality of training signals and by allowing the opposite wireless communication device to receive any one of the training signals by use of pieces of diversity combining information $W_{A1}, W_{A2}, \ldots, W_{AM}$ that differ from each other. The non-beamforming state weight generating unit 51 generates diversity combining information $W_{A1}(NB), W_{A2}(NB), \ldots, W_{AM}(NB)$ for such a time of non-beamforming. Preferably, the pieces of diversity combining information $W_{A1}, W_{A2}, \ldots, W_{AM}$ are changed each time training signals are transmitted although the pieces of diversity combining information $W_{A1}, W_{A2}, \ldots, W_{AM}$ are arbitrary when the training signals are transmitted. In a CSMA (Carrier Sense Multiple Access) system, pieces of diversity combining information $W_{A1}, W_{A2}, \ldots, W_{AM}$ for a time of non-beamforming and for a time of non-transmission/reception are temporally changed at random, and these pieces of diversity combining information $W_{A1}, W_{A2}, \ldots, W_{AM}$ at the transmission start time of a training signal can be used in transmitting this training signal. More specifically, if the number of antennas is M, an M-bit counter is operated by a free-running clock, and M counter values can be used as pieces of diversity combining information $W_{A1}, W_{A2}, \ldots, W_{AM}$, respectively. It is recommended to set a time interval for this random change at, for example, about 1 μs.

The opposite wireless communication device receives any one of the training signals, then determines the value optimum of diversity combining information, then sets this value optimum, then subjects the training signal to beamforming, and outputs the resulting signal, thus enabling the own wireless communication device to receive the training signal. If it is possible to receive any one of the training signals transmitted by use of diversity combining information that has been changed at random in the same way from the opposite wireless communication device, the drawing into the value optimum of diversity combining information without changes is performed in the own wireless communication device.

The beamforming state weight generating unit 52 sequentially changes each information $W_{Ai}(TR)$ of the diversity combining information $W_{A1}(TR), W_{A2}(TR), \ldots, W_{AM}(TR)$ for each frame in accordance with training counter information emitted from a training counting unit 64, and holds each diversity combining information $W_{Ai}(TR)$ when an optimum weight updating signal is output from the reception level information comparing unit 41. Preferably, an initial value optimum of the diversity combining information $W_{A1}(TR)$, $W_{A2}(TR)$, ..., $W_{AM}(TR)$ is set as a value obtained by the nearest past training. The reason is that its diversity combining information is considered to be substantially optimal.

The weight selecting unit 53 selects diversity combining information $W_{A1}(NB)$, $W_{A2}(NB)$, ..., $W_{AM}(NB)$ output from the non-beamforming state weight generating unit 51 or diversity combining information $W_{A1}(TR)$, $W_{A2}(TR)$, ..., $W_{AM}(TR)$ output from the beamforming state weight generating unit 52 based on a beamforming valid flag, and outputs the information as diversity combining information $W_{A1}$, $W_{A2}$, ..., $W_{AM}$.

Although the beamforming valid flag is "invalid" (for example, "0") in an initial state, the beamforming valid flag becomes "valid" (for example, "1") by receiving a training frame a predetermined number of times, e.g., (the number of antennas+1) times. If training frames cannot be received sufficiently (for example, (the number of antennas+1) times or more) during a predetermined period, e.g., during a period of 100 ms, the beamforming valid flag may be set as "invalid."

As a result, the weight selecting unit 53 selects diversity combining information $W_{A1}(NB)$, $W_{A2}(NB)$, ..., $W_{AM}(NB)$ until a training frame is received a predetermined number of times, and, after that, selects diversity combining information $W_{A1}(TR)$, $W_{A2}(TR)$, ..., $W_{AM}(TR)$.

The timing unit 60 includes a frame reception detecting unit 61, a frame end detecting unit 62, a sequence end detecting unit 63, the training counting unit 64, and a beamforming valid flag generating unit 65.

The frame reception detecting unit 61 receives the input of transmission/reception switching information and reception level information, and outputs a frame reception detecting signal. The transmission/reception switching information is a signal that becomes "1," for example, during a period during which the wireless transmitting unit 34 becomes "enabled" and that becomes "0" during a period during which the wireless receiving unit 36 becomes "enabled." The reception level information is RSSI (Received Signal Strength Information) information, or is information about, for example, a gain of the AGC amplifier of the wireless receiving unit 36. Based on the detection of an increase in the reception level of the wireless receiving unit 36 during an enabled period, the frame reception detecting unit 61 generates a frame reception detecting signal.

The frame reception detecting signal is given to the maximum reception level holding unit 42, to the sequence end detecting unit 63, and to the training counting unit 64. The frame reception detecting signal is a signal showing the reception start of each training frame, and is a pulse having a predetermined width (for example, 1 μs) generated in, for example, a state in which the reception start timing of each training frame detected based on an increase in reception level information is used as a trigger.

The frame end detecting unit 62 receives the input of transmission/reception switching information and reception level information, and outputs a frame end detecting signal to the beamforming state weight generating unit 52. The frame end detecting signal is a signal showing the reception end of each training frame, and is a pulse having a predetermined width (for example, 1 μs) generated in, for example, a state in which the reception end timing of each training frame detected based on a decrease in reception level information is used as a trigger. If ACK frames are used in a training sequence, the transmission end of ACK frames may be detected by use of transmission/reception switching information, and, while using this as a trigger, a pulse having the predetermined width mentioned above may be generated.

The transmission/reception switching information is information showing a state of the wireless communication device, such as a transmitting state, a receiving state, or a power save state. The frame reception detecting unit 61 and the frame end detecting unit 62 can detect the reception start of training frames and the reception end of training frames by use of reception level information when the transmission/reception switching information is in a receiving state.

The sequence end detecting unit 63 outputs a sequence end detecting signal to the beamforming state weight generating unit 52. The sequence end detecting signal is a signal showing the end of training, and is a pulse having a predetermined width (for example, 1 μs) generated according to a timing at a time point at which it is detected that a pulse of a frame reception detecting signal is not generated, for example, during a fixed period (for example, 30 μs) after a pulse of a frame end detecting signal is generated. If ACK frames are used in a training sequence, the transmission end of ACK frames may be detected by use of transmission/reception switching information, and, while using this as a trigger, a pulse having the predetermined width mentioned above may be generated.

If an ACK frame is returned to each training frame as shown in the example of FIG. 4, an error occurs by a received training frame, and, if an ACK frame is not returned thereto, training is ended at that time. In correlation with this, even if transmission/reception switching information remains in a receiving state without shifting to a transmitting state when an ACK-frame return timing is reached, a pulse of a sequence end detecting signal may be generated.

The training counting unit 64 outputs training counter information to the beamforming state weight generating unit 52 and a beamforming flag generating unit 65. The training counter information is count information about the number of frames in a training signal, and is generated, for example, by making a one-by-one increment of the count value of the counter in accordance with a frame end detecting signal and by clearing the count value of the counter to "0" in accordance with a sequence end detecting signal.

The beamforming valid flag generating unit 65 outputs a beamforming valid flag showing that a training frame has been received a predetermined number of times to the weight selecting unit 53. The beamforming valid flag is generated based on training counter information emitted from the training counter 64. If the beamforming valid flag is invalid, the weight selecting unit 53 selects diversity combining information $W_{A1}(NB)$, $W_{A2}(NB)$, ..., $W_{AM}(NB)$ emitted from the non-beamforming state weight generating unit 51, and, if the beamforming valid flag is valid, the weight selecting unit 53 selects diversity combining information $W_{A1}(TR)$, $W_{A2}(TR)$, ..., $W_{AM}(TR)$ emitted from the beamforming state weight generating unit 52.

The phase shifter control unit 50 basically operates to find diversity combining information $W_{A1}(TR)$, $W_{A2}(TR)$, ..., $W_{AM}(TR)$ when reception level information reaches the maximum level through training. In other words, in a receiving side wireless communication device, each diversity combining information $W_{Ai}(TR)$ of the diversity combining information $W_{A1}(TR)$, $W_{A2}(TR)$, ..., $W_{AM}(TR)$ is changed for each training frame, and diversity combining information $W_{A1}(TR)$, $W_{A2}(TR)$, ..., $W_{AM}(TR)$ obtained when the reception level information becomes great during that process is held. When training is ended, diversity combining information $W_{A1}(TR)$, $W_{A2}(TR)$, ..., $W_{AM}(TR)$ obtained when the reception level information reaches the maximum level is held. In a two-way data transfer subsequent to training, the diversity combining information $W_{A1}(TR)$, $W_{A2}(TR)$, ..., $W_{AM}(TR)$ held at that time is read and given to the weight processing unit.

FIG. 8 is a timing chart showing an example of the operation of the beamforming weight generating unit 38 of FIG. 7, and FIG. 9A, FIG. 9B and FIG. 9C are views showing the circumstances in which signals A1, A2, A3, and A4 of the antennas $A_1$, $A_2$, $A_3$, and $A_4$ are subjected to diversity combining (vector addition) so that a diversity-combining received signal is generated. Herein, a case is assumed in which the number of antennas of the wireless communication device is four, and each of the pieces of diversity combining information $W_{A1}$, $W_{A2}$, $W_{A3}$, and $W_{A4}$ with respect to the signals of the antennas $A_1$, $A_2$, $A_3$, and $A_4$ is 1-bit information. Additionally, it is assumed that the value of reception level information becomes greater in proportion to an increase in the reception level. In this case, the weight processing unit is composed of 1-bit phase shifters that meet the number of antennas, and each of the phase shifters is controlled to have a phase-shifting amount of 0 degrees, for example, when diversity combining information is "0" and to have a phase-shifting amount of 180 degrees when diversity combining information is "1" in accordance with 1-bit diversity combining information $W_{A1}$, $W_{A2}$, $W_{A3}$, and $W_{A4}$.

The wireless communication device receives a training frame 1 transmitted from an opposite wireless communication device in a diversity reception manner by use of the current diversity combining information $W_{A1}$, $W_{A2}$, $W_{A3}$, and $W_{A4}$, and sequentially receives training frames 2-1 to 2-4 in a diversity reception manner while changing each diversity combining information $W_A$, of the diversity combining information $W_{A1}$, $W_{A2}$, $W_{A3}$, and $W_{A4}$. Based on the reception level information at that time, the value optimums $W_{A1}$, $W_{A2}$, $W_{A3}$, and $W_{A4}$ of the diversity combining information are finally determined. The value optimums $W_{A1}$, $W_{A2}$, $W_{A3}$, and $W_{A4}$ of the diversity combining information determined in this way are used for beamforming and diversity combining for a time of data transmission/reception.

The training frame 1 is a foremost frame by which training is actually executed. Training is started after receiving this frame, and reception level information at that time is measured. The training frame 1 is allowed to contain pieces of information, such as a source address, a destination address, and a frame type, and the use of this frame makes it possible to obtain reception level information when diversity reception is performed by the current diversity combining information. The subsequent training frames 2-1 to 2-4 are used to measure reception level information obtained when diversity combining information is changed in accordance with a predetermined algorithm and is received in a diversity reception manner.

When gain control is started in the AGC amplifier of the wireless receiving unit, reception level information is usually changed in a comparatively short time (for example, 10 μs). The gain control of the AGC amplifier occurs even in the reception start or the reception end of the training frame, and, except for this, occurs because of, for example, the influence of noises. If a failure is caused in the reception of a frame header after the gain control of the AGC amplifier is started by the reception start of the training frame, there is also a case in which the gain control of the AGC amplifier is started a plurality of times during the frame reception period. When reception level information is measured, consideration is given to these points.

Figure 9A:
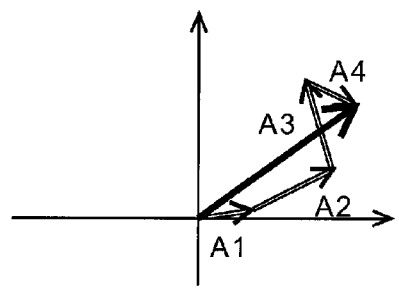
FIG. 9A is a view showing the circumstances in which a diversity-combining received signal is generated in the first embodiment.

First, when training counter information is "0," the beamforming state weight generating unit 52 generates diversity combining information 0 ($W_1=1$, $W_2=0$, $W_3=1$, $W_4=1$), and receives a training frame 1 emitted from the opposite wireless communication device in a diversity reception manner by use of this diversity combining information 0. Preferably, the diversity combining information 0 is, for example, information that has been obtained by the nearest past training and that has been used when the previous data frame is received. The reason is that, in a case in which beamforming has been performed in the past, diversity combining information at that time is considered to be also substantially optimal this time. If beamforming has not been performed in the past, arbitrary diversity combining information can be used. Reception level information (100) at this time is held by the maximum reception level holding unit 42. FIG. 9A shows the diversity combining (vector addition) of received signals of the antennas $A_1$, $A_2$, $A_3$, and $A_4$ at this time. The reception level information before receiving the frame 1 is "5." This corresponds to a thermal noise level. Reception level information during the period from the reception of the training frame 1 to the reception of the subsequent training frame 2-1 is lowered to "3." This also corresponds to a thermal noise level. In the subsequent training frames, thermal noises occur during the reception of the training frames in the same way as above.

Figure 9B:
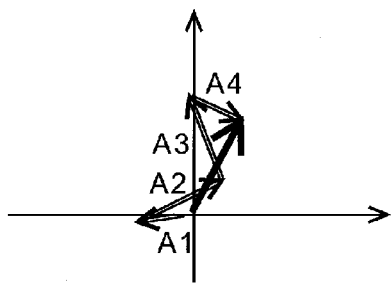
FIG. 9B is a view showing the circumstances in which a diversity-combining received signal is generated in the first embodiment.

Thereafter, when the frame end of the training frame 1 is detected, the training counter information becomes "1," and the beamforming state weight generating unit 52 generates diversity combining information 1 ($W_1=0$, $W_2=0$, $W_3=1$, $W_4=1$). The diversity combining information 1 has a structure in which only diversity combining information $W_1$ is inverted. Reception level information (88) when the training frame 2-1 is received by use of the diversity combining information 1 is lower than reception level information (100) obtained by use of the diversity combining information 0. FIG. 9B shows the diversity combining of received signals of the antennas $A_1$, $A_2$, $A_3$, and $A_4$ at this time. This change in the reception level information is caused not by a change in the transmission line but by a change in the diversity combining information. Reception level information (88) obtained by use of the diversity combining information 1 is lower than reception level information (100) obtained by use of the diversity combining information 0, and hence the diversity combining information $W_1$ is determined to be "1." The reception level information held by the maximum reception level holding unit 42 is "100," and is not updated.

Figure 9C:
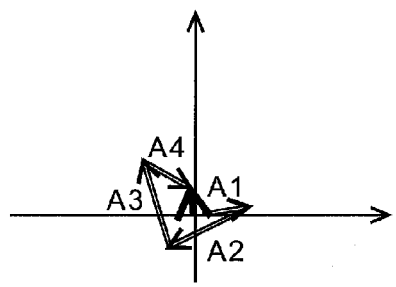
FIG. 9C is a view showing the circumstances in which a diversity-combining received signal is generated in the first embodiment.

Thereafter, when the training counter information becomes "2," the beamforming state weight generating unit 52 generates diversity combining information 2 ($W_1=1$, $W_2=1$, $W_3=1$, $W_4=1$). The diversity combining information 2 has a structure in which only diversity combining information $W_2$ is inverted in the diversity combining information 0. Likewise, reception level information (70) when the training frame 2-2 is received by use of the diversity combining information 2 is lower than the reception level information (100) obtained by use of the diversity combining information 0. FIG. 9C shows the diversity combining of received signals of the antennas $A_1$, $A_2$, $A_3$, and $A_4$ at this time. Reception level information (70) obtained by use of the diversity combining information 2 is likewise lower than reception level information (100) obtained by use of the diversity combining information 0, and hence the diversity combining information $W_2$ is determined to be "0." The reception level information held by the maximum reception level holding unit 42 is "100," and is not updated.

Figure 9D:
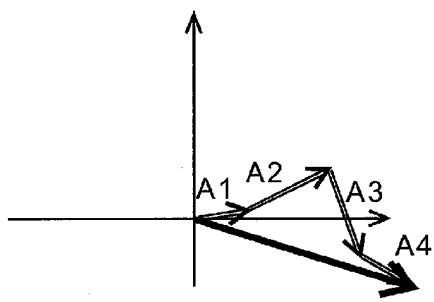
FIG. 9D is a view showing the circumstances in which a diversity-combining received signal is generated in the first embodiment.

Thereafter, when the training counter information becomes "3," the beamforming state weight generating unit 52 generates diversity combining information 3 ($W_1=1$, $W_2=0$, $W_3=0$, $W_4=1$). The diversity combining information 3 has a structure in which only diversity combining information $W_3$ is inverted in the diversity combining information 0. Reception level information (102) when the training frame 2-3 is received by use of the diversity combining information 3 is higher than the reception level information (100) obtained by use of the diversity combining information 0. FIG. 9D shows the diversity combining of received signals of the antennas $A_1$, $A_2$, $A_3$, and $A_4$ at this time. The reception level information (102) obtained by use of the diversity combining information 3 is higher than the reception level information (100) obtained by use of the diversity combining information 0, and hence the diversity combining information $W_3$ is determined to be "0." The reception level information held by the maximum reception level holding unit 42 is updated to "102." An optimum weight updating signal is output when reception level information of the training frame 2-1 and frames subsequent to the training frame 2-1 exceeds the previous maximum reception level information after frame reception detecting signals of these training frames are output. An optimum weight updating signal is output from the reception level information comparing unit 41 while the training frame 2-3 is being received, and hence the beamforming state weight generating unit 52 stores the diversity combining information 3 ($W_1=1$, $W_2=0$, $W_3=0$, $W_4=1$).

Figure 9E:
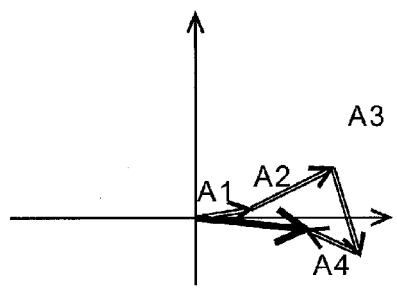
FIG. 9E is a view showing the circumstances in which a diversity-combining received signal is generated in the first embodiment.

Thereafter, when the training counter information becomes "4," the beamforming state weight generating unit 52 generates diversity combining information 4 ($W_1=1$, $W_2=0$, $W_3=0$, $W_4=0$). The diversity combining information 4 has a structure in which only diversity combining information $W_4$ is inverted in the diversity combining information 3. Reception level information (90) when the training frame 2-4 is received by use of the diversity combining information 4 is lower than the reception level information (102) obtained by use of the diversity combining information 3. FIG. 9E shows the diversity combining of received signals of the antennas $A_1$, $A_2$, $A_3$, and $A_4$ at this time. The reception level information (90) obtained by use of the diversity combining information 4 is lower than the reception level information (102) obtained by use of the diversity combining information 3, and hence the diversity combining information $W_4$ is determined to be "1." The reception level information held by the maximum reception level holding unit 42 is "102," and is not updated.

When a frame end detecting signal with respect to the training frame 2-4 is output, the training counter information becomes "5," and in preparation for reception of the subsequent training frame, a change is made to the diversity combining information $W_1=0$, $W_2=0$, $W_3=0$, and $W_4=1$ in which only the diversity combining information $W_1$ is inverted in the diversity combining information 3. However, an immediately subsequent training frame is not present, and a sequence end detecting signal is output, and therefore, in preparation for the transmission and reception of the subsequent data frame, the diversity combining information is set to have each of the values of $W_1=1$, $W_2=0$, $W_3=0$, and $W_4=1$ as its value optimum.

It is understood from the above-mentioned training that the diversity combining information 3 ($W_1=1$, $W_2=0$, $W_3=0$, $W_4=1$) maximizes reception level information, i.e., that the diversity combining information 3 is the value optimum of diversity combining information. The value optimum 3 ($W_1=1$, $W_2=0$, $W_3=0$, $W_4=1$) of the diversity combining information is output to the weight processing unit, and beamforming and diversity combining for a time of subsequent data frame transmission/reception are performed by use of the value optimum 3 of the diversity combining information.

The circumstances of a transmission line change with the lapse of time, and therefore the diversity combining information $W_1$, $W_2$, $W_3$, and $W_4$ is required to be always optimized. In training, a plurality of training frames are received in such a way as above, and, if diversity combining information by which large reception level information can be obtained is found, this diversity combining information is reset as optimal diversity combining information.

Thus, in accordance with an algorithm in which diversity combining information with respect to a signal of each antenna is sequentially changed during training and in which reception level information at that time is examined, the value optimum of diversity combining information is always found, and this is used as the value optimum of diversity combining information for a time of data transmission/reception. According to this, the value optimum of diversity combining information with respect to a signal of each antenna can be determined by (the number of antennas+1) training frames in the shortest time.

The operation of determining the value optimum of diversity combining information has been described as above in a case in which the multiplier of the weight processing unit of the wireless communication device is a 1-bit phase shifter and in which diversity combining is performed by equal gain combining.

However, the multiplier of the weight processing unit is not limited to a 1-bit phase shifter, and may be an n-bit phase shifter (n is a natural number of 2 or greater). For example, if n=2, diversity combining information is 2-bit information, i.e., "00" ("0"), "01" ("1"), "10" ("2"), "11" ("3"), and hence, in accordance with, for example, diversity combining information "00," "01," "10," and "11," an input signal is output by being subjected to no-change, +90-degree rotation, phase inversion, or −90-degree rotation.

If an n-bit phase shifter (n is a natural number of 2 or greater) is used, in accordance with an algorithm in which diversity combining information with respect to a signal of each antenna is sequentially changed during training and in which reception level information at that time is examined, the value optimum of diversity combining information is always found, and this is used as the value optimum of diversity combining information for a time of data transmission/reception in the same way as in the first embodiment.

In a second embodiment provided in the following description, an n-bit phase shifter is used as the multiplier of the weight processing unit 11 (n is a natural number of 2 or greater), and the value optimum of diversity combining information in a case in which diversity combining is performed by equal gain combining is determined.

As described above, even when an n-bit phase shifter (n is a natural number of 2 or greater) is used as the multiplier of the weight processing unit 11, the value optimum of diversity combining information is always found in accordance with an algorithm in which diversity combining information is sequentially changed and reception level information at that time is examined. However, in the second embodiment described as follows, the value optimum of diversity combining information with respect to a signal of each antenna can be determined by (the number of antennas+1) training sub-signals.

Figure 10:
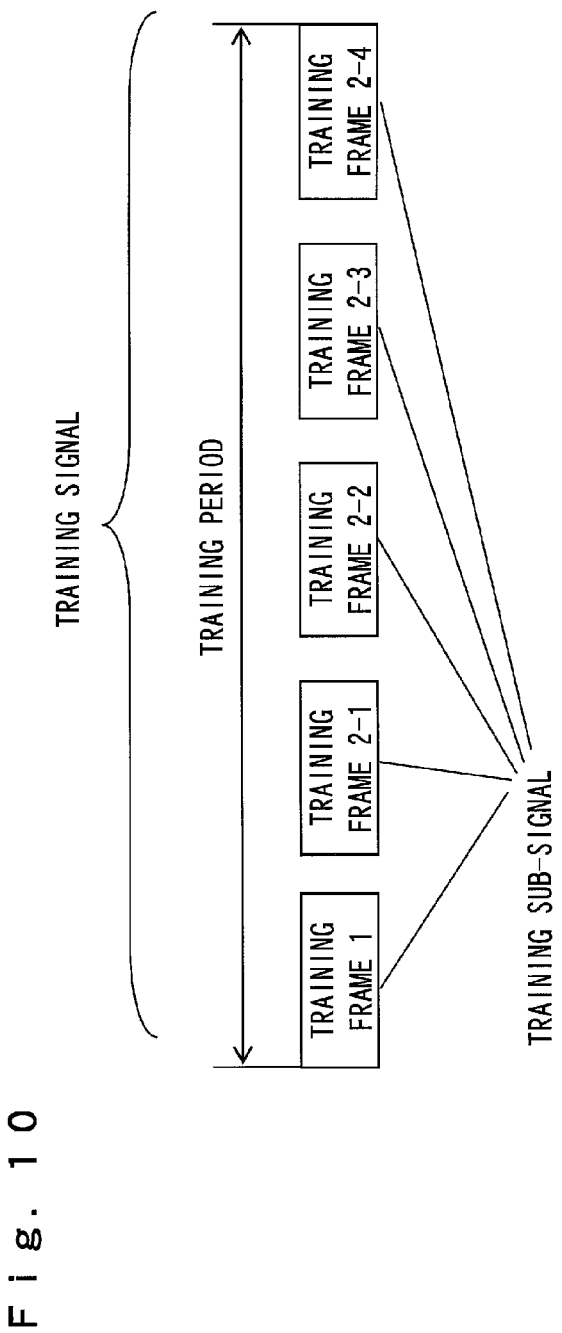
FIG. 10 is a view showing another example of the training signal.

For convenience of an easy understanding, let it be supposed that n is 2, and a training signal shown in FIG. 10 is used although the operation of determining the value optimum of diversity combining information does not depend on the value n. The training signal is used to obtain either baseband reception IQ information or both baseband reception IQ information and reception level information that are obtained when diversity reception is performed by the current diversity combining information, and is used to obtain either baseband reception IQ information or both baseband reception IQ information and reception level information that are obtained when diversity reception is performed while the current diversity combining information is changed in accordance with a predetermined algorithm.

Herein, the term "baseband reception IQ information" denotes information showing a complex transfer function between a baseband transmission IQ signal and a baseband reception IQ signal, and hence the baseband reception IQ information is a baseband reception IQ signal itself that corresponds to, for example, a preamble contained in each training frame. As described later, correlation information of a specific information sequence that is predetermined as a baseband reception IQ signal can be used instead of a baseband reception IQ signal.

Each wireless communication device receives training signals during one training period, thereby making it possible to determine the value optimum of diversity combining information that optimizes a diversity reception state at that time.

The training signal of this embodiment (see FIG. 10) contains a plurality of training frames 1, 2-1 to 2-4 during one training period. In this embodiment, the training sub-signal is each training frame.

An antenna selection signal in IEEE 802.11n (Draft 5.0) can be mentioned as a concrete example of such a signal, and can be used as a training signal. In the training signal of this embodiment, an ACK frame is not used, and (the number of antennas of a receiving-side wireless communication device+1) training frames are always transmitted intermittently.

The foremost training frame 1 is allowed to contain pieces of information, such as a source address, a destination address, and a frame type. Either baseband reception IQ information or both baseband reception IQ information and reception level information that are obtained when diversity reception is performed by the current diversity combining information are obtained by use of this training frame 1.

The training frames 2-1 to 2-4 are used to obtain either baseband reception IQ information or both baseband reception IQ information and reception level information that are obtained when diversity reception is performed while the diversity combining information is changed in accordance with a predetermined algorithm.

A description will be hereinafter given of a case in which both baseband reception IQ information and reception level information are obtained, and then the value optimum of diversity combining information is determined.

The structure of a wireless communication system of the second embodiment is the same as that of FIG. 1. For example, when the value optimum of diversity combining information in the wireless communication device A is determined in FIG. 1, the wireless communication device A receives training frames 1, 2-1 to 2-4 transmitted from the wireless communication device B in a diversity reception manner. The training frame 1 is received in a diversity reception manner by use of current diversity combining information $W_{A1}, W_{A2}, \ldots, W_{AM}$, and the training frames 2-1 to 2-4 are received in a diversity reception manner by use of diversity combining information $W_{A1}, W_{A2}, \ldots, W_{AM}$ obtained by changing the current diversity combining information $W_{A1}, W_{A2}, \ldots, W_{AM}$ in accordance with a predetermined algorithm. Based on both baseband reception IQ information and reception level information that are obtained by these diversity receptions, the value optimum of the diversity combining information $W_{A1}, W_{A2}, \ldots, W_{AM}$ is determined.

On the other hand, the wireless communication device B transmits a training signal from each of the antennas $B_1$, $B_2, \ldots, B_N$ by use of substantially optimal diversity combining information obtained by the nearest past training. The diversity combining information of the wireless communication device B is assumed to be fixed during one training period during which the wireless communication device A updates it to the value optimum of diversity combining information at that time. If communication between the wireless communication devices A and B is performed from a complete initial state, the wireless communication devices A and B transmit and receive a training signal to and from each other so that drawing into the value optimum of diversity combining information can be performed, as described later.

First, the wireless communication device A receives a first training frame 1 transmitted from each of the antennas $B_1$, $B_2, \ldots, B_N$ of the wireless communication device B through the M antennas $A_1, A_2, \ldots, A_M$. Each multiplier of the weight processing unit 11 multiplies each signal received from the antennas $A_1, A_2, \ldots, A_M$ by the diversity combining information $W_{A1}, W_{A2}, \ldots, W_{AM}$.

If diversity combining information is "00," each multiplier outputs an input signal without changes, and, if diversity combining information is "01," each multiplier allows the input signal to undergo +90-degree rotation, and outputs the resulting signal. If diversity combining information is "10" or "11," the input signal is allowed to undergo phase inversion or −90-degree rotation, respectively, and the resulting signal is output. Information obtained by the nearest past training is used as diversity combining information $W_{A1}, W_{A2}, \ldots, W_{AM}$ when the first training frame 1 is received. This diversity combining information $W_{A1}, W_{A2}, \ldots, W_{AM}$ can be regarded as a substantially value optimum even under the current state. However, the diversity combining information $W_{A1}$, $W_{A2}, \ldots, W_{AM}$ used at this time can be arbitrarily set. As described later, the diversity combining information $W_{A1}$, $W_{A2}, \ldots, W_{AM}$ is further updated to a value optimum after the diversity reception of the subsequent training frames 2-1 to 2-4.

The RF signal distributing/synthesizing unit 12 adds the received signals multiplied by the diversity combining information $W_{A1}, W_{A2}, \ldots, W_{AM}$ by the weight processing unit 11 so as to generate a received signal $R_A$.

Thereafter, only the diversity combining information $W_{A1}$ with respect to a signal of one antenna, e.g., with respect to a signal of the antenna $A_1$ is subjected to phase inversion from the value optimum $W_{A1}$ of the preceding diversity combining information. The subsequent training frame 2-1 is received in a diversity reception manner by use of this new diversity combining information $W_{A1}, W_{A2}, \ldots, W_{AM}$, and both baseband reception IQ information and reception level information at this time are obtained.

Thereafter, only the diversity combining information $W_{A2}$ with respect to a signal of one antenna excluding the antenna $A_1$, e.g., with respect to a signal of the antenna $A_2$ is subjected to phase inversion from the value optimum $W_{A2}$ of the preceding diversity combining information. The subsequent training frame 2-2 is received in a diversity reception manner by use of this new diversity combining information $W_{A1}$, $W_{A2}, \ldots, W_{AM}$, and both baseband reception IQ information and reception level information at this time are obtained.

Likewise, the training frames 2-3 and 2-4 are sequentially received, and both baseband reception IQ information and reception level information at this time are obtained.

The training frames 1, 2-1 to 2-M are sequentially received in this way, and the pieces of diversity combining information $W_{A1}, W_{A2}, \ldots, W_{AM}$ with respect to signals of the antennas $A_1, A_2, \ldots, A_M$ are sequentially changed (i.e., subjected to phase inversion) one by one at every reception, and both baseband reception IQ information and reception level information at this time are obtained.

Figure 11:
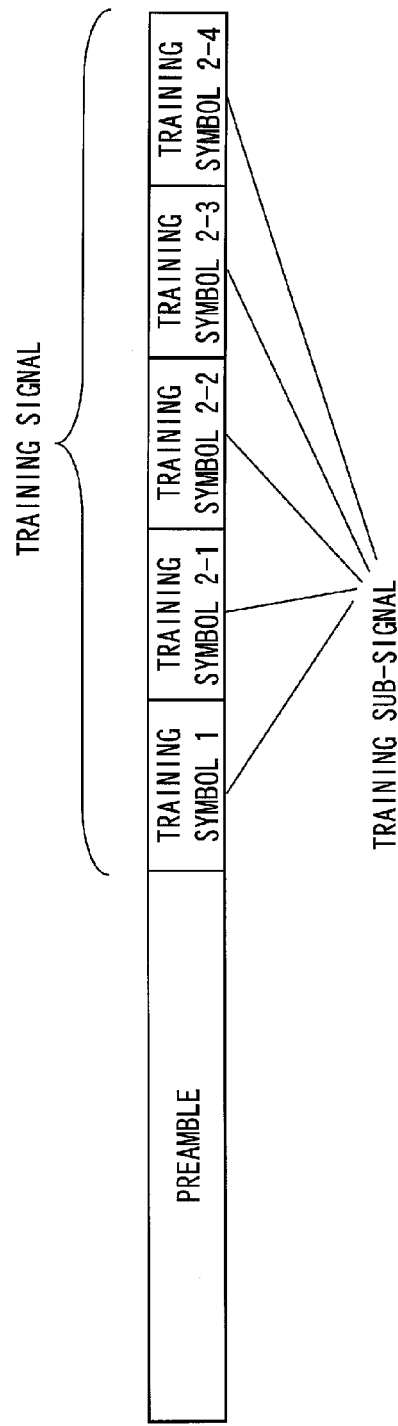
FIG. 11 is a view showing still another example of the training signal.

A case in which a plurality of training frames are used as a training signal has been described as above. In this case, the training signal is merely required to be able to obtain both baseband reception IQ information and reception level information by using this signal, and hence an arbitrary frame, a symbol, a subcarrier, a diffusion signal, etc., can be used as the training signal. FIG. 11 is a view showing an example of a training signal that consists of a plurality of training symbols. In this example, the training sub-signal is each of the training symbols, and these symbols are already known on the receiving side. In this example, both baseband reception IQ information and reception level information when diversity reception is performed by the current diversity combining information are obtained by using the training symbol 1. Furthermore, both baseband reception IQ information and reception level information, which are obtained when diversity reception is performed while changing the diversity combining information in accordance with a predetermined algorithm, are obtained by using the training symbols 2-1 to 2-4.

FIG. 12A, FIG. 12B, FIG. 12C, FIG. 12D and FIG. 12E are views that schematically shows reception information on the receiving side when baseband transmission IQ information "1" is transmitted from the transmitting side. Herein, the number of antennas of the wireless communication device is four, and reception information of each of the antennas $A_1$, $A_2$, ..., $A_4$ is represented as A1, A2, ..., A4, respectively. These are the same as in FIG. 9A, FIG. 9B and FIG. 9C.

Figure 12A:
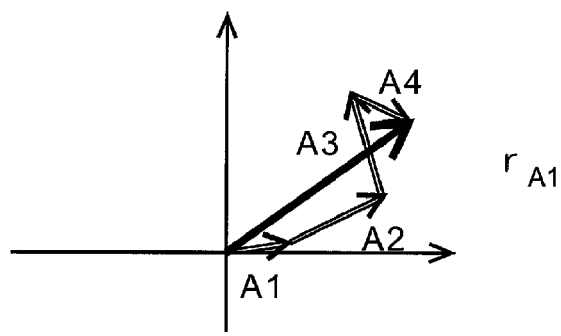
FIG. 12A is a view that schematically shows reception information on the receiving side when baseband transmission IQ information "1" is transmitted from the transmitting side.

FIG. 12A shows one example of reception information $r_{A1}$ with respect to the training frame 1, and FIG. 12B to FIG. 12E each show one example of reception information $r_{A2\text{-}1}$, $r_{A2\text{-}2}$, ..., $r_{A2\text{-}4}$ of the training frames 2-1 to 2-4. Reception information $r_{A1}$, $r_{A2\text{-}1}$, $r_{A2\text{-}2}$, ..., $r_{A2\text{-}4}$ can be found from a baseband reception IQ signal with respect to an already-known pattern, such as a preamble, contained in each training frame. Additionally, reception level information of each frame, i.e., information about the amplitude of reception information $r_{A1}$, $r_{A2\text{-}1}$, $r_{A2\text{-}2}$, ..., $r_{A2\text{-}4}$ can be obtained by using information about the AGC gain in the reception of each frame or the like.

In the training frame 1, a signal in which received signals A1, A2, ..., A4 have been subjected to vector addition is received. In the training frame 2-1, a signal in which received signals −A1 (inverted vector of A1), A2, ..., A4 have been subjected to vector addition is received. In the training frame 2-2, a signal in which received signals A1, −A2 (inverted vector of A2), ..., A4 have been subjected to vector addition is received. The same applies to each of the training frames 2-3 and 2-4. In the wireless communication device A, the value optimums $W_{A1}$, $W_{A2}$, ..., $W_{AM}$ of diversity combining information with respect to the signals of the antennas $A_1$, $A_2$, ..., $A_M$ are determined by using both baseband reception IQ information and reception level information with respect to each training frame of the training signal. The determining technique therefor is described later.

Thereafter, the wireless communication device A transmits the training frames 1, 2-1 to 2-4 to the wireless communication device B by use of these value optimums $W_{A1}$, $W_{A2}$, ..., $W_{AM}$ of diversity combining information. This time, the wireless communication device B receives training frames 1, 2-1 to 2-4 transmitted from each of the antennas $A_1$, $A_2$, ..., $A_M$ of the wireless communication device A, and determines the value optimums $W_{B1}$, $W_{B2}$, ..., $W_{BN}$ of diversity combining information with respect to signals of the antennas $B_1$, $B_2$, ..., $B_N$. The operation thereof is the same as the operation of the communication device A. Furthermore, a two-way training signal transfer is performed between the wireless communication devices A and B, and hence the value optimums $W_{A1}$, $W_{A2}$, ..., $W_{AM}$, $W_{B1}$, $W_{B2}$, ..., $W_{BN}$ of diversity combining information can be further optimized.

When data is transmitted and received, the wireless communication devices A and B perform beamforming and diversity combining by use of the value optimums $W_{A1}$, $W_{A2}$, ..., $W_{A4}$, $W_{B1}$, $W_{B2}$, ..., $W_{B4}$ of diversity combining information determined as mentioned above.

The value optimums $W_{A1}$, $W_{A2}$, ..., $W_{AM}$ of diversity combining information with respect to signals of the antennas $A_1$, $A_2$, ..., $A_M$ can be determined as follows by use of both baseband reception IQ information and reception level information obtained as above.

Baseband reception IQ information $r_{A1}$ in the reception of the training frame 1 is shown by Numerical Expression (1).

$$r_{A1} = (A1 + A2 + A3 + A4)/C_1 \quad (1)$$

In this expression, $C_1$ is a gain in the receiving system of the wireless communication device A in the reception of the training frame 1. According to the standardization by $C_1$, baseband reception IQ information $r_{A1}$ has a substantially fixed size without depending on the reception level.

On the other hand, baseband reception IQ information $r_{A2\text{-}1}$, $r_{A2\text{-}2}$, ..., $r_{A2\text{-}4}$ in the reception of the training frames 2-1 to 2-4 is shown by Numerical Expression (2).

$$r_{A2\text{-}1} = (-A1 + A2 + A3 + A4)/C_{2\text{-}1}$$

$$r_{A2\text{-}2} = (A1 - A2 + A3 + A4)/C_{2\text{-}2}$$

$$r_{A2\text{-}3} = (A1 + A2 - A3 + A4)/C_{2\text{-}3}$$

$$r_{A2\text{-}4} = (A1 + A2 + A3 - A4)/C_{2\text{-}4} \quad (2)$$

In this expression, $C_{2\text{-}1}$, $C_{2\text{-}2}$, ..., $C_{2\text{-}4}$ are gains in the receiving system of the wireless communication device A in the reception of the training frames 2-1 to 2-4, respectively. According to the standardization by $C_{2\text{-}1}$, $C_{2\text{-}2}$, ..., $C_{2\text{-}4}$, baseband reception IQ information $r_{A2\text{-}4}$, $r_{A2\text{-}2}$, ..., $r_{A2\text{-}4}$ has a substantially fixed size without depending on the reception level.

A gain $C_X$ in the receiving system can be calculated from reception level information $P_X$ according to Numerical Expression (3).

$$C_X = k/P_X \quad (3)$$

In this expression, k is a constant. Numerical Expression (4) can be obtained by substituting Numerical Expression (3) for Numerical Expressions (1) and (2).

$$r_{A1} = P_1 \times (A1 + A2 + A3 + A4)/k$$

$$r_{A2\text{-}1} = P_{2\text{-}1} \times (-A1 + A2 + A3 + A4)/k$$

$$r_{A2\text{-}2} = P_{2\text{-}2} \times (A1 - A2 + A3 + A4)/k$$

$$r_{A2\text{-}3} = P_{2\text{-}3} \times (A1 + A2 - A3 + A4)/k$$

$$r_{A2\text{-}4} = P_{2\text{-}4} \times (A1 + A2 + A3 - A4)/k \quad (4)$$

Numerical Expression (5) can be obtained from Numerical Expression (4).

$$A1 = k \times (r_{A1}/P_1 - r_{A2\text{-}1}/P_{2\text{-}1})/2$$

$$A2 = k \times (r_{A1}/P_1 - r_{A2\text{-}2}/P_{2\text{-}2})/2$$

$$A3 = k \times (r_{A1}/P_1 - r_{A2\text{-}3}/P_{2\text{-}3})/2$$

$$A4 = k \times (r_{A1}/P_1 - r_{A2\text{-}4}/P_{2\text{-}4})/2 \quad (5)$$

In this expression, A1, A2, ..., A4 are complex vectors, and phases of these vectors are assumed to be θ1, θ2, ..., θ4, respectively.

Diversity combining information $W_{A1}, W_{A2}, W_{A4}$ can be optimized by updating the diversity combining information $W_{A1}, W_{A2}, W_{A4}$ so that the phases of the four vectors A1, A2, ..., A4 become equal to each other.

For example, diversity combining information $W_{A1}, W_{A2}, W_{A4}$ can be optimized by accurately adjusting the directions of these four vectors to the reception information $r_{A1}$ of the training frame 1. In this case, supposing that the phase of reception information $r_{A1}$ is θ0, it is recommended to update diversity combining information $W_{A1}, W_{A2}, \ldots, W_{A4}$ according to Numerical Expression (6).

$$W_{A1}' = W_{A1} \times \exp j(\theta_0 - \theta_1)$$

$$W_{A2}' = W_{A2} \times \exp j(\theta_0 - \theta_2)$$

$$W_{A3}' = W_{A3} \times \exp j(\theta_0 - \theta_3)$$

$$W_{A4}' = W_{A4} \times \exp j(\theta_0 - \theta_4) \quad (6)$$

θ0, θ1, θ2, ..., θ4 are given by Numerical Expression (7). Actually, phases to which θ0, θ1, θ2, ..., θ4 are quantized at n bits are used as diversity combining information.

$$\theta_0 = \arg(r_{A1})$$

$$\theta_1 = \arg(r_{A1}/P_1 - r_{A2\text{-}1}/P_{2\text{-}1})$$

$$\theta_2 = \arg(r_{A1}/P_1 - r_{A2\text{-}2}/P_{2\text{-}2})$$

$$\theta_3 = \arg(r_{A1}/P_1 - r_{A2\text{-}3}/P_{2\text{-}3})$$

$$\theta_4 = \arg(r_{A1}/P_1 - r_{A2\text{-}4}/P_{2\text{-}4}) \quad (7)$$

Although both baseband reception IQ information and reception level information are obtained in order to determine the value optimums $W_{A1}, W_{A2}, \ldots, W_{AM}$ of diversity combining information as described above, the value optimums $W_{A1}, W_{A2}, \ldots, W_{AM}$ of diversity combining information can be determined without using the reception level information. For example, when the training signal shown in FIG. 11 is used, a reception AGC operation is completed by using a part of the preamble occupying the top of the frame, and hence gains obtained at the time of the reception of the training symbols 1, 2-1 to 2-4 become equal to each other ($C_1 = C_{2\text{-}1} = C_{2\text{-}2} = C_{2\text{-}3} = C_{2\text{-}4}$). Pieces of baseband reception IQ information $r_{A1}, r_{A2\text{-}1}, r_{A2\text{-}2}, \ldots, r_{A2\text{-}4}$ which are determined at the reception of the training symbols 1, 2-1 to 2-4 are expressed by Numerical Expression (8), and a relative received signal of each antenna can be found from only baseband reception IQ information $r_{A1}, r_{A2\text{-}1}, r_{A2\text{-}2}, \ldots, r_{A2\text{-}4}$.

$$r_{A1} = (A1 + A2 + A3 + A4)/C_1$$

$$r_{A2\text{-}1} = (-A1 + A2 + A3 + A4)/C_{2\text{-}1}$$

$$r_{A2\text{-}2} = (A1 - A2 + A3 + A4)/C_{2\text{-}2}$$

$$r_{A2\text{-}3} = (A1 + A2 - A3 + A4)/C_{2\text{-}3}$$

$$r_{A2\text{-}4} = (A1 + A2 + A3 - A4)/C_{2\text{-}4} \quad (8)$$

Additionally, the value optimums $W_{A1}, W_{A2}, W_{AM}$ of diversity combining information can be determined based on correlation between a diversity-combining received signal and a complex conjugate of predetermined preamble pattern or based on both correlation and reception level information.

For example, when the training signal shown in FIG. 10 is used, the value optimums $W_{A1}, W_{A2}, W_{AM}$ of diversity combining information can be determined by using both correlation between a diversity-combining received signal and a complex conjugate of predetermined preamble pattern and reception level information.

Figure 13:
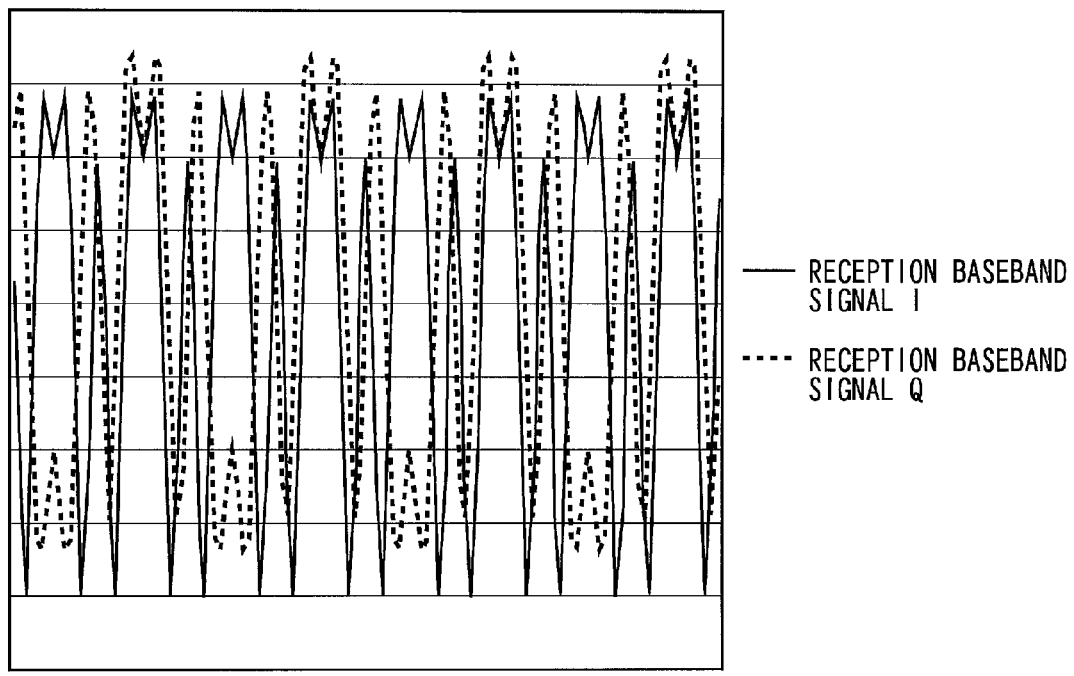
FIG. 13 is a view showing a baseband IQ signal in a preamble for burst detection, AGC operation, and timing synchronization that are used in a wireless LAN.
Figure 14:
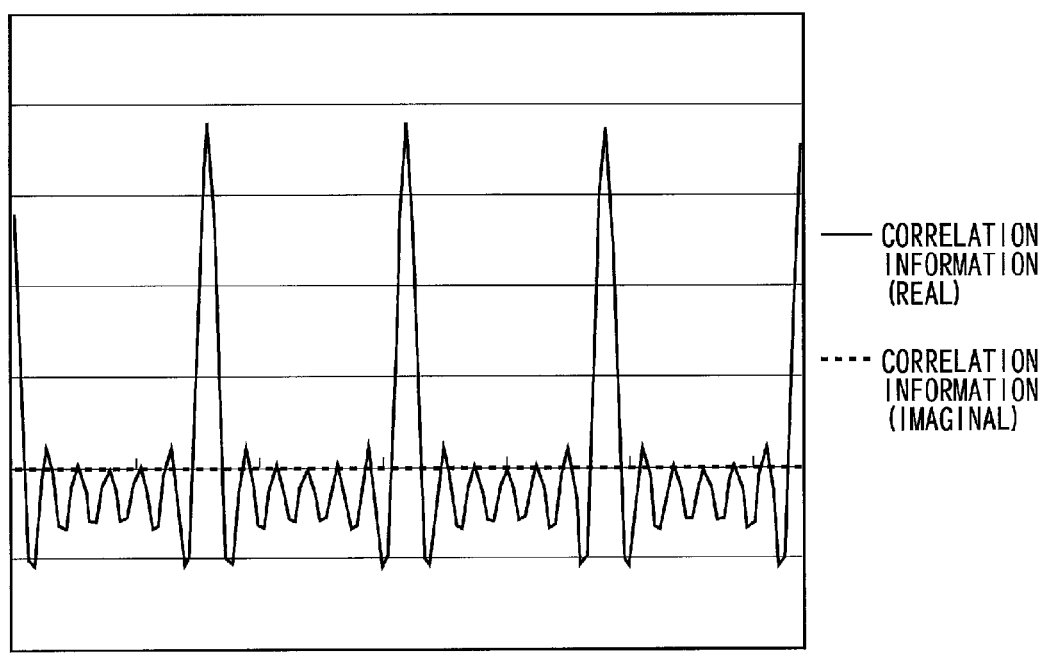
FIG. 14 is a view showing a output signal of a correlation arithmetic operation when a multipath wave is absent.

FIG. 13 shows a baseband IQ signal in a preamble for burst detection used in wireless LAN, for AGC operation, and for timing synchronization. Although an amount corresponding to ten cycles of a basic pattern is transmitted as a preamble in wireless LAN, an amount corresponding to about four cycles of a basic pattern is shown in FIG. 13. After completing burst detection, an AGC operation is performed subsequently on the receiver. After AGC operation, a correlation calculation of a baseband reception IQ signal and a complex conjugate of a basic pattern of preamble is performed for timing synchronization. FIG. 14 shows a correlation pattern in case a multipath wave does not exist.

For example, when the training signal shown in FIG. 10 is used, the output signal of the correlation at the timing of a correlation peak can be used as the baseband reception IQ information $r_{A1}, r_{A2\text{-}1}, r_{A2\text{-}2}, \ldots, r_{A2\text{-}4}$ of Numerical Expression (5).

Supposing that output signals of the correlation calculation at the timing of a correlation peak are $r_{A1}, r_{A2\text{-}1}, r_{A2\text{-}2}, \ldots, r_{A2\text{-}4}$, and the phase of the output signal $r_M$ is θ0, it is likewise recommended in this case to update the diversity combining information $W_{A1}, W_{A2}, \ldots, W_{A4}$ according to Numerical Expression (6).

Additionally, for example, when the training signal of FIG. 11 is used, a reception AGC operation is completed by using a part of the preamble occupying the top of the frame, and hence gains on receiving of the training symbols 1, 2-1 to 2-4 become equal to each other ($C_1 = C_{2\text{-}1} = C_{2\text{-}2} = C_{2\text{-}3} = C_{2\text{-}4}$). Therefore, a relative received signal of each antenna can be found from output signals $r_{A1}, r_{A2\text{-}1}, r_{A2\text{-}2}, \ldots, r_{A2\text{-}4}$ of the correlation calculation at the timing of a correlation peak in the reception of the training symbols 1, 2-1 to 2-4.

The output signals of the correlation calculation at the timing of a correlation peak are information which is integrated by time, and the use of this makes it possible to determine the value optimums $W_{A1}, W_{A2}, \ldots, W_{AM}$ of diversity combining information while reducing the influence of thermal noises or interference signals.

Figure 15:
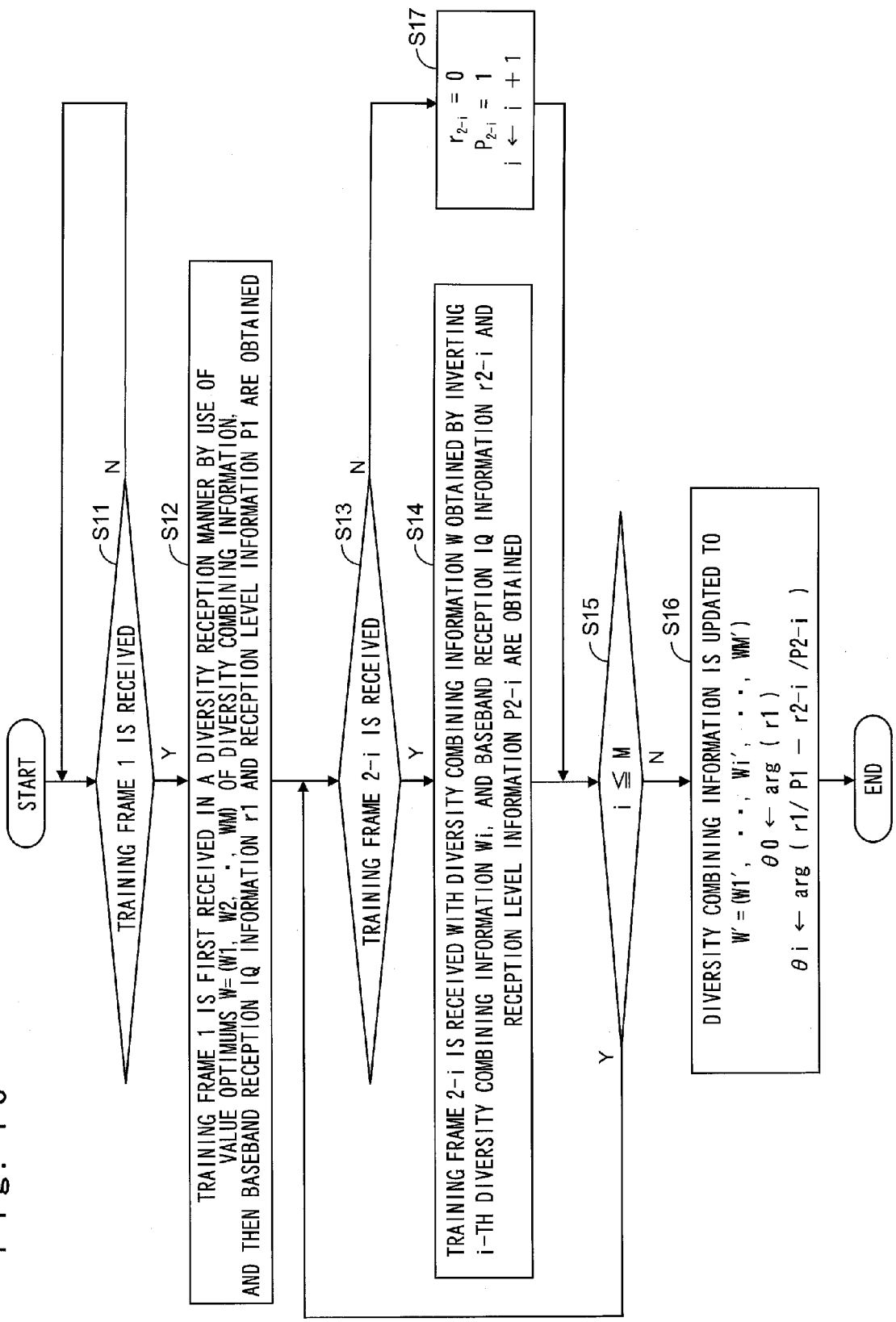
FIG. 15 is a flowchart showing a process of determining a value optimum of diversity combining information in a second embodiment.

FIG. 15 is a flowchart showing a process of determining a value optimum of diversity combining information in the wireless communication device A. Herein, a flow is shown in a case in which the number of antennas is M and in which an n-bit phase shifter (n is a natural number of 2 or greater) is used as the multiplier of the weight processing unit 11.

When the foremost training frame 1 is received (S11), the foremost training frame 1 is first received in a diversity reception manner by use of value optimums $W=(W_1, W_2, \ldots, W_M)$ of diversity combining information, and then baseband reception IQ information $r_1$ and reception level information $P_1$ are obtained. Additionally, 1 is substituted for variable i (i←1) (S12). Variable i prescribes that a loop consisting of the following steps is performed M times that correspond to the number M of antennas. The value optimums $W=(W_1, W_2, \ldots, W_M)$ are initial value optimums of diversity combining information, respectively. Herein, it is supposed that the multiplier of the weight processing unit 11 is an n-bit phase shifter, and hence each of the value optimums $W_1, W_2, \ldots, W_M$ is n-bit information.

Thereafter, when a training frame 2-i is received (S13), the training frame 2-i is received with diversity combining information W obtained by inverting i-th diversity combining information $W_i$ ("-th" is a suffix used to form an ordinal number), and baseband reception IQ information $r_{2\text{-}i}$ and reception level information $P_{2\text{-}i}$ are obtained (S14). In S14, an increment of 1 is given to variable i (i←i+1). Thereafter, it is determined whether variable i is the number M of antennas or is smaller (S15). If it is determined in S15 that variable i is the number M of antennas or is smaller than the number M of antennas, the process returns to S13 in which processing is repeatedly operated. If it is determined that variable i is not the number M of antennas or is not smaller than the number M of antennas, the diversity combining information $W_{A2}$, $W_{A3}$, ..., $W_{AM}$ is updated by use of baseband reception IQ information $r_1$, $r_{2-1}$, $r_{2-2}$, ..., $r_{2-4}$ and reception level information $P_1$, $P_{2-1}$, $P_{2-2}$, ..., $P_{2-4}$ that have been obtained in S12 and S14 (S16). If the training frame 2-i is not received, the baseband reception IQ information $r_{2-i}$ is set at 0, and the reception level information $P_{2-i}$ is set at minimum value, and, furthermore, i+1 is substituted for variable i (i←i+1) (S17).

Through the foregoing flow, the pieces of diversity combining information $W_{A2}$, $W_{A3}$, ..., $W_{AM}$ with respect to the signal of each of the antennas $A_1$, $A_2$, ..., $A_M$ can be optimized. Therefore, when the number of antennas is M, the diversity combining information $W=(W_1, W_2, ..., W_M)$ can be optimized by the diversity reception of (M+1) frames in total even if an n-bit phase shifter (n is a natural number of 2 or greater) is used.

Figure 16:
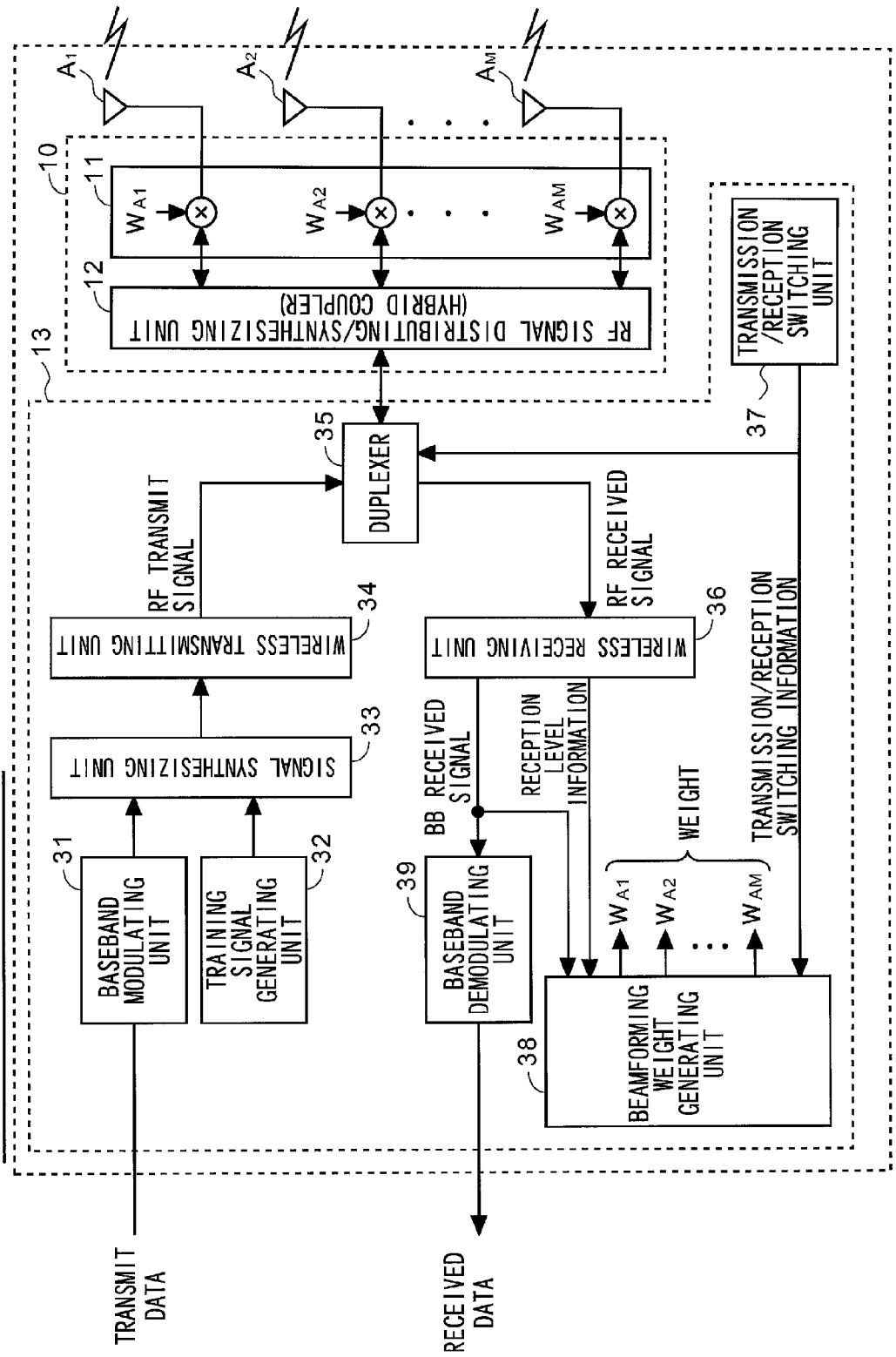
FIG. 16 is a block diagram showing a structure of the second embodiment of a wireless communication device according to the present invention.

FIG. 16 is a block diagram showing a structure of the second embodiment of the wireless communication device according to the present invention. In FIG. 16, the same reference numeral is given to the same or equivalent element as in FIG. 6.

The wireless communication device A of the second embodiment includes M antennas $A_1$ to $A_M$ (M is an integer of 2 or greater), a diversity circuit 10, and a transmitting/receiving circuit 13. The diversity circuit 10 includes the weight processing unit 11 and the hybrid coupler 12. The diversity circuit 10 performs beamforming and diversity combining by use of the value optimum of diversity combining information, and transmits and receives training signals and data frame.

The transmitting/receiving circuit 13 includes a baseband modulating unit 31, a training signal generating unit 32, a signal synthesizing unit 33, a wireless transmitting unit 34, a duplexer 35, a wireless receiving unit 36, a transmission/reception switching unit 37, a beamforming weight generating unit 38, and a baseband demodulating unit 39. The constituent elements excluding the weight processing unit 11 and the beamforming weight generating unit 38 are used in a generally-used wireless communication device. Herein, the diversity circuit 10 is operated in an RF band, so that the only one transmitting/receiving circuit 13 is used. In other words, the wireless communication device A performs multi-antenna beamforming and multi-antenna diversity reception by use of only one transmission/reception system.

The baseband modulating unit 31 receives the input of transmit data, and outputs a modulation signal. The modulation signal is a baseband IQ signal. This baseband IQ signal is input to the wireless transmitting unit 34 via the signal synthesizing unit 33.

The training signal generating unit 32 generates a training signal required to execute training and allow an opposite wireless communication device to perform beamforming. The training signal generated here is a baseband IQ signal. This baseband IQ signal is also input to the wireless transmitting unit 34 via the signal synthesizing unit 33.

The signal synthesizing unit 33 temporally synthesizes a baseband IQ signal emitted from the baseband modulating unit 31 and a baseband IQ signal emitted from the training signal generating unit 32, and outputs the resulting signal. When a baseband IQ signal is output from the baseband modulating unit 31, the signal synthesizing unit 33 outputs this signal as a baseband transmission IQ signal, and, when a baseband IQ signal is output from the training signal generating unit 32, the signal synthesizing unit 33 outputs this signal. Practically, it is permissible to provide a training-transmission-data generating unit, and apply a signal obtained by temporally synthesizing this output signal and transmit data to the baseband modulating unit 31, and give this output directly to the wireless transmitting unit 34. This practical structure makes it possible to use the baseband modulating unit 31 not only for modulating transmit data but also for modulating a training signal, and therefore the structure can be made simple, and costs and power consumption can be reduced.

The wireless transmitting unit 34 subjects a signal input through the signal synthesizing unit 33 to frequency conversion into an RF band, and inputs the resulting signal to the duplexer 35 as an RF transmit signal. In other words, the wireless transmitting unit 34 allows transmit data and a training signal to undergo frequency conversion into an RF band.

The duplexer 35 performs switching between the transmission of RF transmit signals and the reception of RF received signals in a TDD (Time Division Duplex) transfer. For example, transmission/reception switching information, which becomes "1" during transmission and which becomes "0" during reception, is received from the transmission/reception switching unit 37. If the transmission/reception switching information is "1," an RF transmit signal emitted from the wireless transmitting unit 34 is output to the RF signal distributing/synthesizing unit 12, and, if the transmission/reception switching information is "0," an RF received signal from the RF signal distributing/synthesizing unit 12 is output to the wireless receiving unit 36.

The wireless receiving unit 36 receives the input of an RF received signal from the duplexer 35, then subjects this signal to frequency conversion, and outputs the resulting signal. The wireless receiving unit 36 outputs reception level information about each training frame of the RF received signal. In detail, the wireless receiving unit 36 demodulates RF received data to a baseband IQ signal, and obtains reception level information from each training frame of a training signal. When reception level information is obtained after demodulating a training signal to a baseband IQ signal, the demodulation of RF received data and the demodulation of an RF training signal can be performed by a single demodulator. This baseband reception IQ signal is input to both the baseband demodulating unit 39 and the beamforming weight generating unit 38.

On the other hand, reception level information is input to the beamforming weight generating unit 38. No limitations are imposed on reception level information if this information is concerned with the reception level of each training frame of a diversity-combining received signal. Therefore, it is possible to use, for example, RSSI (Received Signal Strength Information) information, information obtained by converting this RSSI information into a level, a gain of an AGC amplifier of the wireless receiving unit 36, or information obtained by converting this gain into a reception level. If RSSI information is used as reception level information, the reception level information is output from the wireless receiving unit 36, and, if a gain of the AGC amplifier or information obtained by converting this gain into a level is used as reception level information, the reception level information is output from the baseband demodulating unit 39. FIG. 16 shows a case in which RSSI information is used as reception level information.

The transmission/reception switching unit 37 is a part of a wireless access control unit that is an indispensable component of the wireless communication device, and outputs transmission/reception switching information, which becomes "1," for example, during transmission and which becomes "0" during reception, to the duplexer 35 and to the beamforming weight generating unit 38.

Based on transmission/reception switching information and reception level information output from the transmission/reception switching unit 37, the beamforming weight generating unit 38 generates pieces of diversity combining information $W_{A1}, W_{A2}, \ldots, W_{AM}$ that are different from each other with respect to each training frame of a training signal, and, based on reception level information output from the wireless receiving unit 36, the beamforming weight generating unit 38 determines the value optimums $W_{A1}, W_{A2}, \ldots, W_{AM}$ of diversity combining information. The value optimums $W_{A1}, W_{A2}, \ldots, W_{AM}$ of diversity combining information generated here are given to each multiplier of the weight processing unit 11. The details of the beamforming weight generating unit 38 will be described later. The beamforming weight generating unit 38 functions as a "diversity combining information generating unit," as a "diversity combining information determining unit," as a "training receiving state holding unit," and as a "diversity combining information value optimum setting unit" in the wireless communication device of the present invention.

The baseband demodulating unit 39 demodulates a baseband (BB) reception IQ signal from the wireless receiving unit 36, and sends received data. The baseband demodulating unit 39 can be used not only for demodulating received data but also for demodulating a training signal, and therefore the structure can be made simple, and costs and power consumption can be reduced.

The weight processing unit 11 applies weight processing to an RF received signal and to an RF transmit signal in accordance with the value optimums $W_{A1}, W_{A2}, \ldots, W_{AM}$ of diversity combining information given from the beamforming weight generating unit 38. In more detail, the weight processing unit 11 applies weight processing to an RF received signal of each of the antennas $A_1$ to $A_M$, and outputs the resulting signal to the RF signal distributing/synthesizing unit 12, whereas the weight processing unit 11 applies weight processing to an RF transmit signal from the RF signal distributing/synthesizing unit 12, and outputs the resulting signal to each of the antennas $A_1$ to $A_M$. The weight processing in the weight processing unit 11 can be realized by phase-shifting processing by use of an n-bit phase shifter. For example, if n=2, the weight processing can be realized by 0-degree, 90-degree, 180-degree, or 270-degree-phase-shifting processing. The weight processing unit 11 functions as a "diversity combining information setting unit" in the wireless communication device of the present invention.

The RF signal distributing/synthesizing unit 12 distributes and synthesizes RF transmit/received signals. In more detail, the RF signal distributing/synthesizing unit 12 receives the input of M RF received signals from the weight processing unit, and outputs a signal obtained by synthesizing these signals to the duplexer 35, whereas the RF signal distributing/synthesizing unit 12 receives the input of an RF transmit signal from the duplexer 35, and outputs M distributions of the signal to the weight processing unit 11. The level of the RF received signal, which is synthesized by the RF signal distributing/synthesizing unit 12 and is then output to the duplexer 35, becomes $1/\sqrt{M}$ through impedance conversion in the weight processing unit 11, whereas the level of the RF transmit signal, which undergoes M distributions and is then output to the weight processing unit 11, becomes $1/\sqrt{M}$ with respect to the level of the RF transmit signal from the duplexer 35. The RF signal distributing/synthesizing unit 12 functions as a "signal distributing/synthesizing unit" in the wireless communication device of the present invention.

Figure 17:
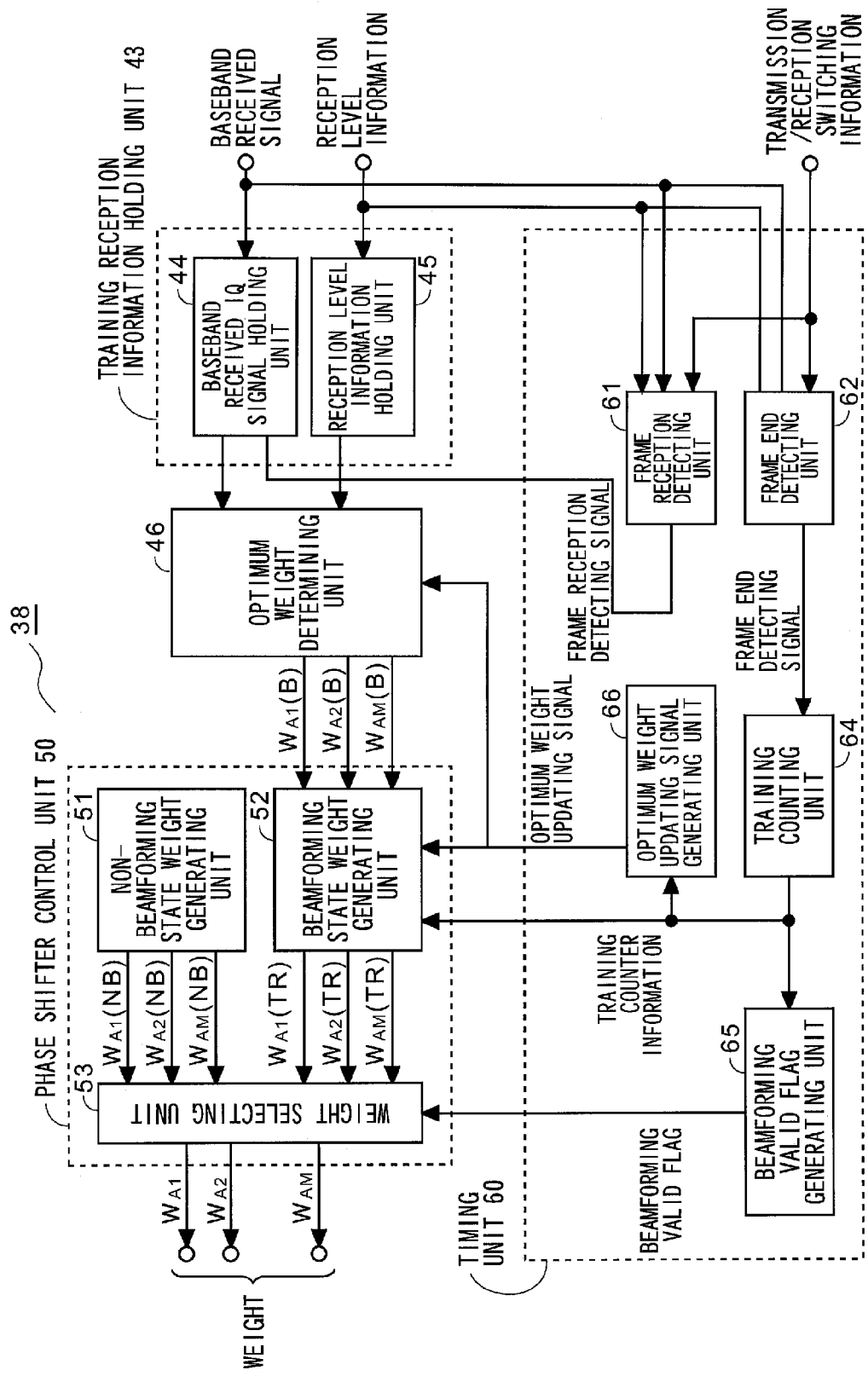
FIG. 17 is a block diagram showing a concrete structure of a weight generating unit for beamforming in the second embodiment.

FIG. 17 is a block diagram showing a concrete structure of the beamforming weight generating unit 38 of FIG. 16. In FIG. 17, the same reference numeral is given to the same or equivalent element as in FIG. 7.

The beamforming weight generating unit 38 includes a training reception information holding unit 43, an optimum weight determining unit 46, a phase shifter control unit 50, and a timing unit 60, and determines the value optimum of diversity combining information for beamforming and diversity combining through a two-way training signal transfer.

The training reception information holding unit 43 includes a baseband received IQ signal holding unit 44 and a reception level information holding unit 45.

When a training sequence is received, the baseband received IQ signal holding unit 44 holds a baseband reception IQ signal that is a baseband received signal corresponding to an already-known pattern contained in each training frame.

More specifically, on the supposition that a baseband received signal corresponding to an already-known pattern "1" (complex number) is held, the baseband reception IQ signal becomes a complex transfer function (vector) showing the phase rotation between a transmission baseband part and a reception baseband part.

For example, LTF in 802.11n is used as the already-known pattern, and a correlation calculation output between a baseband received signal corresponding thereto and LTF is set as a baseband reception IQ signal, and, as a result, the influence of noises in the estimation of the complex transfer function can be reduced. If the already-known pattern is contained in all training frames of a training sequence, the use of this makes it possible to find a baseband reception IQ signal that serves as an estimate value of the complex transfer function. All of the already-known patterns contained in the training frames may be the same or may differ from each other.

To realize this, a baseband received signal and a frame reception detecting signal from the timing unit 60 are applied to the baseband received IQ signal holding unit 44. For example, when a frame is received, a signal, which outputs a pulse if an preamble showing that this frame is a training frame is contained in a header part and which becomes "0" except for that situation, can be used as a frame reception detecting signal. To determine whether it is a training frame or not, a preamble contained in the header part can be used. Alternatively, a frame used when the time interval of a frame reception detecting signal is below a predetermined value can be determined to be a training frame.

On the other hand, when a training sequence is received, the reception level information holding unit 45 holds reception level information corresponding to an already-known pattern contained in each training frame. If an RSSI value is used as reception level information, an RSSI value corresponding to, for example, an already-known pattern may be held as the reception level information. Alternatively, a reception AGC gain obtained when this is received may be used as the reception level information because, generally, the foremost frame is an already-known pattern.

Amplitude information is lost from the information of a complex transfer function because of a reception AGC operation. This amplitude information can be restored by using reception level information, and can obtain true information of the complex transfer function without being limited to only phase information.

A frame reception detecting signal is output for each training frame, and a baseband reception IQ signal and reception level information in each training frame are held in the training reception information holding unit 43. These pieces of information are applied to the optimum weight determining unit 46. The optimum weight determining unit 46 calculates optimal diversity combining information $W_{A1}(B)$, $W_{A2}(B)$, ..., $W_{AM}(B)$ according to Numerical Expression (6), and outputs a calculation result to the beamforming state weight generating unit 52. The output of optimum diversity combining information $W_{A1}(B)$, $W_{A2}(B)$, ..., $W_{AM}(B)$ from the optimum weight determining unit 46 is performed according to a timing shown by an optimum weight updating signal from the timing unit 60. A signal that outputs a pulse immediately after the end of the reception of a training sequence and that becomes "0" except for that situation can be used as an optimum weight updating signal.

The phase shifter control unit 50 includes a non-beamforming state weight generating unit 51, the beamforming state weight generating unit 52, and a weight selecting unit 53.

In order to perform from a complete initial state to the value optimum of diversity combining information, it is necessary to first receive a training signal containing at least (the number of antennas+1) frames from an opposite wireless communication device disposed on an opposite side of a communication link. However, a training signal transmitted by the opposite wireless communication device cannot be necessarily received from the first. Therefore, the opposite wireless communication device is contrived to be able to receive at least one training signal ((the number of antennas+1) frames) transmitted by on own wireless communication device even in a complete initial state. This can be achieved by transmitting a plurality of training signals and by allowing the opposite wireless communication device to receive any one of the training signals by use of pieces of diversity combining information $W_{A1}, W_{A2}, \ldots, W_{AM}$ that differ from each other.

The non-beamforming state weight generating unit 51 generates diversity combining information $W_{A1}(NB)$, $W_{A2}(NB)$, ..., $W_{AM}(NB)$ for such a time of non-beamforming. Preferably, the pieces of diversity combining information $W_{A1}, W_{A2}, \ldots, W_{AM}$ are changed each time training signals are transmitted although the pieces of diversity combining information $W_{A1}, W_{A2}, \ldots, W_{AM}$ are arbitrary when the training signals are transmitted. In a CSMA (Carrier Sense Multiple Access) system, pieces of diversity combining information $W_{A1}, W_{A2}, \ldots, W_{AM}$ for a time of non-beamforming and for a time of non-transmission/reception are temporally changed at random, and these pieces of diversity combining information $W_{A1}, W_{A2}, \ldots, W_{AM}$ at the transmission start time of a training signal can be used in transmitting this training signal.

More specifically, if the number of antennas is M, an M-bit counter is operated by a free-running clock, and M counter values can be used as pieces of diversity combining information $W_{A1}, W_{A2}, \ldots, W_{AM}$, respectively. It is recommended to set a time interval for this random change at, for example, about 1 µs.

The opposite wireless communication device receives any one of the training signals, then determines the value optimum of diversity combining information, then sets this value optimum, then subjects the training signal to beamforming, and outputs the resulting signal, thus enabling the own wireless communication device to receive the training signal. If it is possible to receive any one of the training signals transmitted by use of diversity combining information that has been changed at random in the same way from the opposite wireless communication device, the drawing into the value optimum of diversity combining information without changes is performed in the own wireless communication device.

The beamforming state weight generating unit 52 sequentially changes each information $W_{Ai}(TR)$ of the diversity combining information $W_{A1}(TR)$, $W_{A2}(TR)$, ..., $W_{AM}(TR)$ for each frame in accordance with training counter information from a training counting unit 64, and holds each diversity combining information $W_{Ai}(TR)$ when an optimum weight updating signal is output from the reception level information comparing unit 41. Preferably, an initial value optimum of the diversity combining information $W_{A1}(TR)$, $W_{A2}(TR)$, ..., $W_{AM}(TR)$ is set as a value obtained by the nearest past training. The reason is that its diversity combining information is considered to be substantially optimal.

The weight selecting unit 53 selects diversity combining information $W_{A1}(NB)$, $W_{A2}(NB)$, ..., $W_{AM}(NB)$ output from the non-beamforming state weight generating unit 51 or diversity combining information $W_{A1}(TR)$, $W_{A2}(TR)$, $W_{AM}(TR)$ output from the beamforming state weight generating unit 52 based on a beamforming valid flag, and outputs the information as diversity combining information $W_{A1}$, $W_{A2}, \ldots, W_{AM}$.

Although the beamforming valid flag is "invalid" (for example, "0") in an initial state, the beamforming valid flag becomes "valid" (for example, "1") by receiving a frame a predetermined number of times, e.g., (the number of antennas+1) times. If frames is received sufficiently (for example, (the number of antennas+1) times or more) during a predetermined period, e.g., during a period of 100 ms, the beamforming valid flag may be set as "invalid."

As a result, the weight selecting unit 53 selects diversity combining information $W_{A1}(NB)$, $W_{A2}(NB)$, ..., $W_{AM}(NB)$ until a frame is received a predetermined number of times, and, after that, selects diversity combining information $W_{A1}(TR)$, $W_{A2}(TR)$, ..., $W_{AM}(TR)$.

The timing unit 60 includes a frame reception detecting unit 61, a frame end detecting unit 62, an optimum weight updating signal generating unit 66, the training counting unit 64, and a beamforming valid flag generating unit 65.

The frame reception detecting unit 61 receives the input of transmission/reception switching information, a baseband reception IQ signal, and reception level information, and outputs a frame reception detecting signal. The transmission/reception switching information is a signal that becomes "1," for example, during a period during which the wireless transmitting unit 34 becomes "enabled" and that becomes "0" except for that situation. The reception level information is RSSI (Received Signal Strength Information) information, or is information about, for example, a gain of the AGC amplifier of the wireless receiving unit 36. The frame reception detecting unit 61 detects a change in the reception level during a period during which the wireless receiving unit 36 becomes "enabled," or a change in the amplitude of a baseband received signal, or a predetermined preamble pattern, e.g., LTF in 802.11n, and generates a frame reception detecting signal when the frame is determined to be a training frame based on, for example, header information. In short, what is required is to update the optimum weight only by the reception of a training sequence and not to update the optimum weight except for that situation.

Although a frame reception detecting signal, for example, is generated even when the frame is not a training frame, an optimum weight updating signal may be generated only when it is determined that this frame is a training sequence. Additionally, generally, diversity combining information in a training frame 2-M (M is the number of antennas of a wireless communication device) is not a value optimum, and therefore there is also a possibility that any of a change in the reception level, a change in the amplitude of a baseband received signal, and a predetermined preamble pattern cannot be detected. In preparation for such a possibility, if it is determined from, for example, header information that the frame is a training frame, a pulse may be generated at a predetermined timing even when any of a change in the reception level, a change in the amplitude of a baseband received signal, and a predetermined preamble pattern cannot be detected. A complex transfer function corresponding to the training frame in such a case may be set at "0."

A frame reception detecting signal is given to the baseband received IQ signal holding unit 44 and the reception level information holding unit 45. The frame reception detecting signal is a signal showing the reception start of each training frame, and detects, for example, a change in the reception level during a period during which the wireless receiving unit 36 becomes "enabled," or a change in the amplitude of a baseband received signal, or a predetermined preamble pattern, such as LTF in 802.11n. Additionally, the frame reception detecting signal is a pulse having a predetermined width (for example, 1 μs) generated when it is determined from, for example, header information that the frame is a training frame.

The frame end detecting unit 62 receives the input of transmission/reception switching information, a baseband reception IQ signal, and a reception level information, and outputs a frame end detecting signal to the training counting unit 64. The frame end detecting signal is a signal showing the reception end of each frame, and is a pulse having a predetermined width (for example, 1 μs) that is generated while using the reception end timing of each frame as a trigger based on the detection of, for example, a change in the reception level during a period during which the wireless receiving unit 36 becomes "enabled" or a change in the amplitude of a baseband received signal. Additionally, generally, diversity combining information in a training frame 2-M (M is the number of antennas of a wireless communication device) is not a value optimum, and therefore there is also a possibility that any of a change in the reception level, a change in the amplitude of a baseband received signal, and a predetermined preamble pattern cannot be detected. In preparation for such a possibility, if it is determined from, for example, header information that the frame is a training frame, a pulse may be generated at a predetermined timing even when any of a change in the reception level, a change in the amplitude of a baseband received signal, and a predetermined preamble pattern cannot be detected.

The transmission/reception switching information is information showing a state of the wireless communication device, such as a transmitting state, a receiving state, or a power save state. The frame reception detecting unit 61 and the frame end detecting unit 62 can detect the reception start of frames and the reception end of frames by use of reception level information when the transmission/reception switching information is in a receiving state.

The optimum weight updating signal generating unit 66 outputs an optimum weight updating signal to the beamforming state weight generating unit 52. The optimum weight updating signal is a timing signal used to set an optimum weight newly determined by the reception of a training sequence after completing the reception of this training sequence, and is a pulse having a predetermined width (for example, 1 μs) generated after a fixed period (for example, 3 μs) after, for example, the generation of a pulse of a frame end detecting signal of the final frame of this training sequence.

The training counting unit 64 outputs training counter information to the beamforming state weight generating unit 52, to the optimum weight updating signal generating unit 66, and to the beamforming flag generating unit 65. The training counter information is count information about the number of frames in a training sequence, and is generated, for example, by making a one-by-one increment of the count value of the counter in accordance with a frame end detecting signal and by clearing the count value of the counter to "0" in accordance with an optimum weight updating signal.

The beamforming valid flag generating unit 65 outputs a beamforming valid flag showing that a frame has been received a predetermined number of times to the weight selecting unit 53. The beamforming valid flag is generated based on training counter information emitted from the training counter 64. If the beamforming valid flag is invalid, the weight selecting unit 53 selects diversity combining information $W_{A1}(NB)$, $W_{A2}(NB)$, ..., $W_{AM}(NB)$ emitted from the non-beamforming state weight generating unit 51, and, if the beamforming valid flag is valid, the weight selecting unit 53 selects diversity combining information $W_{A1}(TR)$, $W_{A2}(TR)$, ..., $W_{AM}(TR)$ emitted from the beamforming state weight generating unit 52.

The phase shifter control unit 50 basically operates to find diversity combining information $W_{A1}(TR)$, $W_{A2}(TR)$, ..., $W_{AM}(TR)$ when reception level information reaches the maximum level through training. In other words, in a wireless communication device disposed on the receiving side, each diversity combining information $W_{Ai}(TR)$ of the diversity combining information $W_{A1}(TR)$, $W_{A2}(TR)$, $W_{AM}(TR)$ is changed for each frame, and a baseband reception IQ signal and reception level information in each diversity combining information $W_{Ai}(TR)$ are held. From these pieces of information held therein, optimal diversity combining information $W_{A1}$, $W_{A2}$, ..., $W_{AM}$ is calculated based on Numerical Expression (100), and the optimum weight is updated.

In a two-way data transfer of training, the diversity combining information $W_{A1}(TR)$, $W_{A2}(TR)$, ..., $W_{AM}(TR)$ held at that time is read and given to the weight processing unit.

Figure 18:
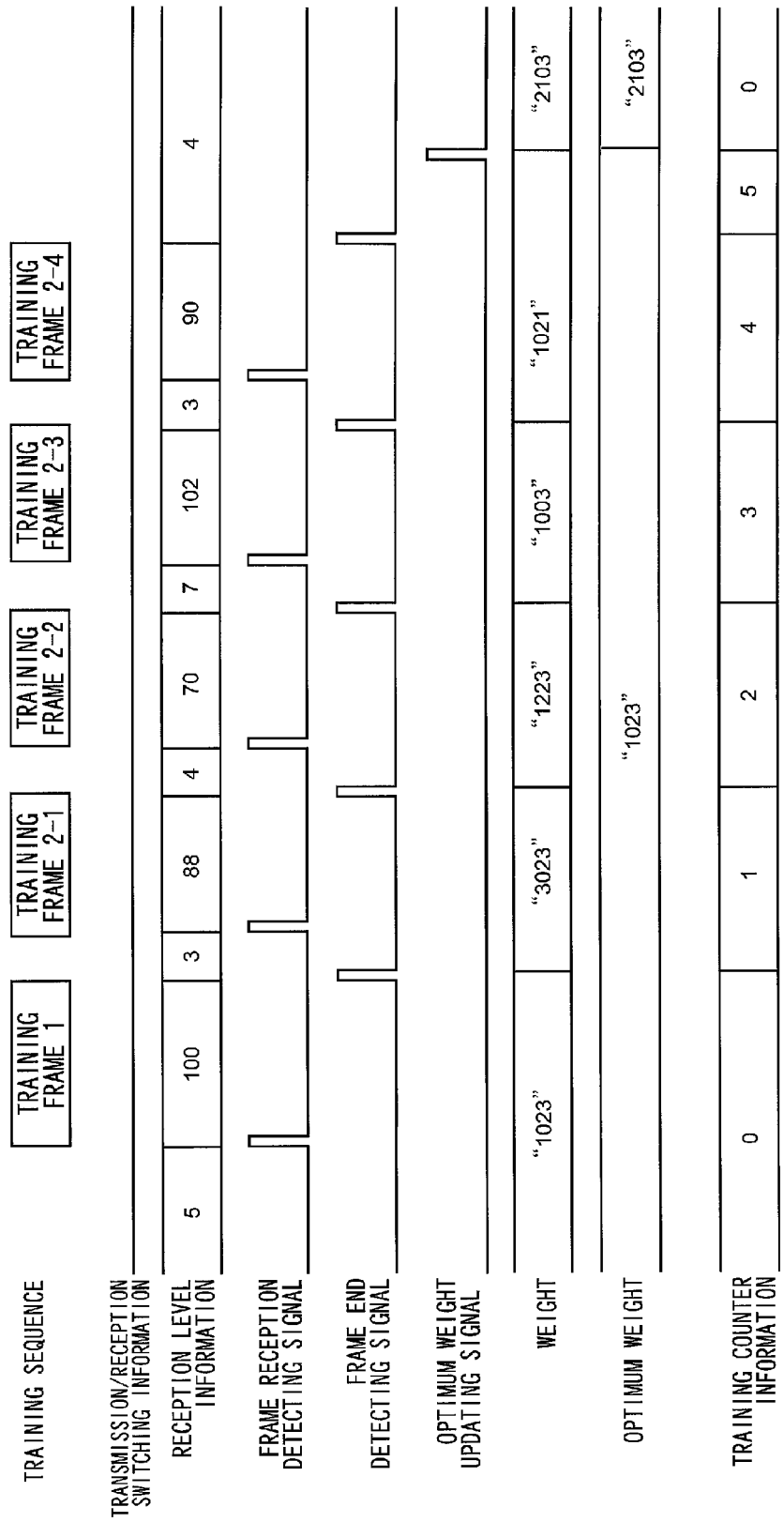
FIG. 18 is a timing chart showing an example of the operation of the weight generating unit for beamforming of FIG. 17.

FIG. 18 is a timing chart showing an example of the operation of the beamforming weight generating unit 38 of FIG. 17. The circumstances in which signals A1, A2, A3, and A4 of the antenna $A_1$, $A_2$, $A_3$, and $A_4$ are subjected to diversity combining (vector addition) so that a diversity-combining received signal is generated are shown in FIG. 12A, FIG. 12B, FIG. 12C, FIG. 12D and FIG. 12E. Herein, a case is assumed in which the number of antennas of the wireless communication device is four, and each of the pieces of diversity combining information $W_{A1}$, $W_{A2}$, $W_{A3}$, and $W_{A4}$ with respect to the signals of the antennas $A_1$, $A_2$, $A_3$, and $A_4$ is n bits (n is a natural number of 2 or greater). Additionally, it is assumed that the value of reception level information becomes greater in proportion to an increase in the reception level. In this case, the weight processing unit is composed of n-bit phase shifters that meet the number of antennas, and each of the phase shifters is controlled in accordance with each of the pieces of n-bit diversity combining information $W_{A1}$, $W_{A2}$, $W_{A3}$, and $W_{A4}$. If n=2, each of the phase shifters is controlled to have a phase-shifting amount of 0 degrees, for example, when diversity combining information is "0," to have a phase-shifting amount of 90 degrees when diversity combining information is "1," to have a phase-shifting amount of 180 degrees when diversity combining information is "2," and to have a phase-shifting amount of 270 degrees when diversity combining information is "3."

The wireless communication device receives a training frame 1 transmitted from an opposite wireless communication device (i.e., from a wireless communication device of a receiver of the communication link) in a diversity reception manner by use of the current diversity combining information $W_{A1}$, $W_{A2}$, $W_{A3}$, and $W_{A4}$, and sequentially receives a plurality of training frames 2-1 to 2-4 in a diversity reception manner while changing each diversity combining information $W_A$, of the diversity combining information $W_{A1}$, $W_{A2}$, $W_{A3}$, and $W_{A4}$. Thereafter, the reception level information and the baseband reception IQ signal obtained above are held, and, based on the thus held information after the end of the reception of the training sequence, the value optimums $W_{A1}$, $W_{A2}$, $W_{A3}$, and $W_{A4}$ of the diversity combining information are finally determined. The value optimums $W_{A1}$, $W_{A2}$, $W_{A3}$, and $W_{A4}$ of the diversity combining information determined in this way are used for beamforming and diversity combining for a time of data transmission/reception.

The training frame 1 is a foremost frame by which training is actually executed. Training is started after receiving this frame, and reception level information at that time and a baseband reception IQ signal are measured. For example, if an antenna selection sequence of IEEE 802.11n is used as a training sequence, an MAC header of a reception frame is analyzed, and, if this reception frame is an antenna selection sequence, training can be started. A baseband reception IQ corresponding to an already-known pattern contained in a PLCP (Physical Layer Convergence Protocol) header can be used as the baseband reception IQ signal. For example, in IEEE 802.11n, a baseband reception IQ of LTF (Long Training Field) contained in a PLCP header can be used as the baseband reception IQ signal. In this case, the baseband reception IQ signal shows a transfer function between the baseband transmission IQ of a transmitting-side wireless communication device and the baseband reception IQ of a receiving-side wireless communication device.

The training frame 1 is allowed to contain pieces of information, such as a source address, a destination address, and a frame type. The use of the training frame 1 makes it possible to obtain reception level information when diversity reception is performed by the current diversity combining information. The subsequent training frames 2-1 to 2-4 are used to measure a baseband reception IQ signal and reception level information obtained when diversity combining information is changed in accordance with a predetermined algorithm and is received in a diversity reception manner.

When gain control is started in the AGC amplifier of the wireless receiving unit, reception level information is usually changed in a comparatively short time (for example, 10 μs). The gain control of the AGC amplifier occurs even in the reception start or the reception end of the training frame, and, except for this, occurs because of, for example, the influence of noises. If a failure is caused in the reception of a frame header after the gain control of the AGC amplifier is started by the reception start of the training frame, there is also a case in which the gain control of the AGC amplifier is started a plurality of times during the frame reception period. When reception level information is measured, consideration is given to these points.

First, when training counter information is "0," the beamforming state weight generating unit 52 generates diversity combining information 0 ($W_1$="01," $W_2$="00," $W_3$="10," $W_4$="11"), and receives a training frame 1 emitted from the opposite wireless communication device in a diversity reception manner by use of this diversity combining information 0. Preferably, the diversity combining information 0 is, for example, information that has been obtained by the nearest past training and that has been used when a previous data frame is received. The reason is that, in a case in which beamforming has been performed in the past, diversity combining information at that time is considered to be also substantially optimal this time. If beamforming has not been performed in the past, arbitrary diversity combining information can be used. A baseband reception IQ signal and reception level information (100) at this time are held by the maximum reception level holding unit 42. FIG. 12A shows the diversity combining (vector addition) of received signals of the antennas $A_1$, $A_2$, $A_3$, and $A_4$ at this time. The reception level information before receiving the training frame 1 is "5." This corresponds to a thermal noise level. Reception level information during the period from the reception of the training frame 1 to the reception of the subsequent training frame 2-1 is lowered to "3." This also corresponds to a thermal noise level. In the subsequent training frames, thermal noises occur during the reception of the training frames in the same way as above.

Figure 12B:
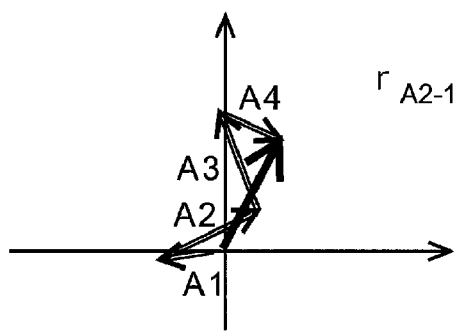
FIG. 12B is a view that schematically shows reception information on the receiving side when baseband transmission IQ information "1" is transmitted from the transmitting side.

Thereafter, when the frame end of the training frame 1 is detected, and the training counter information becomes "1," the beamforming state weight generating unit 52 generates diversity combining information 1 ($W_1$="11," $W_2$="00," $W_3$="10," $W_4$="11"). The diversity combining information 1 has a structure in which only diversity combining information $W_1$ is inverted. Reception level information (88) when the training frame 2-1 is received by use of the diversity combining information 1 is lower than reception level information (100) obtained by use of the diversity combining information 0. FIG. 12B shows the diversity combining of received signals of the antennas $A_1$, $A_2$, $A_3$, and $A_4$ at this time. This change in the reception level information is caused not by a change in the transmission line but by a change in the diversity combining information.

Figure 12C:
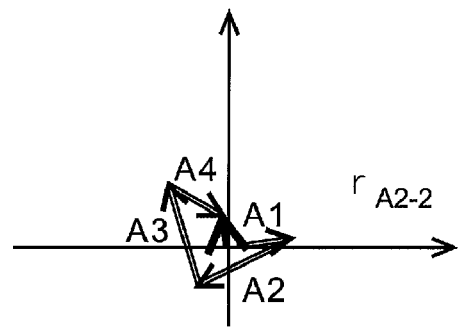
FIG. 12C is a view that schematically shows reception information on the receiving side when baseband transmission IQ information "1" is transmitted from the transmitting side.

Thereafter, when the training counter information becomes "2," the beamforming state weight generating unit 52 generates diversity combining information 2 ($W_1$="01," $W_2$="10," $W_3$="10," $W_4$="11"). The diversity combining information 2 has a structure in which only diversity combining information $W_2$ is inverted in the diversity combining information 0. A baseband reception IQ signal and reception level information (70) given when the training frame 2-2 is received by use of the diversity combining information 2 are obtained and held. The reception level at this time is lower than the reception level information (100) at a time of the diversity combining information 0. FIG. 12C shows the diversity combining of received signals of the antennas $A_1$, $A_2$, $A_3$, and $A_4$ at this time.

Figure 12D:
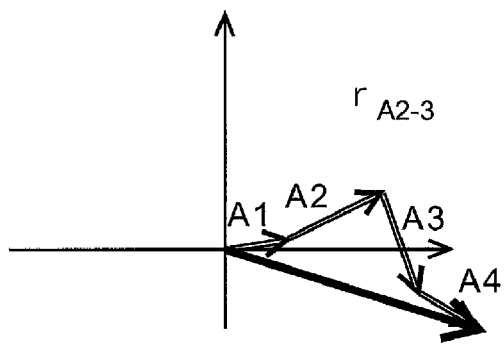
FIG. 12D is a view that schematically shows reception information on the receiving side when baseband transmission IQ information "1" is transmitted from the transmitting side.

Thereafter, when the training counter information becomes "3," the beamforming state weight generating unit 52 generates diversity combining information 3 ($W_1$="01," $W_2$="00," $W_3$="00," $W_4$="11"). The diversity combining information 3 has a structure in which only diversity combining information $W_3$ is inverted in the diversity combining information 0. A baseband reception IQ signal and reception level information (102) given when the training frame 2-3 is received by use of the diversity combining information 3 are obtained and held. The reception level at this time is higher than the reception level information (100) at a time of the diversity combining information 0. FIG. 12D shows the diversity combining of received signals of the antennas $A_1$, $A_2$, $A_3$, and $A_4$ at this time.

Thereafter, when the training counter information becomes "4," the beamforming state weight generating unit 52 generates diversity combining information 4 ($W_1$="01," $W_2$="00," $W_3$="10," $W_4$="00"). The diversity combining information 4 has a structure in which only diversity combining information $W_4$ is inverted in the diversity combining information 0. A baseband reception IQ signal and reception level information

Figure 12E:
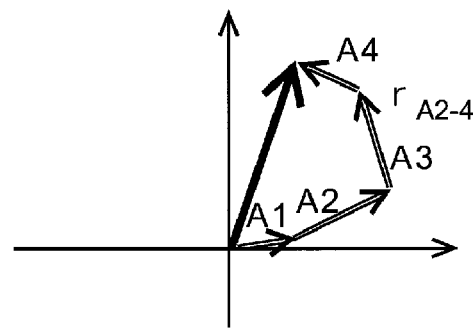
FIG. 12E is a view that schematically shows reception information on the receiving side when baseband transmission IQ information "1" is transmitted from the transmitting side.

(90) given when the training frame 2-4 is received by use of the diversity combining information 4 are obtained and held. The reception level at this time is lower than the reception level information (100) at a time of the diversity combining information 0. FIG. 12E shows the diversity combining of received signals of the antennas $A_1$, $A_2$, $A_3$, and $A_4$ at this time.

After a baseband reception IQ signal and reception level information (90) given when the training frame 2-4 is received by use of the diversity combining information 4 are obtained and held, the value optimums $W_{A1}$, $W_{A2}$, $W_{A3}$, and $W_{A4}$ of diversity combining information are finally determined based on the thus held information.

The value optimums $W_{A1}$, $W_{A2}$, $W_{A3}$, and $W_{A4}$ of new diversity combining information are determined in accordance with Numerical Expression (6). In Numerical Expression (6), $W_{A1}$, $W_{A2}$, $W_{A3}$, and $W_{A4}$ represent the value optimums of diversity combining information given before training signals are received, and $W_{A1}'$, $W_{A2}'$, $W_{A3}'$, $W_{A4}'$ represent the value optimums of diversity combining information newly determined after training signals are received.

The value optimums $W_{A1}'$, $W_{A2}'$, $W_{A3}'$, $W_{A4}'$ of the newly determined diversity combining information are set in preparation for the transmission and the reception of subsequent data frames after a frame end detecting signal with respect to the training frame 2-4 is output.

Next, a description will be given of the operation of the wireless communication system of the present invention when the transfer of a broadcast frame or a multicast frame is included.

Figure 19:
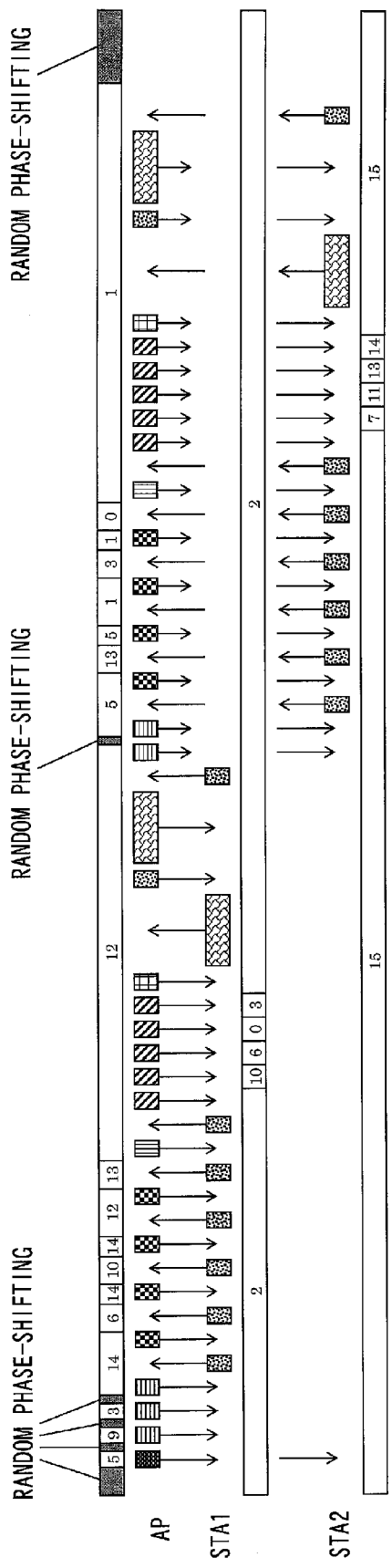
FIG. 19 is a view showing an example of the operation of the wireless communication system of the present invention when the transfer of a broadcast frame or a multicast frame is included.

FIG. 19 is a view showing an operation example during training and data transfer between an AP and a plurality of STAs in this case. FIG. 19 shows wireless frames transferred between AP and STA and the operation of a phase shifter of AP and that of STA at that time. Herein, each AP has four antennas, and each STA has four antennas, and a 1-bit phase shifter is connected to each antenna. Additionally, the state of phase-shifter setting with respect to four antennas is shown by integers of from 0 to 15. For example, if phase-shifter setting is 5, which is equal to "0101" in binary number representation, phase-shifter setting with respect to antenna 1 and antenna 3 is "0 degrees," and phase-shifter setting with respect to antenna 2 and antenna 4 is "180 degrees."

AP transmits a beacon in fixed cycles, e.g., every 100 ms, and imparts the existence of a wireless network to its circumference. Phase-shifter setting in AP given when a beacon is transmitted is determined at random from among 0 to 15. In this case, the probability that the states of phase-shifter setting will differ from each other whenever a beacon is transmitted is high.

In a CSMA/CA system, one method of determining phase-shifter setting at random is exemplified by a method in which phase-shifter setting is changed, for example, every 1 μs when a wireless device is in an idle state, i.e., when a wireless device performs neither transmission nor reception, and phase-shifter setting is determined at the start time of transmission/reception when a frame is transmitted or received.

AP transmits a training start frame addressed to STA1 subsequently to beacon transmission. Phase-shifter setting in AP determined when this training start frame is transmitted is determined at random from among 0 to 15. Phase-shifter setting at this time is not necessarily optimal, and therefore there is a case in which STA1 can normally receive a training start frame, and there is a case in which STA1 cannot normally receive this. If STA1 normally receives a training start frame, an ACK frame is transmitted from STA1 to AP. If STA1 does not normally receive a training start frame, an ACK frame is not transmitted from STA1 to AP. In this case, AP retransmits a training start frame addressed to STA1 by use of phase-shifter setting different from the previous one. Basically, the retransmission of this training start frame is repeatedly performed until an ACK frame is transmitted from STA1 to AP.

Figure 20:
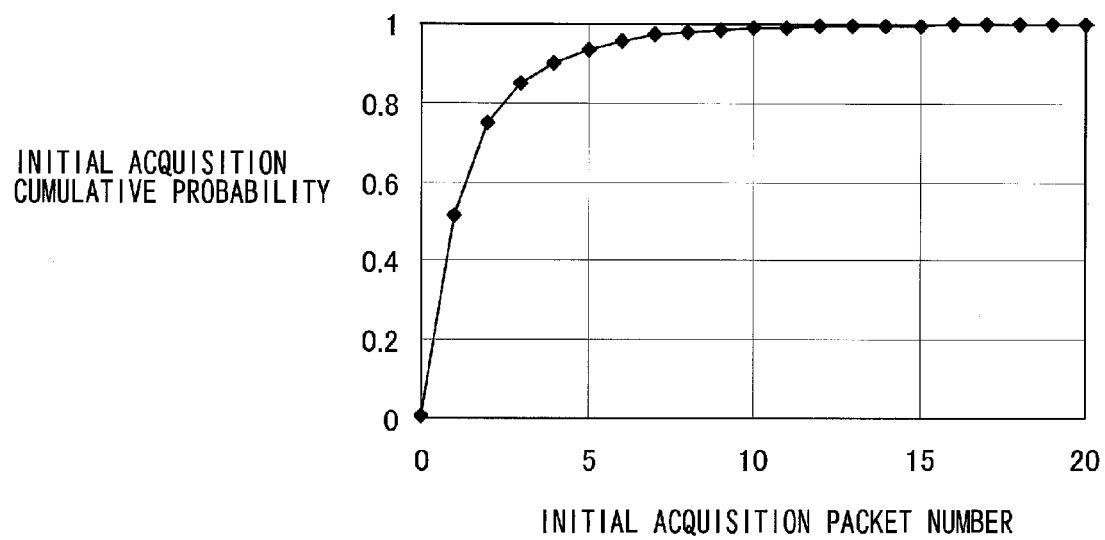
FIG. 20 is a view showing a relationship between the number of transmission times by which a training start frame is retransmitted and the probability of transmission of an ACK frame (when the optimal setting of the phase shifter is already known on the STA side).
Figure 21:
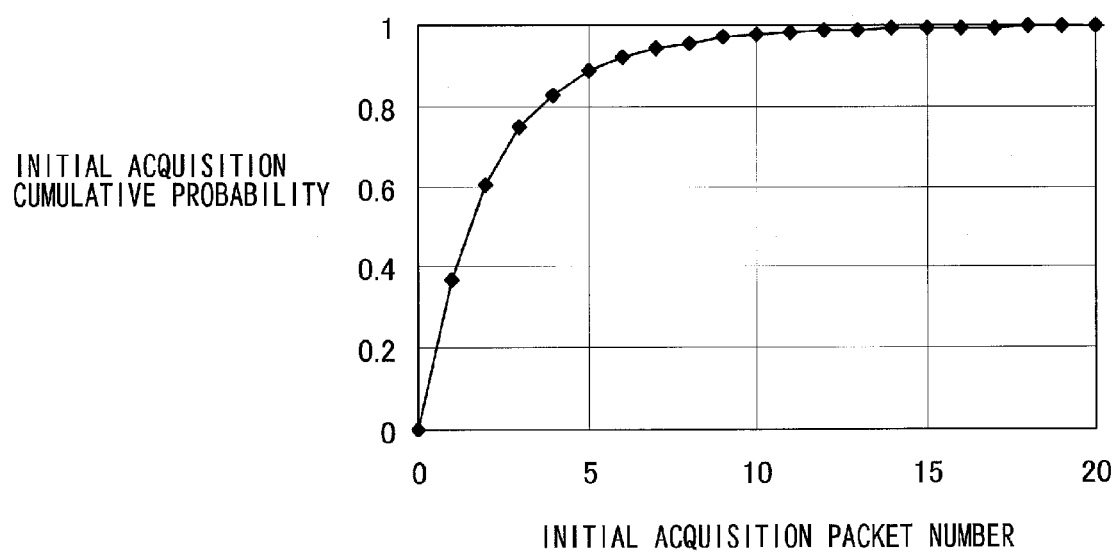
FIG. 21 is a view showing a relationship between the number of transmission times by which a training start frame is retransmitted and the probability of transmission of an ACK frame (when the optimal setting of the phase shifter is unknown on the STA side).

FIG. 20 and FIG. 21 each show a relationship between the number of transmission times of a training start frame including retransmission and the probability that an ACK frame with respect to this will be transmitted. FIG. 20 shows a case in which the optimum setting of a phase shifter is already known on the STA side whereas FIG. 21 shows a case in which the optimum setting of a phase shifter is unknown on the STA side. From FIG. 20, it is understood that the mean value of the number of transmission times of a training start frame including retransmission is 2.3, and that an ACK frame with respect to a training start frame will be transmitted with a probability of 99.9% or more if ten frames or less in total are transmitted. On the other hand, from FIG. 21, it is understood that the mean value of the number of transmission times of a training start frame including retransmission is 2.9, and that an ACK frame with respect to a training start frame will be transmitted with a probability of 99.9% or more if twenty frames or less in total are transmitted. Actually, according to the situation of multipath fading, the situation of FIG. 20, or the situation of FIG. 21, or the intermediate situation therebetween occurs.

When an ACK frame with respect to a training start frame to STA1 is received, AP starts a two-way training signal transfer to STA1. In the example of FIG. 19, a training signal is first transmitted from the STA1 side, and phase-shifter setting on the AP side is optimized. Thereafter, a training signal is transmitted from the AP side, and phase-shifter setting on the STA side is optimized. In the optimization of phase-shifter setting on the AP side, training is performed while phase-shifter setting on the AP side, which is determined when an ACK frame with respect to a training start frame from STA1 is received, is used as an initial value.

In the example of FIG. 19, AP does not receive an ACK frame with respect to a first training start frame and an ACK frame with respect to a second training start frame. Therefore, AP fixes phase-shifter setting at random phase-shifting. Thereafter, AP receives an ACK frame with respect to a third training start frame. AP uses phase-shifter setting 14 ("1110") determined when the third training start frame is transmitted as a training initial value.

In this example, AP transmits Null Data (i.e., frame having a data length 0 of a payload) to STA1, and an ACK frame with respect to this from STA1 is received by phase-shifter setting for training, and the optimum phase-shifter setting on the AP side is calculated from the reception level at that time.

More specifically, as shown in FIG. 19, AP first holds the reception level of an ACK frame with respect to a training start frame as a reception level in training initial setting 14 ("1110").

Thereafter, AP transmits Null Data to STA1 without changing 14 ("1110") of phase-shifter setting, and then changes the phase-shifter setting to phase-shifter setting for training AP changes it into, for example, 6 ("0110") in which phase-shifter setting with respect to antenna 1 is inverted, and receives an ACK frame, and examines its reception level. In this case, 14 ("1110") in phase-shifter setting is higher in the reception level, and therefore AP returns the phase-shifter setting to 14 ("1110"), and transmits Null Data. Thereafter, AP changes it to 10 ("1010") in which phase-shifter setting with respect to antenna 2 is inverted, and receives an ACK frame, and examines its reception level. Likewise, in this case, 14 ("1110") in phase-shifter setting is higher in the reception level, and therefore AP returns the phase-shifter setting to 14 ("1110"), and transmits Null Data. Thereafter, AP further changes it to 12 ("1100") in which phase-shifter setting with respect to antenna 3 is inverted, and receives an ACK frame, and examines its reception level. The reception level of this case is higher than the reception level of 14 ("1110") in phase-shifter setting, and therefore phase-shifter setting is fixed at 12 ("1100"), and subsequent Null Data is transmitted in accordance with this phase-shifter setting. Thereafter, AP changes it to 13 ("1101") in which phase-shifter setting with respect to antenna 4 is inverted, and receives an ACK frame, and examines its reception level. In this example, the reception level is maximum when phase-shifter setting is fixed at 12 ("1100"), and therefore AP performs the transmission of a subsequent training signal and the transmission and reception of data by use of phase-shifter setting 12 ("1100").

The optimization of phase-shifter setting with respect to the four antennas on the AP side is completed, and then AP transmits a training signal to STA1 by use of the optimized phase-shifter setting 12 ("1100"). Herein, a No-Ack Null Data frame is used as a training signal. In STA1, the optimum phase-shifter setting obtained in the past training is held, and this phase-shifter setting is used not only in an immediately subsequent data transfer but also in a subsequent training transfer. Although the optimum phase-shifter setting is hourly changed by, for example, multipath fading, optimum phase-shifter setting can be determined in a short time by performing training while using previously-obtained optimum phase-shifter setting as an initial value even in this case.

In FIG. 19, although STA1 holds the previously-obtained optimum phase-shifter setting 2 ("0010"), STA1 further receives a training signal from the AP side, and further optimally updates the phase-shifter setting. First, STA1 receives a first No-Ack Null Data frame by use of the previous phase-shifter setting 2 ("0010"), and obtains a reception level in the phase-shifter setting 2 ("0010"). STA1 determines that training for its own terminal has been started by receiving a No-Ack Null Data frame addressed to its own terminal, and receives a subsequent No-Ack Null Data frame by use of phase-shifter setting changed for training, and examines its reception level.

More specifically, STA1 receives a first No-Ack Null Data frame, then changes the setting to 10 ("1010") in which phase-shifter setting with respect to antenna 1 is inverted, then receives a subsequent No-Ack Null Data frame, and examines its reception level. Thereafter, STA1 receives a second No-Ack Null Data frame, then changes the setting to 6 ("0110") in which phase-shifter setting with respect to antenna 2 is inverted, then receives a subsequent No-Ack Null Data frame, and examines its reception level. Thereafter, STA1 receives a third No-Ack Null Data frame, then changes the setting to 0 ("0000") in which phase-shifter setting with respect to antenna 3 is inverted, then receives a subsequent No-Ack Null Data frame, and examines its reception level. Furthermore, STA1 receives a fourth No-Ack Null Data frame, then changes the setting to 3 ("0011") in which phase-shifter setting with respect to antenna 4 is inverted, then receives a subsequent No-Ack Null Data frame, and examines its reception level. In this example, the reception level is maximum when the phase-shifter setting is fixed at 2 ("0010"), and therefore STA1 performs the transmission and reception of subsequent data by use of phase-shifter setting 2 ("0010").

In order not to perform a training operation even if other STAs (i.e., STAs other than STA1) receive a training signal, it is recommended not to perform a training operation even if a frame that is not addressed to its own terminal is received. This is achieved by forbidding STA to perform a training operation even if a MAC address receives a frame that is not addressed to its own terminal or by transmitting an ACK frame only with respect to a frame addressed to its own terminal and performing a training operation only during a fixed period after the transmission of the ACK frame.

These operations are performed, and hence the phase-shifter setting on the AP side is optimized to 12 ("1100"), and the phase-shifter setting on the STA1 side is optimized to 2 ("0010"), and then a two-way data transfer between AP and STA1 is performed by each phase-shifter setting mentioned above.

In the example of FIG. 19, after a data transfer between AP and STA1 is completed, AP transmits a training start frame addressed to STA2 by use of phase-shifter setting 12 ("1100") with respect to STA1. Phase-shifter setting on the AP side at this time is not necessarily optimal with respect to STA2, and therefore, there is a case in which STA2 can correctly receive a training start frame, and there is a case in which STA2 cannot correctly receive this. If STA2 can correctly receive this training start frame, STA2 transmits an ACK frame to AP. If STA2 cannot correctly receive the training start frame, STA2 does not transmit an ACK frame to AP. In this case, AP retransmits a training start frame addressed to STA2 by use of phase-shifter setting different from the previous one. The retransmission of this training start frame is repeatedly performed until an ACK frame is transmitted from STA2 to AP. Random phase-shifter setting is used to retransmit this training start frame.

In this example, STA2 transmits an ACK frame with respect to a second training start frame. In order to make random phase-shifter setting in the first transmission with respect to STA2 after a beacon, random phase-shifter setting may be used from a subsequent frame, for example, if a destination MAC address is changed on the AP side. Alternatively, a proper pattern may be transferred before starting the transmission to each STA after a beacon, and, when this proper pattern is detected, random phase-shifter setting may be used from a frame subsequent thereto.

In this example, AP receives an ACK frame with respect to a second training start frame. Accordingly, phase-shifter setting 5 ("0101") fixed when the second training start frame is transmitted is used as a training initial value of phase-shifter setting on the AP side. In this example, AP transmits Null Data (i.e., frame having a data length 0 of a payload) to STA2, and an ACK frame with respect to this from STA2 is received by phase-shifter setting for training, and the phase-shifter setting on the AP side is optimized by examining its reception level.

More specifically, AP first holds the reception level of an ACK frame with respect to a training start frame as a reception level in training initial setting 5 ("0101"). Thereafter, AP transmits Null Data to STA2 without changing 5 ("0101") of phase-shifter setting, and then changes the phase-shifter setting to phase-shifter setting for training.

For example, AP changes it to 13 ("1101") in which phase-shifter setting with respect to antenna 1 is inverted, and receives an ACK frame, and examines its reception level. 5 ("0101") in phase-shifter setting is higher in the reception level, and therefore AP returns the phase-shifter setting to 5 ("0101"), and transmits Null Data. Thereafter, AP changes it to 1 ("0001") in which phase-shifter setting with respect to antenna 2 is inverted, and receives an ACK frame, and examines its reception level. The reception level at this time is higher than the reception level given when phase-shifter setting is fixed at 5 ("0101"), and therefore phase-shifter setting is fixed at 1 ("0001"), and subsequent Null Data is transmitted in accordance with this phase-shifter setting. Thereafter, AP changes it to 3 ("0011") in which phase-shifter setting with respect to antenna 3 is inverted, and receives an ACK frame, and examines its reception level. The reception level given when phase-shifter setting is fixed at 1 ("0001") is higher, and therefore the phase-shifter setting is returned to 1 ("0001"), and Null Data is transmitted. Thereafter, AP changes it to 0 ("0000") in which phase-shifter setting with respect to antenna 4 is inverted, and receives an ACK frame, and examines its reception level. In this example, the reception level is maximum when the phase-shifter setting is fixed at 1 ("0001"), and therefore AP performs the transmission of a subsequent training signal and the transmission and reception of data by use of phase-shifter setting 1 ("0001").

When the optimization of phase-shifter setting with respect to the four antennas on the AP side is completed, AP transmits a training signal to STA2 by use of the optimized phase-shifter setting 1 ("0001"). Herein, a No-Ack Null Data frame is used as a training signal. In STA2, the optimum phase-shifter setting obtained in the past training is held, and this phase-shifter setting is used not only in an immediately subsequent data transfer but also in a subsequent training transfer. Although the optimum phase-shifter setting is hourly changed by, for example, multipath fading, optimum phase-shifter setting can be determined in a short time by performing training while using previously-obtained optimum phase-shifter setting as an initial value even in this case.

In FIG. 19, although STA2 holds the previously-obtained optimum phase-shifter setting 15 ("1111"), STA2 further receives a training signal from the AP side, and further optimizes the phase-shifter setting. First, STA2 receives a first No-Ack Null Data frame by use of the previous phase-shifter setting 15 ("1111"), and obtains a reception level in the phase-shifter setting 15 ("1111"). STA2 determines that training for its own terminal has been started by receiving a No-Ack Null Data frame addressed to its own terminal, and receives a subsequent No-Ack Null Data frame by use of phase-shifter setting changed for training, and examines its reception level.

More specifically, STA2 receives a first No-Ack Null Data frame, then changes the setting to 7 ("0111") in which phase-shifter setting with respect to antenna 1 is inverted, then receives a subsequent No-Ack Null Data frame, and examines its reception level. Thereafter, STA2 receives a second No-Ack Null Data frame, then changes the setting to 11 ("1011") in which phase-shifter setting with respect to antenna 2 is inverted, then receives a subsequent No-Ack Null Data frame, and examines its reception level. Thereafter, STA2 receives a third No-Ack Null Data frame, then changes the setting to 13 ("1101") in which phase-shifter setting with respect to antenna 3 is inverted, then receives a subsequent No-Ack Null Data frame, and examines its reception level. Furthermore, STA2 receives a fourth No-Ack Null Data frame, then changes the setting to 14 ("1110") in which phase-shifter setting with respect to antenna 4 is inverted, then receives a subsequent No-Ack Null Data frame, and examines its reception level. In this example, the reception level is maximum when the phase-shifter setting is fixed at 15 ("1111"), and therefore STA2 performs the transmission and reception of subsequent data by use of phase-shifter setting 15 ("1111").

In the example of FIG. 19, the phase-shifter setting of each antenna on the AP side is fixed at random phase-shifting when a fixed period of time passes from the end of a data transfer with STA2 and the shift of the wireless device to an idle state.

In this embodiment, although the phase-shifter setting of each STA is not optimized at a time of beacon transmission, a beacon is transmitted by use of random phase-shifter setting for each beacon, and therefore at least a part of a beacon frame can be received at each STA, and hence a connection to a wireless network can be confirmed.

Figure 22:
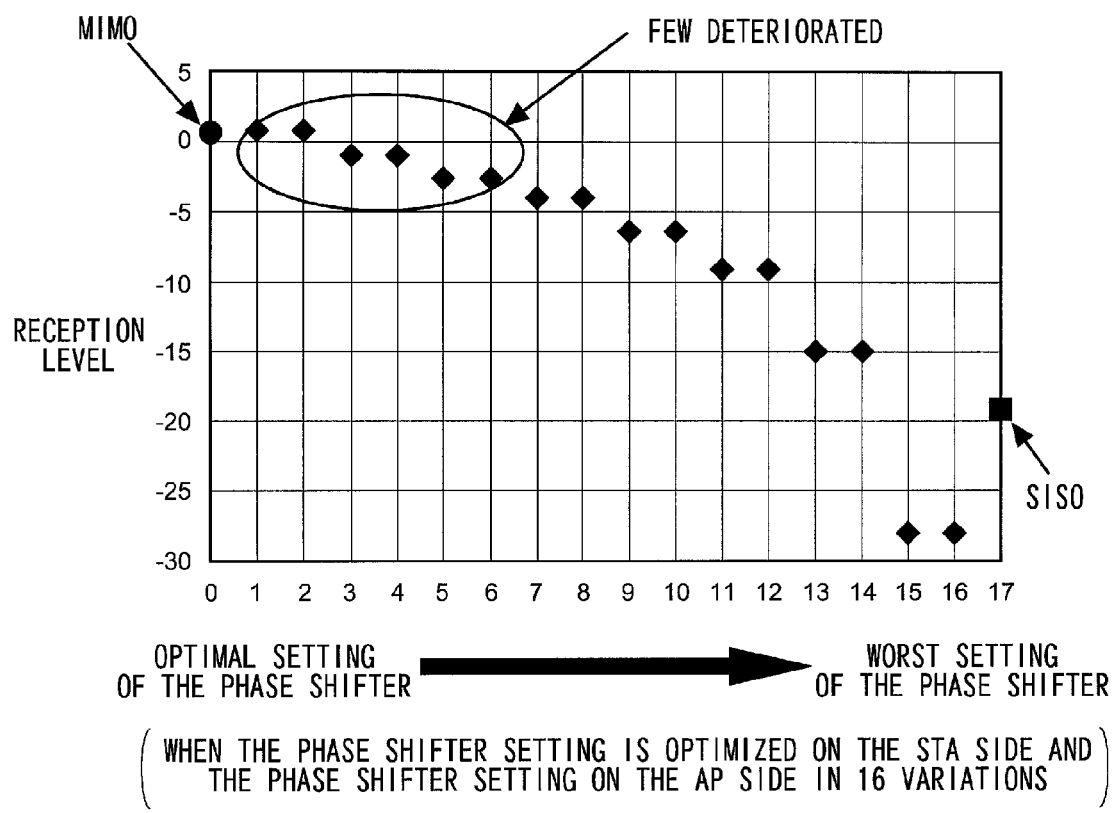
FIG. 22 is a view showing a relationship between the phase shifter setting on the AP side and the reception level obtained by being set in that way when the phase shifter setting is optimized on the STA side.

FIG. 22 is a view showing a relationship between phase-shifter setting on the AP side and a reception level obtained by being set in that way when phase-shifter setting is optimized on the STA side. From FIG. 22, it is understood that a MIMO gain of about 20 dB can be obtained if optimized phase-shifter setting is used, that the probability that a MIMO gain of 20 dB can be obtained is ⅛ if phase-shifter setting is fixed at "random," and that a MIMO gain of 15 dB or more can be obtained with a probability of about 50% even when phase-shifter setting is fixed at "random." In other words, it is understood that a beacon can be received with a probability of ⅛ or more in the periphery of an area when the area is designed in consideration of a MIMO gain of 20 dB.

Actually, the reception probability of a beacon is gradually deteriorated in proportion to a fall in the reception level. In consideration of this point, the beacon reception probability in the periphery of the area reaches a value greater than ⅛. A beacon frame is used to confirm a connection to a wireless network, and therefore all beacon frames are not necessarily required to be received, and no problem occurs when the beacon reception probability is in a state of such a degree as above. Additionally, in a wireless communication system in which wireless transmission speed is selected depending on the intended use in accordance with a wireless environment, there is also a case in which area design is formed on the assumption that not the lowest wireless transmission speed but higher wireless transmission speed is employed in order to improve a throughput in the communication area. In this case, a beacon frame can be received with a higher reception probability in the periphery of the area.

It is necessary to perform the access control of wireless transmission in the centralized control in order to first perform a two-way training transfer to each STA and then perform a data transfer to each STA as mentioned above. In a wireless system that employs a TDMA (Time Division Multiple Access) method, this can be realized by use of a scheduler function in the TDMA system. On the other hand, in a wireless system that employs the decentralized control, such as a CSMA/CA (Carrier Sense Multiple Access/Collision Avoidance) method, a series of sequences mentioned above can be realized by using, for example, a PCF (Point Coordination Function). FIG. 19 shows an example in which a PCF is used in the CSMA/CA method and in which a two-way training transfer and a two-way data transfer to each STA are performed during a CFP (Contention Free Period) declared in a beacon frame.

Although a description has been given as above of a case in which a training transfer and a data transfer to each STA are sequentially performed after transmitting a beacon, such a training transfer and a data transfer can also be realized by use of technology called "virtual AP." The virtual AP is technology in which a single AP transmits a beacon containing a plurality of pieces of different network information in terms of hardware whereas it behaves as if a plurality of APs exist in terms of logic, and hence a plurality of networks can be contained by use of the single AP.

Figure 23:
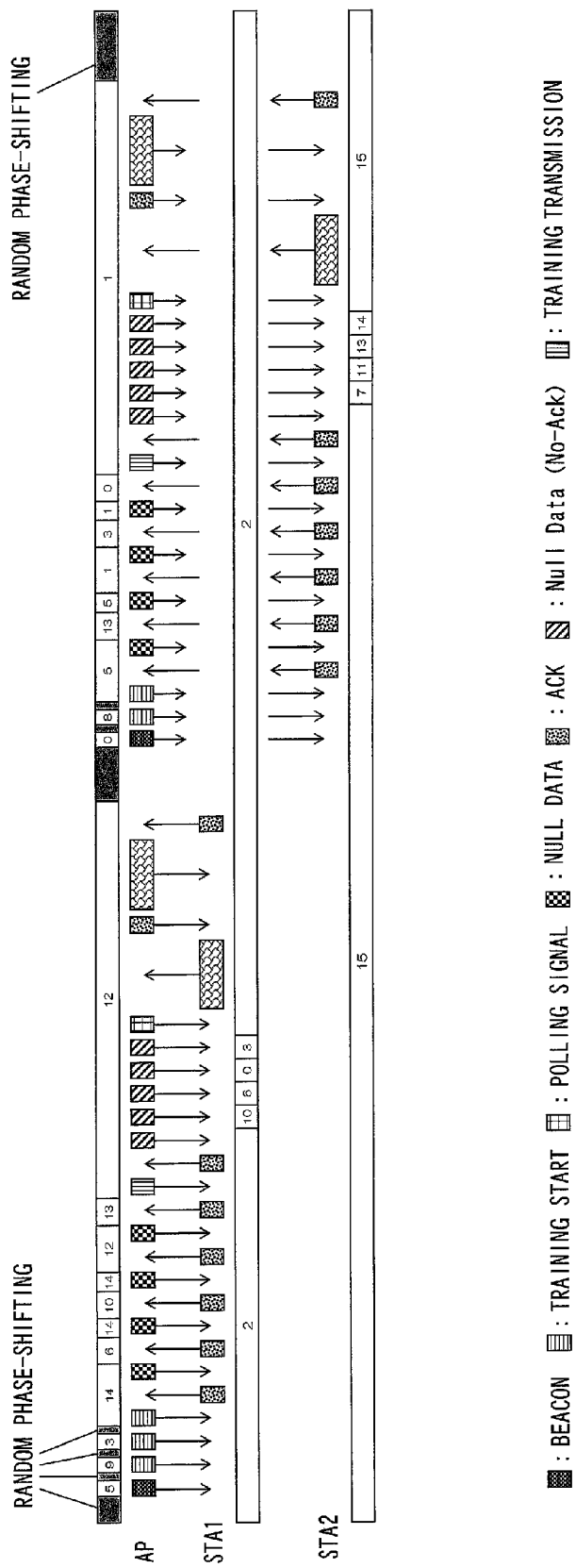
FIG. 23 is a view showing an operation example of the wireless communication system of the present invention when virtual AP technology is employed.

A description will be hereinafter given of the operation of a wireless communication system of the present invention when the virtual AP technology is employed. FIG. 23 is a view showing an operation example when a training transfer and a data transfer are performed between an AP and a plurality of STAs in this case.

Although the operation in this case is substantially the same as the operation shown in FIG. 19, there is a difference therebetween in the fact that different beacons are used for each STA. In detail, after a training transfer and a data transfer to STA1 are ended, AP fixes the phase-shifter setting at "random," and, after a subsequent beacon is transmitted, a training transfer and a data transfer to STA2 are performed. After the training transfer and the data transfer to STA2 are ended, AP again fixes the phase-shifter setting at "random." If the number of STAs is three or more, three or more beacons for each STA may be transmitted. Additionally, in order to contain a STA that does not have multiple antennas i.e., contain a single-antenna STA in the system, a beacon for the single-antenna STA may be transmitted. In FIG. 23, if a single STA or a plurality of STAs perform a power save operation, it is possible to allow each STA to perform a power save operation by use of a beacon for each STA.

Figure 24:
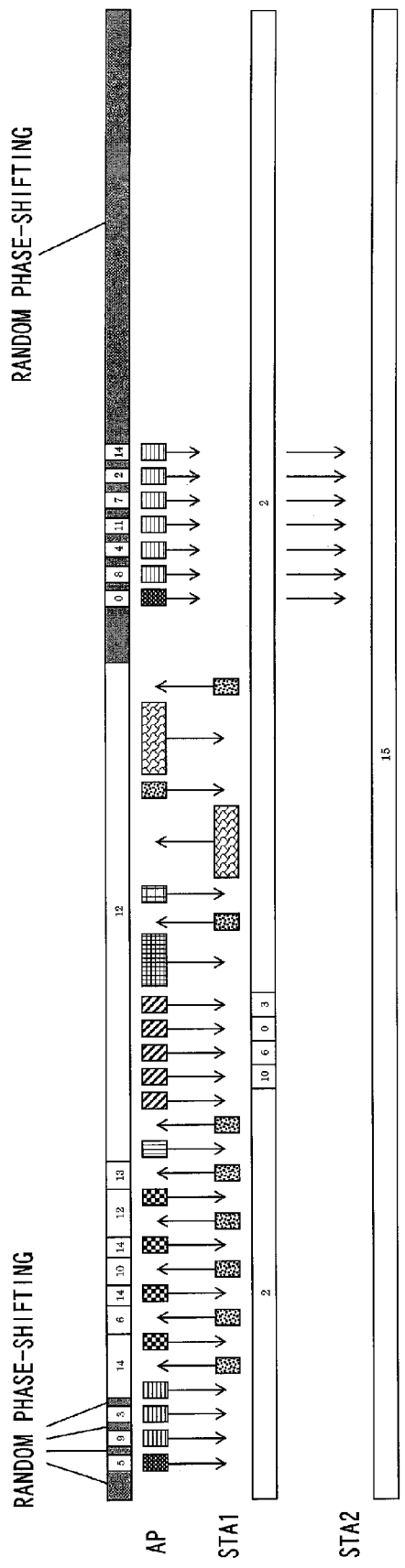
FIG. 24 is a view showing an operation example when STA performs a power save operation.

FIG. 24 is a view showing an operation example when both STA1 and STA2 perform a power save operation. STA that performs a power save operation receives each beacon, or receives beacons at intervals of k beacons (K is an integer of 2 or greater), and is in a sleep state during periods other than that. Normally, intervals at which beacons are transmitted are substantially constant. STA is brought into a sleep state from the reception of a beacon to immediately before the reception of a subsequent beacon scheduled to be received. If STA that performs a power save operation exists under the dominance of AP, AP temporarily holds a traffic (frame) addressed to this STA in an internal memory, and beforehand imparts the existence of a traffic addressed to this STA by use of TIM (Traffic Indication Map) information contained in a beacon. AP receives a response from this STA, and, for the first time, transmits the frame addressed to this STA onto a wireless transmission line.

FIG. 24 shows an example of a case in which STA1 receives a beacon whereas STA2 does not receive a beacon while being in a sleep state. The operation in this case is the same as that of FIG. 23, except that AP transmits TIM information to STA1 before starting a data transfer after the end of a training transfer.

A beacon frame is transmitted prior to a training transfer, and therefore TIM information contained therein is not necessarily received on the STA side. Therefore, in this example, TIM information is retransmitted after the training transfer is ended. Generally, a commonly-used beacon is transmitted at the lowest wireless transmission speed so as to be received by all STAs. However, in this retransmission of TIM information, the lowest wireless transmission speed is not necessarily required to be used, and higher transmission speed can be used.

In FIG. 24, STA2 is in a sleep state, and does not receive a beacon. In this case, STA2 does not respond to a training start signal emitted from AP, and therefore a training sequence is ended here, and a data transfer is not performed.

Figure 25:
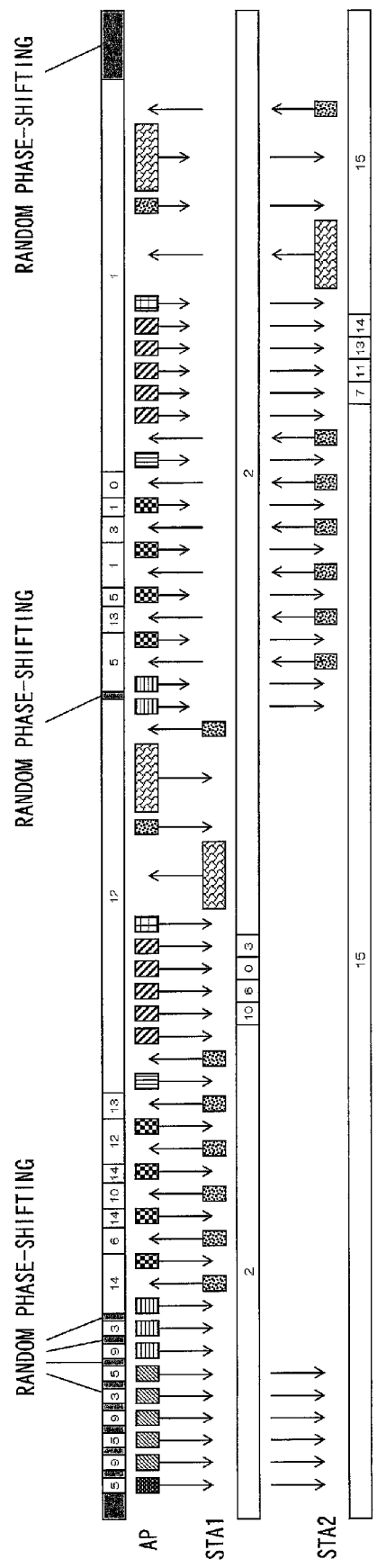
FIG. 25 is a view showing an operation example of the wireless communication system of the present invention when a multicast frame and a broadcast frame are transmitted from AP to STA.

FIG. 25 is a view showing an operation example of the wireless communication system of the present invention when a multicast frame and a broadcast frame are transmitted from AP to STA. As shown in FIG. 25, immediately after a beacon is transmitted, a multicast frame or a broadcast frame or both of them are transmitted from AP a plurality of times by use of different phase-shifter settings. As already described, if phase-shifter setting on the STA side has been optimized, a multicast frame or a broadcast frame can be transmitted to each STA with a probability of about 99.9% by allowing AP to perform retransmission ten times or so by use of different phase-shifter settings.

In a wireless communication system in which wireless transmission speed is selected depending on the intended use in accordance with a wireless environment, there is also a case in which area design is formed on the assumption that not the lowest wireless transmission speed but higher wireless transmission speed is employed in order to improve a throughput in the communication area. In this case, even when the number of retransmission times of a multicast frame or a broadcast frame is reduced, the probability that these frames will be correctly transmitted to each STA can be satisfactorily heightened.

Besides the above-mentioned method, another method can be mentioned as a method of transmitting a multicast frame or a broadcast frame from AP to STA. According to this method, a multicast frame and/or a broadcast frame is transmitted by use of the optimized phase-shifter setting obtained in training, for example, after transmitting a training signal to each STA and before transmitting data.

Figure 26:
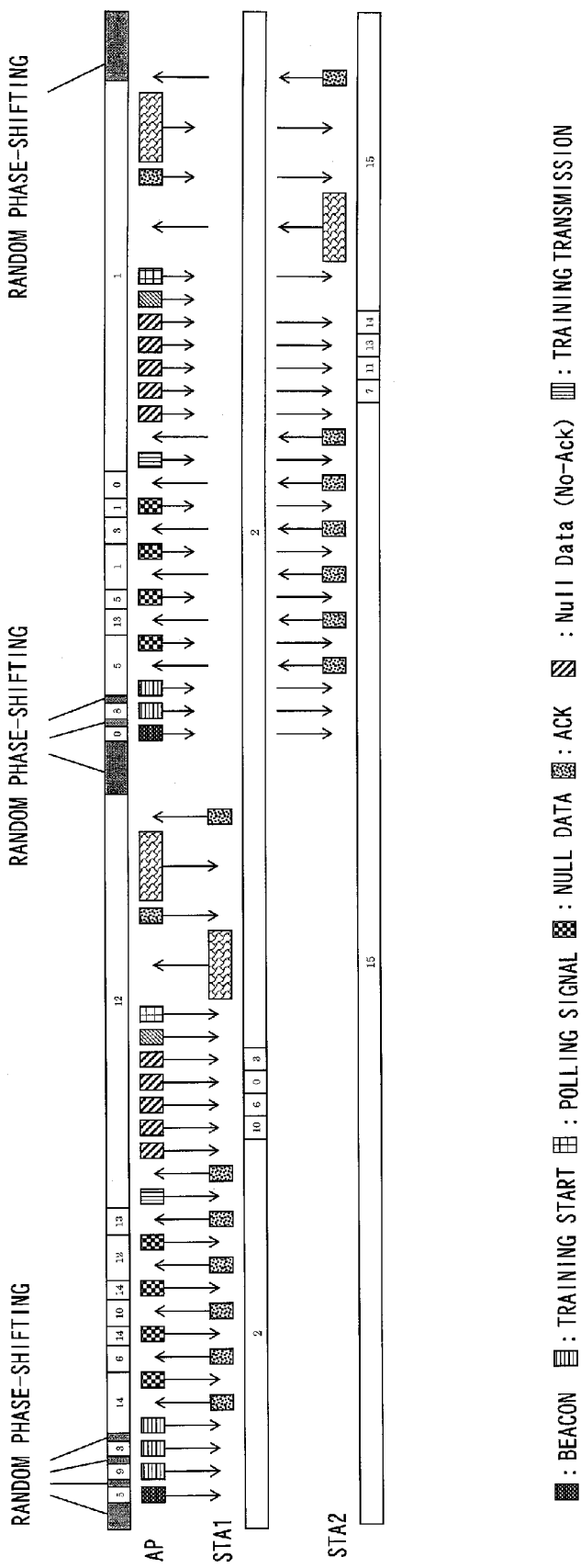
FIG. 26 is a view showing an operation example of the wireless communication system of the present invention when a multicast frame and a broadcast frame are transmitted.

FIG. 26 shows the transmission of a multicast frame and a broadcast frame from AP to STA in this case. In this example, different beacons are used for each STA while employing the virtual AP technology. Additionally, after transmitting a training signal to each STA, the same multicast frame or the same broadcast frame is transmitted by use of the optimum phase-shifter setting with respect to the STA obtained in training.

Next, a description will be given of a state in which diversity combining information becomes optimal. In the following description, the reference numerals used in FIG. 1 are appropriately used.

Figure 27:
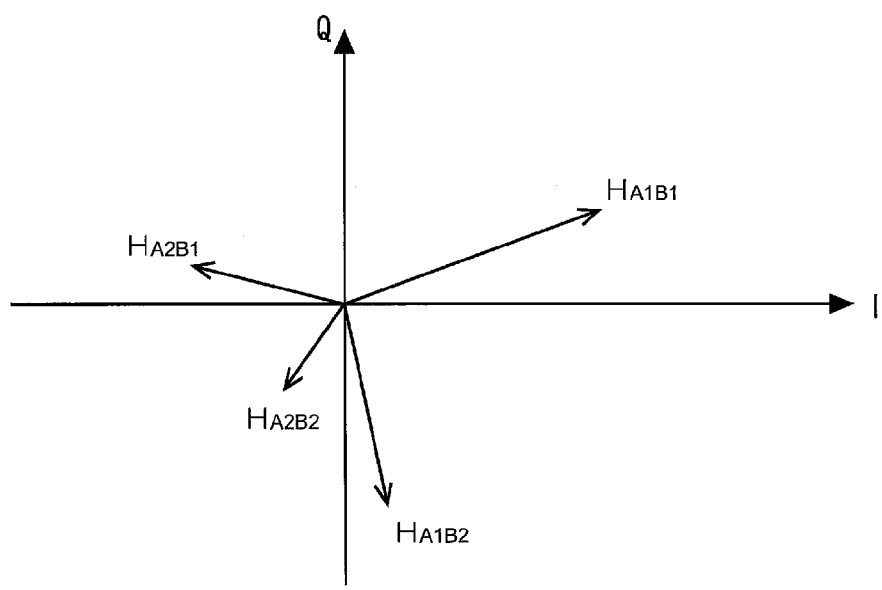
FIG. 27 is a view showing an example of a transfer function between antennas.

Let it be supposed that the number of antennas of a wireless communication device A is two, and likewise, that of a wireless communication device B is two, and let it be supposed that transfer functions between antennas A1, A2 and antennas B1, B2 are $H_{A1B1}$, $H_{A1B2}$, $H_{A2B1}$, and $H_{A2B2}$, respectively, and let it be supposed that a wireless transmission line between the wireless communication device A and the wireless communication device B is a flat multipath fading environment. Under these suppositions, transfer functions $H_{A1B1}$, $H_{A1B2}$, $H_{A2B1}$, and $H_{A2B2}$ become complex numbers, and can be expressed as vectors. FIG. 27 shows one example of transfer functions $H_{A1B1}$, $H_{A1B2}$, $H_{A2B1}$, and $H_{A2B2}$.

A multiplier connected to each of the antennas A1, A2, B1, and B2 multiplies a received signal from each of the antennas A1, A2, B1, and B2 by diversity combining information $W_{A1}$, $W_{A2}$, $W_{B1}$, and $W_{B2}$, respectively. Diversity combining information by which a transmit signal is multiplied at a time of transmission is basically the same as diversity combining information by which a received signal is multiplied at a time of reception. However, strictly, a correction, which results from the fact that a transmission system and a reception system in a two-way transfer are different from each other, is required.

The signal distributing/synthesizing units 12 and 22 output signals obtained by energetically distributing transmit signals $S_A$ and $S_B$ into two parts at a time of transmission to two multipliers, whereas the signal distributing/synthesizing units 12 and 22 output signals obtained by synthesizing (i.e., vector-adding) output signals from two multipliers as received signals $R_A$ and $R_B$ at a time of reception.

On the supposition that transmission is being performed from the wireless communication device A to the wireless communication device B, $S_A \cdot W_{A1}/\sqrt{2}$ and $S_A \cdot W_{A2}/\sqrt{2}$ are transmitted from the antennas A1 and A2 of the wireless communication device A, respectively. These signals are received by the antennas B1 and B2 of the wireless communication device B, respectively. The received signals of the antennas B1 and B2 are $S_A \cdot (W_{A1} \cdot H_{A1B1} + W_{A2} \cdot H_{A2B1})/\sqrt{2}$ and $S_A \cdot (W_{A1} \cdot H_{A1B2} + W_{A2} \cdot H_{A2B2})/\sqrt{2}$, respectively. These signals are multiplied by diversity combining information, and are added together, and, as a result, a received signal $R_B$ is generated. The received signal $R_B$ is expressed by Numerical Expression (9).

$$R_B = S_A \cdot (W_{A1} \cdot H_{A1B1} \cdot W_{B1} + W_{A2} \cdot H_{A2B1} \cdot W_{B1} + W_{A1} \cdot H_{A1B2} \cdot W_{B2} + W_{A2} \cdot H_{A2B2} \cdot W_{B2})/2 \qquad (9)$$

Next, let it be supposed that transmission is being performed from the wireless communication device B to the wireless communication device A. $S_B \cdot W_{B1}/\sqrt{2}$ and $S_B \cdot W_{B2}/\sqrt{2}$ are transmitted from the antennas B1 and B2 of the wireless communication device B, respectively. These signals are received by the antennas A1 and A2 of the wireless communication device A, respectively. The received signals of the antennas A1 and A2 are $S_B \cdot (W_{B1} \cdot H_{A1B1} + W_{B2} \cdot H_{A1B2})/\sqrt{2}$ and $S_B \cdot (W_{B1} \cdot H_{A2B1} + W_{B2} \cdot H_{A2B2})/\sqrt{2}$, respectively. These signals are multiplied by diversity combining information, and are added together, and, as a result, a received signal $R_A$ is generated. The received signal $R_A$ is expressed by Numerical Expression (10), which is the same as the received signal $R_B$.

$$R_A = S_B \cdot (W_{A1} \cdot H_{A1B1} \cdot W_{B1} + W_{A2} \cdot H_{A2B1} \cdot W_{B1} + W_{A1} \cdot H_{A1B2} \cdot W_{B2} + W_{A2} \cdot H_{A2B2} \cdot W_{B2})/2 \qquad (10)$$

A state in which pieces of diversity combining information $W_{A1}$, $W_{A2}$, $W_{B1}$, and $W_{B2}$ are optimum denotes a state in which the level of received signals $R_A$ and $R_B$ is maximum and in which a MIMO gain is maximum. When the amplitude of each of the pieces of diversity combining information $W_{A1}$, $W_{A2}$, $W_{B1}$, and $W_{B2}$ is made proportionate to the amplitude of the received signal of each antenna, maximal ratio combining is reached, and, when the amplitude of each of the pieces of diversity combining information $W_{A1}$, $W_{A2}$, $W_{B1}$, and $W_{B2}$ is fixed at a constant value, e.g., at 1, equal gain combining is reached.

Generally, received signals $R_A$ and $R_B$ contain (M×N) $W_{Ai} \cdot H_{AiBj} \cdot W_{Bj}$ components in which M is the number of antennas of the wireless communication device A, and N is the number of antennas of the wireless communication device B. Each of these components is hereinafter referred to as an "elementary wave $S_{AiBj}$." Each elementary wave $S_{AiBj}$ is expressed by the product of three complex numbers, i.e., a transfer function $H_{AiBj}$ between a transmitting antenna Ai and a receiving antenna Bj, diversity combining information $W_{Ai}$ with respect to the transmitting antenna Ai, and diversity combining information $W_{Bj}$ with respect to the receiving antenna Bj.

Each elementary wave $S_{AiBj}$ is vector quantity. The level of received signals $R_A$ and $R_B$ can be maximized by allowing the directions of (M×N) elementary waves $S_{AiBj}$ to coincide with each other, and the pieces of diversity combining information $W_{A1}$, $W_{A2}$, $W_{B1}$, and $W_{B2}$ reach the optimum at that time.

Figure 28A:
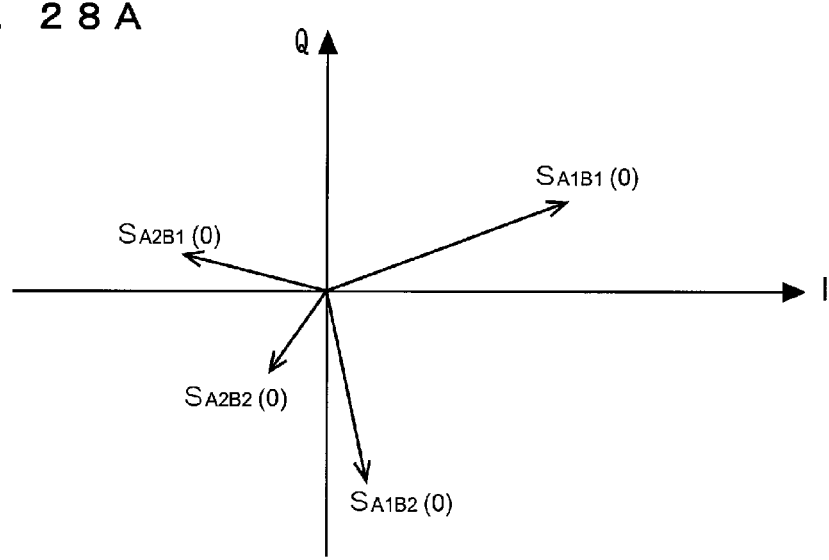
FIG. 28A is an explanatory view showing an example of the updating of diversity combining information (elementary wave $S_{A_iB_j}$) in the present invention.
Figure 28B:
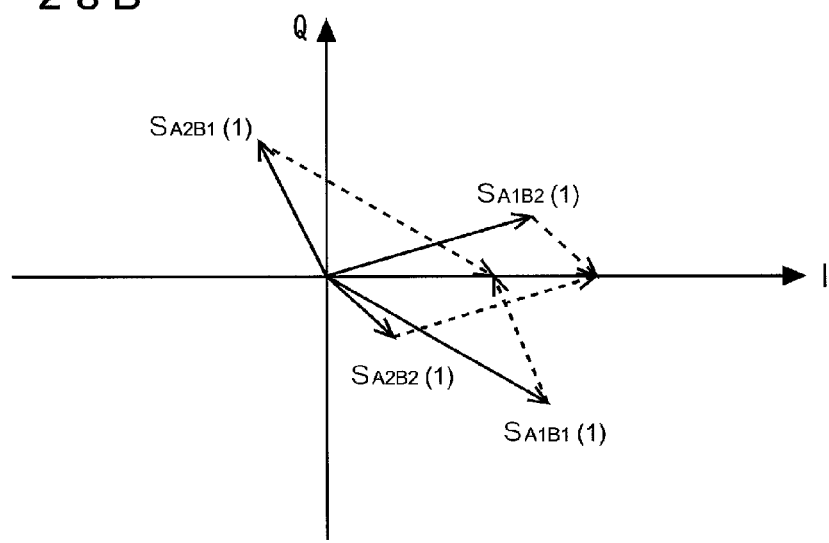
FIG. 28B is an explanatory view showing an example of the updating of diversity combining information (elementary wave $S_{A_iB_j}$) in the present invention.
Figure 28C:
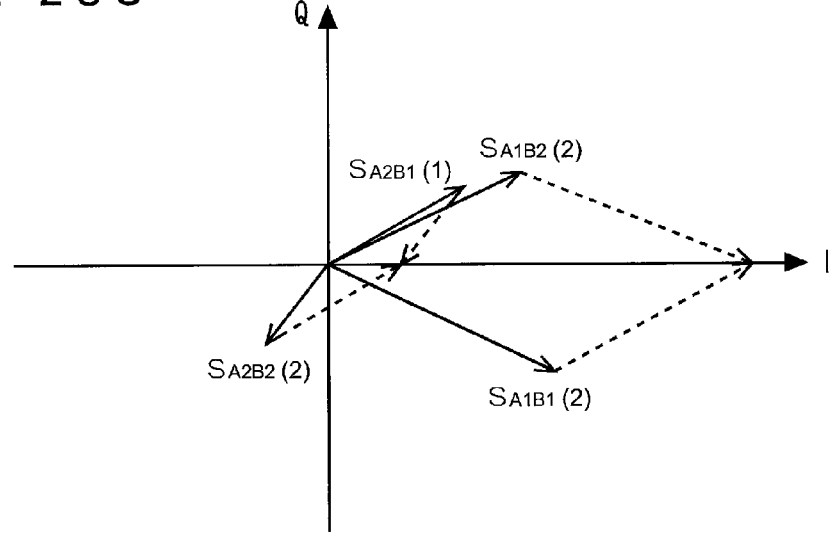
FIG. 28C is an explanatory view showing an example of the updating of diversity combining information (elementary wave $S_{A_iB_j}$) in the present invention.
Figure 29A:
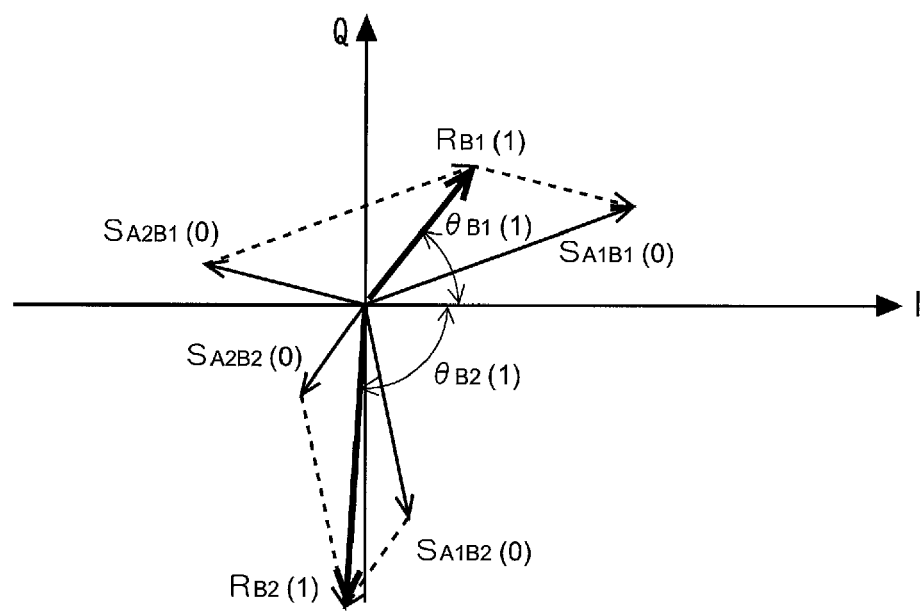
FIG. 29A is an explanatory view showing an example of the updating of diversity combining information (received signal $R_x$) in the present invention.
Figure 29B:
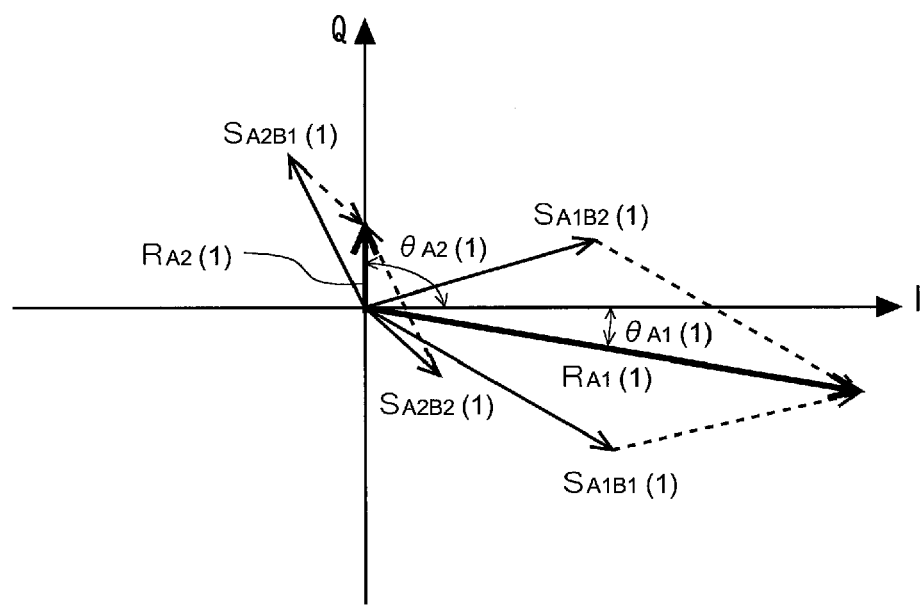
FIG. 29B is an explanatory view showing an example of the updating of diversity combining information (received signal $R_x$) in the present invention.

FIG. 28A, FIG. 28B, FIG. 28C, FIG. 29A and FIG. 29B are explanatory views showing one example of the operation performed when the directions of elementary waves $S_{AiBj}$ (i=1, 2, j=1, 2) are arranged to coincide with the I-axis direction through a transfer between the two wireless communication devices A and B. FIG. 28A, FIG. 28B and FIG. 28C show the update of an elementary wave $S_{AiBj}$, and FIG. 29A and FIG. 29B show the update of a received signal $R_X$. In FIG. 29A and FIG. 29B, the phase of a received signal $R_X(k)$ of each antenna is shown by $\theta_X(k)$. For convenience of a simple description, hereinafter, a transfer function $H_{AiBj}$ is assumed to be always constant and to be not changed with the lapse of time.

An elementary wave $S_{AiBj}$ being in an initial state is represented as $S_{AiBj}(0)$, and an elementary wave $S_{AiBj}$ in which diversity combining information has been already updated k times (k is an integer of 1 or greater) is represented as $S_{AiBj}(k)$. Additionally, a received signal $R_X$ being in an initial state is represented as $R_X(0)$, and a received signal $R_X$ in which diversity combining information has been already updated k times (k is an integer of 1 or greater) is represented as $R_X(k)$. Although the update of diversity combining information is performed only on the receiving side, an elementary wave $S_{AiBj}$ contains diversity combining information $W_{A1}$, $W_{A2}$, $W_{B1}$, and $W_{B2}$ of both of the wireless communication devices A and B, and therefore the elementary wave $S_{AiBj}$ does not depend on the direction of a transfer, and is updated whenever a transfer is performed. The received signals $R_A$ and $R_B$ are signals obtained by allowing received signals from two antennas of the receiving-side wireless communication device to undergo diversity combining, and received signals $R_{A1}$, $R_{A2}$, $R_{B1}$, and $R_{B2}$ of the antennas A1, A2, B1, and B2 are also updated whenever the elementary wave $S_{AiBj}$ is updated.

FIG. 28A shows an elementary wave $S_{AiBj}(0)$ in an initial state. The pieces of diversity combining information $W_{A1}$, $W_{A2}$, $W_{B1}$, and $W_{B2}$ in an initial state are all fixed at 1, and therefore the elementary wave $S_{AiBj}(0)$ coincides with the transfer function $H_{AiBj}$ of FIG. 27.

When the transmission from the wireless communication device A to the wireless communication device B is performed in an initial state, the diversity combining information of the wireless communication device B is updated. FIG. 12A shows received signals $R_{B1}(1)$ and $R_{B2}(1)$ by the antennas B1 and B2 of the wireless communication device B when the transmission from the wireless communication device A to the wireless communication device B is performed in an initial state.

The received signal $R_{B1}(1)$ by the antenna B1 is a synthetic signal of two elementary waves $S_{A1B1}(0)$ and $S_{A2B1}(0)$, and the received signal $R_{B2}(1)$ by the antenna B2 is a synthetic signal of two elementary waves $S_{A1B2}(0)$ and $S_{A2B2}(0)$. In the wireless communication device B, diversity combining is performed by applying phase-shifting processing to the two received signals $R_{B1}(1)$ and $R_{B2}(1)$ so that the directions of vectors of these received signals coincide with that of the I axis. In other words, diversity combining is performed such that the vector of the received signal $R_{B1}(1)$ is rotated by $-\theta_{B1}(1)$ ($\theta_{B1}(1)$ is positive) whereas the vector of the received signal $R_{B2}(1)$ is rotated by $-\theta_{B2}(1)$ ($\theta_{B2}(1)$ is negative). This processing corresponds to fixing the pieces of diversity combining information $W_{B1}$ and $W_{B2}$ at $\exp\{-j\theta_{B1}(1)\}$ and $\exp\{-j\theta_{B2}(1)\}$, respectively. Accordingly, the elementary waves $S_{A1B1}(0)$ and $S_{A2B1}(0)$ are rotated by $-\theta_{B1}(1)$ whereas the elementary waves $S_{A1B2}(0)$ and $S_{A2B2}(0)$ are rotated by $-\theta_{B2}(1)$. FIG. 28B shows these circumstances.

The diversity combining information of the wireless communication device A is updated when the transmission from the wireless communication device B to the wireless communication device A is performed subsequently to the transmission from the wireless communication device A to the wireless communication device B. The elementary wave $S_{AiBj}$ has been updated to an elementary wave $S_{AiBj}(1)$ (see FIG. 28B) after the pieces of diversity combining information $W_{A1}$, $W_{A2}$, $W_{B1}$, and $W_{B2}$ are updated by the transmission from the wireless communication device A to the wireless communication device B. The transmission from the wireless communication device B to the wireless communication device A is performed by use of the elementary wave $S_{AiBj}(1)$. FIG. 29B shows received signals $R_{A1}(1)$ and $R_{A2}(1)$ by the antennas A1 and A2 of the wireless communication device A at this time. The received signal $R_{A1}(1)$ by the antenna A1 is a synthetic signal of two elementary waves $S_{A1B1}(1)$ and $S_{A1B2}(1)$, and the received signal $R_{A2}(1)$ by the antenna A2 is a synthetic signal of two elementary waves $S_{A2B1}(1)$ and $S_{A2B2}(1)$.

In the wireless communication device A, diversity combining is performed by applying phase-shifting processing to the two received signals $R_{A1}(1)$ and $R_{A2}(1)$ so that the directions of vectors of these received signals coincide with that of the I axis. In other words, diversity combining is performed such that the vector of the received signal $R_{A1}(1)$ is rotated by $-\theta_{A1}(1)$ whereas the vector of the received signal $R_{A2}(1)$ is rotated by $-\theta_{A2}(1)$. This processing corresponds to fixing the pieces of diversity combining information $W_{A1}$ and $W_{A2}$ at $\exp\{-j\theta_{A1}(1)\}$ and $\exp\{-j\theta_{A2}(1)\}$, respectively. Accordingly, the elementary waves $S_{A1B1}(1)$ and $S_{A1B2}(1)$ are rotated by $-\theta_{A1}(2)$ whereas the elementary waves $S_{A2B1}(1)$ and $S_{A2B2}(1)$ are rotated by $-\theta_{A2}(2)$. FIG. 28C shows these circumstances.

From FIG. 28A to FIG. 28C, it is understood that each elementary wave $S_{AiBj}$ is arranged to have its direction approximating the direction of the I axis by updating the diversity combining information $W_{A1}$, $W_{A2}$, $W_{B1}$, and $W_{B2}$ while once performing transmission in one direction and once performing transmission in the other direction of the two-way-transfer directions. If diversity combining information is successively updated while repeatedly performing the two-way transfer, the direction of each elementary wave $S_{AiBj}$ can be brought closer to the direction of the I axis. However, the number of controllable phases is only (M+N) with respect to (M×N) elementary waves $S_{AiBj}$, and therefore, generally, all elementary waves $S_{AiBj}$ cannot be arranged to completely coincide with the direction of the I axis. In the present invention, as a result, a state in which the directions of elementary waves $S_{AiBj}$ coincide with each other or approximate each other is obtained through two-way training.

It is known that a desirable method for maximizing the level of the received signals $R_A$ and $R_B$ is to use an eigenvector having a maximum eigenvalue in the correlation matrix of the transmission line matrix as diversity combining information. However, as described above, the calculation amount is problematic to calculate diversity combining information that maximizes a received signal when the number of antennas is large. Hence, in the present invention, the value optimum of diversity combining information is found as a result through a two-way training signal transfer. Reception level information is used as an indicator at this time. However, the number of controllable phase-shifting amounts is only (M+N) in spite of the fact that (M×N) elementary waves $S_{AiBj}$ exist, and therefore, actually, cases in which the directions of all vectors can be arranged to coincide with each other are restricted to a special case in which the transmission line matrix satisfies a specific condition.

The fact that value optimums of diversity combining information can be found while using reception level information in a two-way transfer between the wireless communication devices A and B as an indicator will be hereinafter described by use of numerical expressions. Herein, a generalized example is given in which the wireless communication device A has M antennas and the wireless communication device B has N antennas.

First, the electric power (reception level information) of a received signal in the transfer between the wireless communication devices A and B is calculated from numerical expressions. A transmission line matrix $H_{AB}$ in the transfer from the wireless communication device A to the wireless communication device B is expressed by Numerical Expression (11) now.

$$H_{AB} = \begin{bmatrix} h_{1,1} \cdot h_{1,2} & \ldots & h_{1,M} \\ h_{2,1} \cdot h_{2,2} & \ldots & h_{2,M} \\ \vdots & & \\ h_{N,1} \cdot h_{N,2} & \ldots & h_{N,M} \end{bmatrix} \quad (11)$$

Herein, $h_{i,j}$ are complex numbers and represent transfer functions between an antenna Aj of the wireless communication device A and an antenna Bi of the wireless communication device B. Pieces of diversity combining information $W_A$ and $W_B$ in the wireless communication devices A and B are expressed by Numerical Expressions (12) and (13), respectively. $X^T$ represents the transposed matrix of matrix X.

$$W_A = \{w_{A1} \cdot w_{A2} \cdot \ldots \cdot w_{AM}\}^T \quad (12)$$

$$W_B = \{w_{B1} \cdot w_{B2} \cdot \ldots \cdot w_{BN}\}^T \quad (13)$$

When the transmission from the wireless communication device A to the wireless communication device B is performed, Numerical Expression (14) is formulated in which $S_{AB}$ is a transmit signal that is input to the signal distributing/synthesizing unit 12 of the wireless communication device A, and $R_{AB}$ is a received signal that is output from the signal distributing/synthesizing unit 22 of the wireless communication device B. $N_B$ represents a thermal noise in each of the antennas $B_1$ to $B_N$ of the wireless communication device B.

$$R_{AB} = W_B^T \cdot [H_{AB} \cdot W_A \cdot S_{AB} + N_B] \quad (14)$$

Average received-signal power $P_B$ in the wireless communication device B at this time is expressed by Numerical Expression (15). E[X] represents the ensemble average of X.

$$P_B = E[|R_{AB}|^2] \quad (15)$$

Numerical Expression (16) can be obtained by substituting Numerical Expression (14) for Numerical Expression (15). $X^\dagger$ represents the complex conjugate transposition of X.

$$P_B = |W_B^T \cdot H_{AB} \cdot W_A|^2 \cdot P_S + W_B^T \cdot W_B^\dagger \cdot P_N \quad (16)$$

Herein, $P_S$ is average transmitting power in the wireless communication device A, and is expressed by Numerical Expression (17). Additionally, average noise power in each of the antennas $B_1$ to $B_N$ of the wireless communication device B is assumed to be the same, and is represented as $P_N$. That is, Numerical Expression (18) is assumed to be formulated. $I_N$ represents an N-dimensional unit matrix.

$$P_S = E[|S_{AB}|^2] \quad (17)$$

$$N_B \cdot N_B^T = P_N \cdot I_N \quad (18)$$

On the other hand, when the transmission from the wireless communication device B to the wireless communication device A is performed, Numerical Expression (19) is formulated in which $S_{BA}$ is a transmit signal that is input to the signal distributing/synthesizing unit 22 of the wireless communication device B, and $R_{BA}$ is a received signal that is output from the signal distributing/synthesizing unit 12 of the wireless communication device A. $N_A$ represents a thermal noise in each of the antennas $A_1$ to $A_M$ of the wireless communication device A.

$$R_{BA} = W_A^T \cdot [H_{BA} \cdot W_B \cdot S_{BA} + N_A] \quad (19)$$

Average received-signal power $P_A$ in the wireless communication device A at this time is expressed by Numerical Expression (20).

$$P_A = |W_A^T \cdot H_{AB}^T \cdot W_B|^2 \cdot P_S + W_A^T \cdot W_A^\dagger \cdot P_N \quad (20)$$

Herein, the average transmitting power in the wireless communication device B is assumed to be the same as the average transmitting power $P_S$ in the wireless communication device A. Likewise, the average noise power in each of the antennas $A_1$ to $A_M$ of the wireless communication device A is assumed to be the same as the average noise power $P_N$ in each of the antennas $B_1$ to $B_N$ of the wireless communication device B.

As mentioned above, the average received-signal powers $P_A$ and $P_B$ in the wireless communication devices A and B are expressed by Numerical Expressions (20) and (16), respectively.

Thereafter, a condition for maximizing the electric power (Numerical Expressions (20) and (16)) of the received signals $R_A$ and $R_B$ is calculated. Generality will not be lost even if the sizes of the pieces of diversity combining information $W_A$ and $W_B$ are both fixed at 1, and therefore Numerical Expressions (16) and (20) can be consolidated into Numerical Expression (22) by applying Numerical Expression (21).

$$\lambda = |W_B^T \cdot H_{AB} \cdot W_A|^2 = |W_A^T \cdot H_{AB}^T \cdot W_B|^2 \quad (21)$$

$$P = \lambda \cdot P_S + P_N \quad (22)$$

A condition for maximizing P of Numerical Expression (22) can be calculated by use of Lagrange's method of undetermined multipliers. In more detail, a condition in which $\lambda$ reaches the maximum under the condition that the sizes of the pieces of diversity combining information $W_A$ and $W_B$ are both 1 can be calculated by use of Lagrange's method of undetermined multipliers.

Function $U(W_A, W_B, \lambda_A, \lambda_B)$ is defined by Numerical Expression (23) now. X* represents the complex conjugate of X.

$$U(W_A, W_B, \lambda_A, \lambda_B) = \lambda - \lambda_A \cdot (W_A^T \cdot W_A^\dagger - 1) - \lambda_B \cdot (W_B^T \cdot W_B^* - 1) \quad (23)$$

The condition in which $\lambda$ reaches the maximum at this time is expressed by Numerical Expression (24).

$$\frac{\partial U}{\partial W_A} = \frac{\partial U}{\partial W_B} = \frac{\partial U}{\partial \lambda_A} = \frac{\partial U}{\partial \lambda_B} = 0 \quad (24)$$

The latter two conditions in Numerical Expression (24) are conditions allowing that the sizes of the pieces of diversity combining information $W_A$ and $W_B$ are 1. On the other hand, Numerical Expressions (25) and (26) can be obtained by arranging the former two conditions in Numerical Expression (24).

$$[H_{AB}^T \cdot W_B \cdot W_B^\dagger \cdot H_{AB}^*] \cdot W_A^* = \lambda_A \cdot W_A^* \quad (25)$$

$$[H_{AB} \cdot W_A \cdot W_A^\dagger \cdot H_{AB}^{\dagger *}] \cdot W_B^* = \lambda_B \cdot W_B^* \quad (26)$$

Numerical Expression (27) can be obtained by substituting Numerical Expressions (25) and (26) for Numerical Expression (21). $\lambda_A$ and $\lambda_B$ are equal to each other, and hence $\lambda_A$ and $\lambda_B$ are both written as $\lambda$ hereinafter.

$$\lambda_A = \lambda_B = \lambda \quad (27)$$

By the way, $R_{B0}$ is expressed by Numerical Expression (28) in which $R_{B0}$ is vectors of received signals by N antennas $B_1$ to $B_N$ of the wireless communication device B when a transmit signal $S_{AB}$ is 1 in the transmission from the wireless communication device A to the wireless communication device B.

$$R_{B0} = H_{AB} \cdot W_A \quad (28)$$

Numerical Expression (29) can be obtained by substituting Numerical Expression (28) for Numerical Expression (26).

$$[R_{B0} \cdot R_{B0}^\dagger] \cdot W_B^* = \lambda \cdot W_B^* \quad (29)$$

Numerical Expression (29) is formulated when a maximal-ratio-combining diversity operation is performed in the wireless communication device B, i.e., when diversity combining information $W_B$ becomes $W_B = R_{B0}^* / \sqrt{\lambda}$.

Likewise, $R_{A0}$ is expressed by Numerical Expression (30) in which $R_{A0}$ is vectors of received signals by M antennas $A_1$ to $A_M$ of the wireless communication device A when a transmit signal $S_{BA}$ is 1 in the transmission from the wireless communication device B to the wireless communication device A.

$$R_{A0} = H_{AB}^T \cdot W_B \quad (30)$$

Numerical Expression (31) can be obtained by substituting Numerical Expression (30) for Numerical Expression (25).

$$[R_{A0} \cdot R_{A0}^\dagger] \cdot W_A^* = \lambda \cdot W_A^* \quad (31)$$

Numerical Expression (31) is formulated when a maximal-ratio-combining diversity operation is performed in the wireless communication device A, i.e., when diversity combining information $W_A$ becomes $W_A = R_{A0}^* / \sqrt{\lambda}$.

As mentioned above, $W_A = R_{A0}^* / \sqrt{\lambda}$ and $W_B = R_{B0}^* / \sqrt{\lambda}$ are formulated when diversity combining information of transmission/reception is set so that the average received-signal power reaches the maximum in the MIMO transfer. This denotes that the diversity combining information under the condition that the average received-signal power reaches the maximum coincides with the diversity combining information of the maximal ratio combining diversity.

An algorithm according to which diversity combining information converges through a two-way transfer between the wireless communication devices A and B can be expressed by Numerical Expressions (32) and (33) if this algorithm is mathematically expressed.

$$[H_{AB} \cdot W_A(k_A) \cdot W_A^\dagger(k_A) \cdot H_{AB}^\dagger] \cdot W_B^*(k_B+1) = \lambda \cdot W_B^*(k_B+1) \quad (32)$$

$$[H_{AB}^T \cdot W_B(k_B) \cdot W_B^\dagger(k_B) \cdot H_{AB}^\dagger] \cdot W_A^*(k_A+1) = \lambda \cdot W_A^*(k_A+1) \quad (33)$$

In Numerical Expressions (32) and (33), $W_X(k)$ (X is A or B) designates diversity combining information obtained when the number of updating times of the diversity combining information is k in a wireless communication device X. Numerical Expression (22) expresses an updating operation of diversity combining information in the wireless communication device B in the transmission from the wireless communication device A to the wireless communication device B, whereas Numerical Expression (23) expresses an updating operation of diversity combining information in the wireless communication device A in the transmission from the wireless communication device B to the wireless communication device A.

Numerical Expressions (32) and (33) express an operation in which diversity combining information is successively updated so as to reach maximal ratio combining in a wireless communication device disposed on the receiving side with respect to a received signal obtained when a symbol, or the like, contained in a frame or an extended preamble of each of the transmit signals $S_{AB}$ and $S_{BA}$ fixed at 1 is received by the antennas $A_1$ to $A_M$ and $B_1$ to $B_N$.

For example, vectors, in which all components are equal in magnitude to each other and in which all components are directed in the direction of the I axis, expressed by Numerical Expressions (34) and (35) can be used as an initial value of diversity combining information.

$$W_A(0)=\{1\cdot,1\cdot,\ldots,\cdot 1\}^T \quad (34)$$

$$W_B(0)=\{1\cdot,1\cdot,\ldots,\cdot 1\}^T \quad (35)$$

Finally, a description will be given of the fact that diversity combining information that satisfies Numerical Expressions (25) and (26) can be found by applying the algorithm shown by Numerical Expressions (32) and (33).

Numerical Expression (25) expresses that the eigenvector of an M-order square matrix $[H_{AB}^T \cdot W_B \cdot W_B^\dagger \cdot H_{AB}^*]$ is $W_A^*$. On the other hand, Numerical Expression (26) expresses the eigenvector of an N-order square matrix $[H_{AB} \cdot W_A \cdot W_A^\dagger H_{AB}^H]$ is $W_B^*$. These eigenvectors can be expressed by Numerical Expressions (36) and (37), respectively.

$$W_A^* = \frac{H_{AB}^T \cdot W_B}{\sqrt{\lambda}} \quad (36)$$

$$W_B^* = \frac{H_{AB} \cdot W_A}{\sqrt{\lambda}} \quad (37)$$

The algorithms of Numerical Expressions (32) and (33) can be expressed by Numerical Expressions (38) and (39) when Numerical Expressions (36) and (37) are used.

$$W_A^*(k_A + 1) = \frac{H_{AB}^T \cdot W_B(k_B)}{\sqrt{\lambda}} \quad (38)$$

$$W_B^*(k_B + 1) = \frac{H_{AB} \cdot W_A(k_A)}{\sqrt{\lambda}} \quad (39)$$

A recurrence formula relative to diversity combining information $W_A$ and $W_B$ can be obtained from Numerical Expressions (38) and (39). This recurrence formula is expressed by Numerical Expressions (40) and (41).

$$W_A(k_A + 1) = \frac{H_{AB}^\dagger \cdot H_{AB} \cdot W_A(k_A)}{\lambda} \quad (40)$$

$$W_B(k_B + 1) = \frac{H_{AB}^* \cdot H_{AB}^T \cdot W_B(k_B)}{\lambda} \quad (41)$$

From Numerical Expressions (40) and (41), algorithms for calculating the diversity combining information $W_A$ and $W_B$ are expressed by Numerical Expressions (42) and (43).

$$W_A(k_A) = \left[\frac{H_{AB}^\dagger \cdot H_{AB}}{\lambda}\right]^{k_A} \cdot W_A(0) \quad (42)$$

$$W_B(k_B) = \left[\frac{H_{AB}^* \cdot H_{AB}^\dagger}{\lambda}\right]^{k_B} \cdot W_B(0) \quad (43)$$

From Numerical Expressions (36) and (37), Numerical Expressions (44) and (45) are formulated.

$$[H_{AB}^\dagger \cdot H_{AB}] \cdot W_A = \lambda_A \cdot W_A \quad (44)$$

$$[H_{AB}^* \cdot H_{AB}^T] \cdot W_B = \lambda \cdot W_B \quad (45)$$

It is understood from Numerical Expressions (44) and (45) that the pieces of diversity combining information $W_A$ and $W_B$ are eigenvectors of correlation matrixes $[H_{AB}^\dagger \cdot H_{AB}]$ and $[H_{AB}^* \cdot H_{AB}^T]$, respectively. Additionally, it is understood that the pieces of diversity combining information $W_A$ and $W_B$ satisfy the condition of Numerical Expression (24), and hence are eigenvectors with respect to maximum eigenvalues. In other words, the maximum numbers of eigenvectors that satisfy Numerical Expressions (44) and (45) are M and N, respectively, and it is understood that the pieces of diversity combining information $W_A$ and $W_B$ expressed by Numerical Expressions (42) and (43) are eigenvectors with respect to maximum eigenvalues, and $[H_{AB}^\dagger \cdot H_{AB}]^k \cdot W_A(0)$ and $[H_{AB}^* \cdot H_{AB}^T]^k \cdot W_B(0)$ converge on eigenvectors with respect to maximum eigenvalues in proportion to the increase of k.

Therefore, it is understood that optimum diversity combining information $W_A$ and $W_B$ can be calculated according to an asymptotic algorithm that determines the diversity combining information of the receiving side so that the average received power reaches the maximum.

Figure 30A:
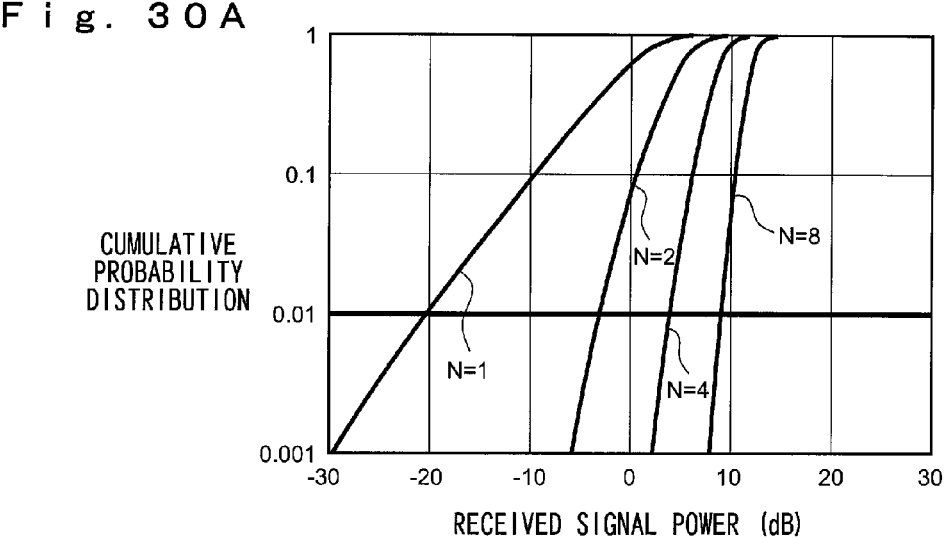
FIG. 30A is a view showing a simulation result of the probability distribution of a received signal when the number of updating times of diversity combining information is changed.
Figure 30B:
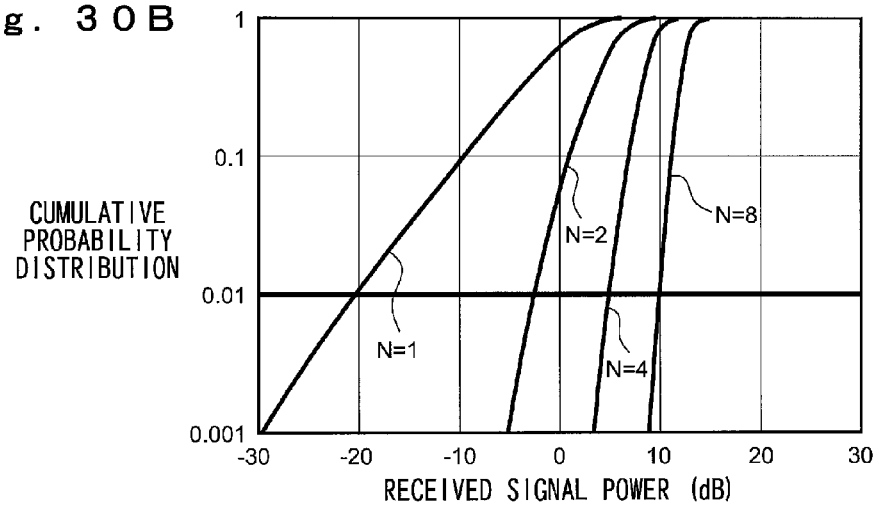
FIG. 30B is a view showing a simulation result of the probability distribution of a received signal when the number of updating times of diversity combining information is changed.
Figure 30C:
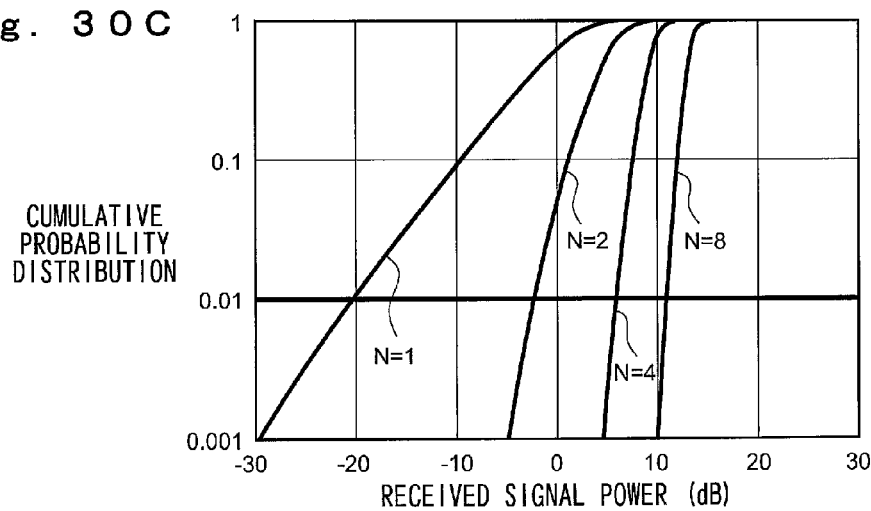
FIG. 30C is a view showing a simulation result of the probability distribution of a received signal when the number of updating times of diversity combining information is changed.
Figure 38:
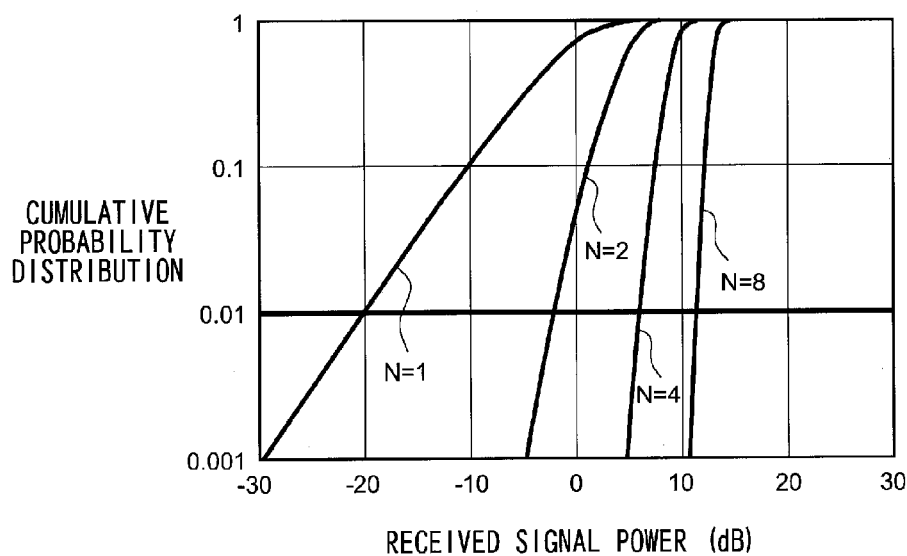
FIG. 38 is a view showing a relationship between the number N of antennas and a MIMO gain when over-the-horizon propagation is performed, and the received signal power conforms to Rayleigh distribution.

FIG. 30A, FIG. 30B and FIG. 30C are views showing an example of a simulation result of the probability distribution of a received signal when the number of updating times of diversity combining information is changed. FIG. 30A, FIG. 30B, and FIG. 30C show a case in which the number of updating times is 1, a case in which the number of updating times is 2, and a case in which the number of updating times is 32, respectively. Herein, it is supposed that radio wave propagation between antennas is mutually-independent Rayleigh fading. It is understood from FIG. 30A, FIG. 30B and FIG. 30C that a MIMO gain substantially equal to that of FIG. 38 can be obtained by performing updating only once or only twice. In other words, it is understood that eigenbeam transfer with respect to a maximum eigenvalue can be approximately realized by extremely simple training.

In a case in which optimum diversity combining information can be obtained in one of the wireless communication devices whereas optimum diversity combining information cannot be obtained in the other wireless communication device, the number of times a training signal required to form an optimum eigenbeam is transferred is not constant, depending on whether a first training sequence is transmitted from one of the wireless communication devices or from the other wireless communication device.

Figure 31:
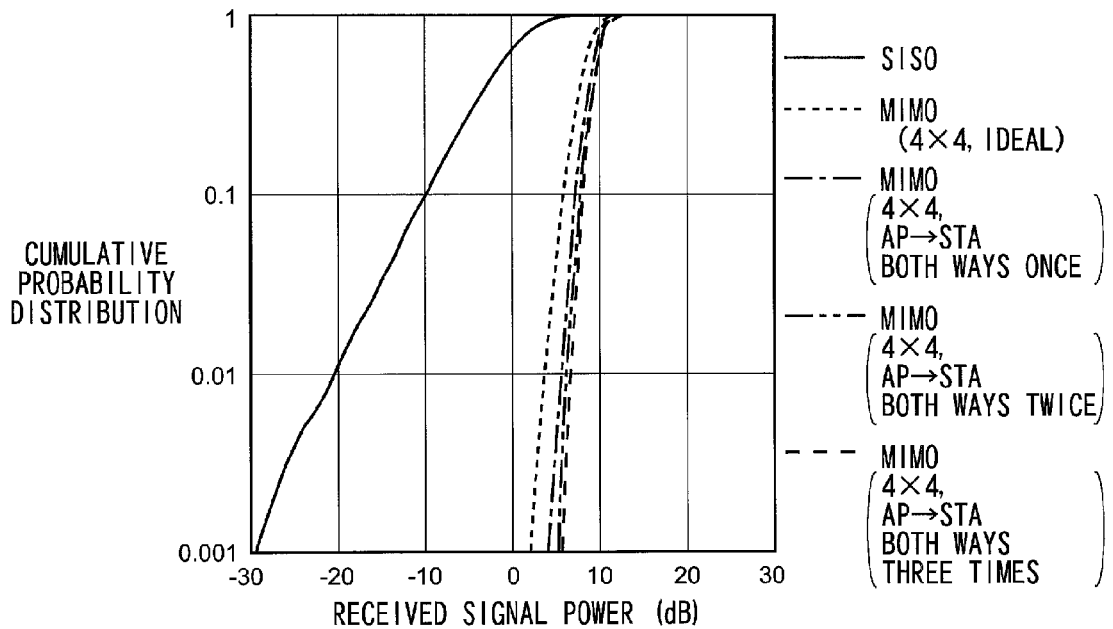
FIG. 31 is a view showing the number of training-signal-transfer times and an improvement in reception level distribution when the side of the base station performs a first training signal transfer.

FIG. 31 shows the number of training-signal-transfer times and an improvement in reception level distribution when the side of the base station (AP) performs a first training signal transfer in a case in which optimum diversity combining information cannot be obtained in a wireless communication device disposed on the side of the base station (AP) whereas optimum diversity combining information can be obtained in a wireless communication device disposed on the side of the terminal (STA). It is understood that, when the number of training-signal-transfer times is 1, i.e., when the to-and-from transfer of a training signal is performed once, a deterioration of about 4 dB occurs in comparison with an optimum eigenbeam transfer, and, when the training signal transfer is performed four times, a substantially optimal eigenbeam transfer can be realized.

Figure 32:
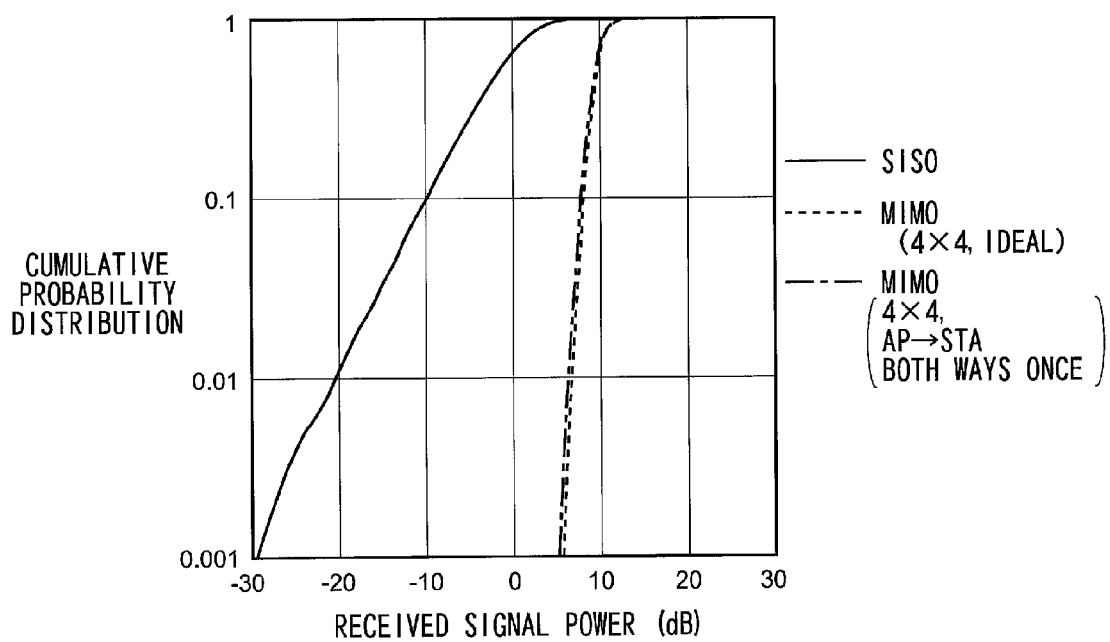
FIG. 32 is a view showing the number of training-signal-transfer times and an improvement in reception level distribution when the side of the terminal performs a first training signal transfer.

FIG. 32 shows the number of training-signal-transfer times and an improvement in reception level distribution when the side of the terminal (STA) performs a first training signal transfer. In this case, it is understood that a substantially optimal eigenbeam transfer can be realized when the number of training-signal-transfer times is 1, i.e., when the to-and-from transfer of a training signal is performed once.

In other words, in the present invention, if a wireless communication device that is obtaining optimum diversity combining information, e.g., the side of the terminal (STA) is allowed to perform a first training signal transfer, a substantially optimal eigenbeam transfer can be realized by the single to-and-from transfer of a training signal. Therefore, according to the present invention, a substantially optimal eigenbeam transfer can be realized by a training signal transfer performed in an extremely short time, and therefore the communication area can be greatly widened even in a high-speed multipath fading environment.

In the present invention, an eigenbeam transfer responding to a maximum eigenvalue can be performed and can be realized by RF band processing merely by optimizing the receiving state of a signal obtained by synthesizing received signals emitted from a plurality of antennas in a training signal transfer without calculating information relative to a transmission line matrix. On the other hand, in a generally-performed eigenbeam transfer, the receiving side has a receiver for each antenna, and received signals are synthesized together by baseband processing. Therefore, each antenna does not have a satisfactorily high reception level, and hence there is a case in which burst detection cannot be performed, i.e., the arrival of received signals cannot be detected in the periphery of a communication area.

Figure 33:
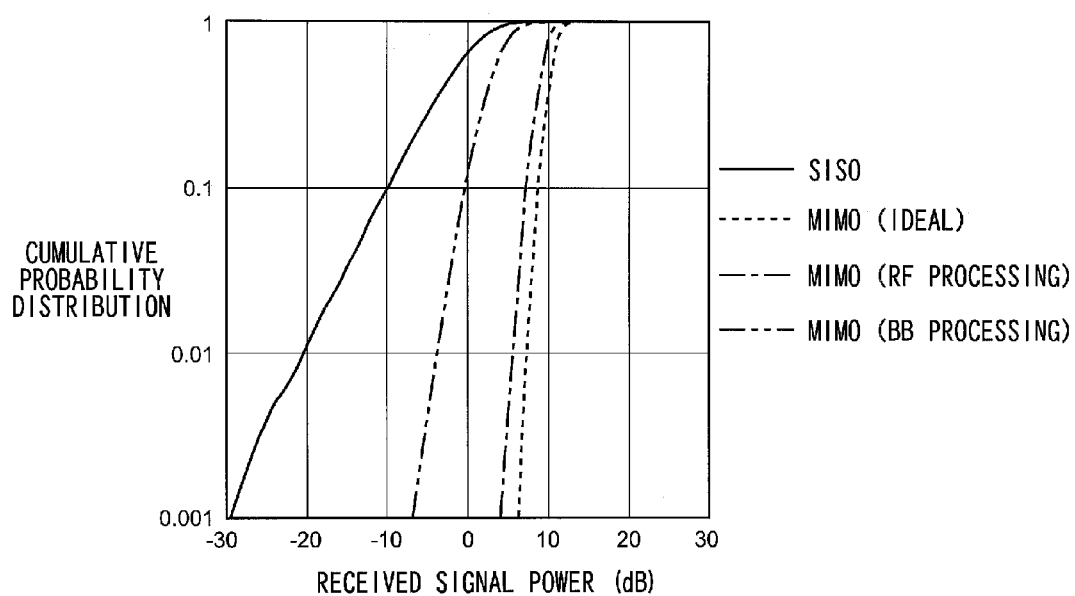
FIG. 33 is a view showing a comparison of an improvement in the reception level in the burst detection between a case in which received signals are combined together by baseband processing and a case in which received signals are combined together by RF band processing.

FIG. 33 shows a comparison of an improvement in the reception level in burst detection between a case in which received signals are synthesized together by baseband processing as in a generally-performed eigenbeam transfer and a case in which received signals are synthesized together by RF band processing.

In an eigenbeam transfer in baseband processing, an improvement in the reception level in burst detection undergoes a deterioration of about 12 dB in comparison with an ideal MIMO transfer. On the other hand, when the present invention is embodied by RF band processing, the deterioration is about 2 dB worse than such an ideal MIMO transfer. This 2-dB deterioration results from the fact that complex weight processing is performed by the use of a phase shifter. As described above, in the method or device for realizing an eigenbeam transfer through conventional baseband processing, a large MIMO gain can be obtained in an area in which burst detection can be performed, and, accordingly, a high-speed transfer can be performed by use of, for example, multivalued QAM. However, the communication area itself is limited to an area in which burst detection can be performed, and therefore the improvement amount in the communication area becomes smaller by about 12 dB than the MIMO gain. On the other hand, when the present invention is embodied by RF band processing, the improvement amount in the communication area is equal to the MIMO gain. In other words, according to the present invention, a great improvement by the MIMO gain in the communication area can be achieved.

Although the embodiment has been described as above, the present invention is not limited to the above-mentioned embodiment, and can be modified variously. For example, the multiplier of the weight processing unit is not limited to a 1-bit phase shifter, and may be a device that performs a weighting operation when diversity combining is performed, and therefore, for example, a 2-bit phase shifter can be used. If the 2-bit phase shifter is used, phase shifting or a complex weight with respect to a signal of each antenna can be given while being changed in a four-fold manner by use of diversity combining information "00," "01," "10," and "11," and therefore more detailed diversity control can be performed.

Additionally, the training signal is used to measure reception level information, and any type of training signal can be used as long as the training signal can measure reception level information obtained when diversity reception is performed. For example, only a preamble in a header of a data frame or a plurality of symbols contained in an extended preamble can be used as the training signal, and these signals are not necessarily required to be specially prepared for training. However, the situation of a transmission line is regarded as being substantially constant during training, and therefore it is preferable to set its time length at a shorter length. If a plurality of symbols are used as the training signal, the value optimum of diversity combining information with respect to a signal of each antenna can be determined by (the number of antennas of the own wireless communication device+1) symbols at the shortest. Additionally, reception level information can be obtained at a stage when an RF training signal is allowed to undergo frequency conversion into an IF signal.

Figure 34:
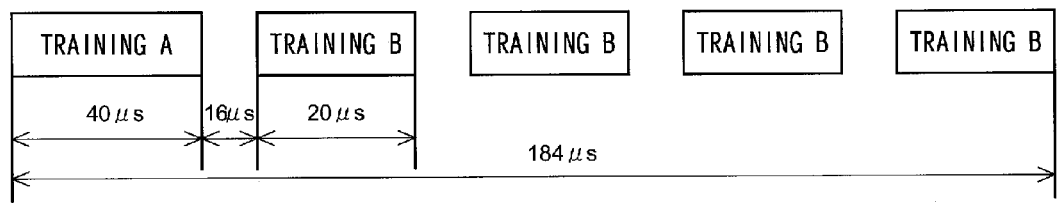
FIG. 34 is a view showing a training sequence for antenna selection of IEEE 802.11n.
Figure 35:
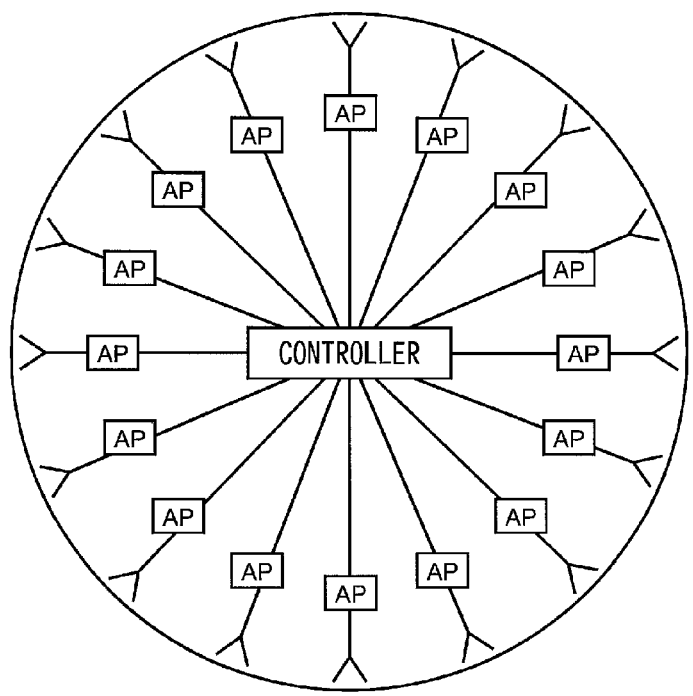
FIG. 35 is a block diagram showing a structure of a wireless base station according to conventional technology.
Figure 36:
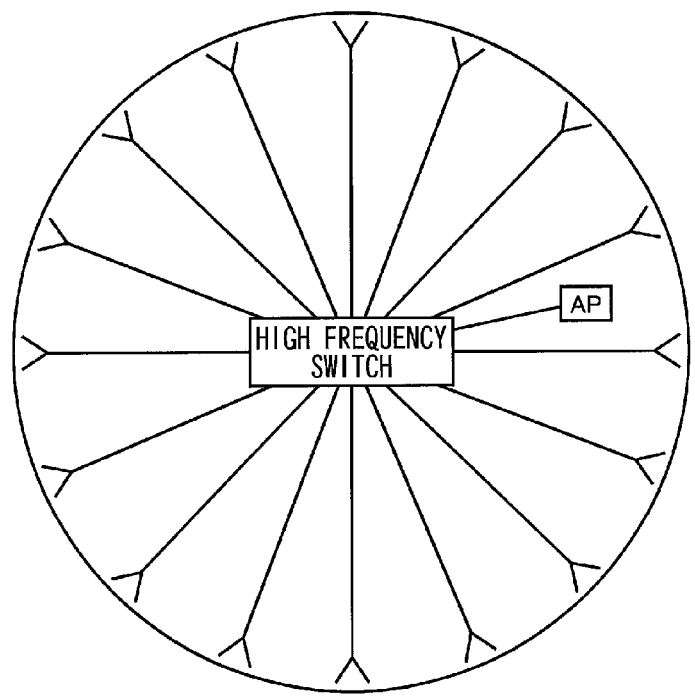
FIG. 36 is a block diagram showing another structure of the wireless base station according to the conventional technology.
Figure 37:
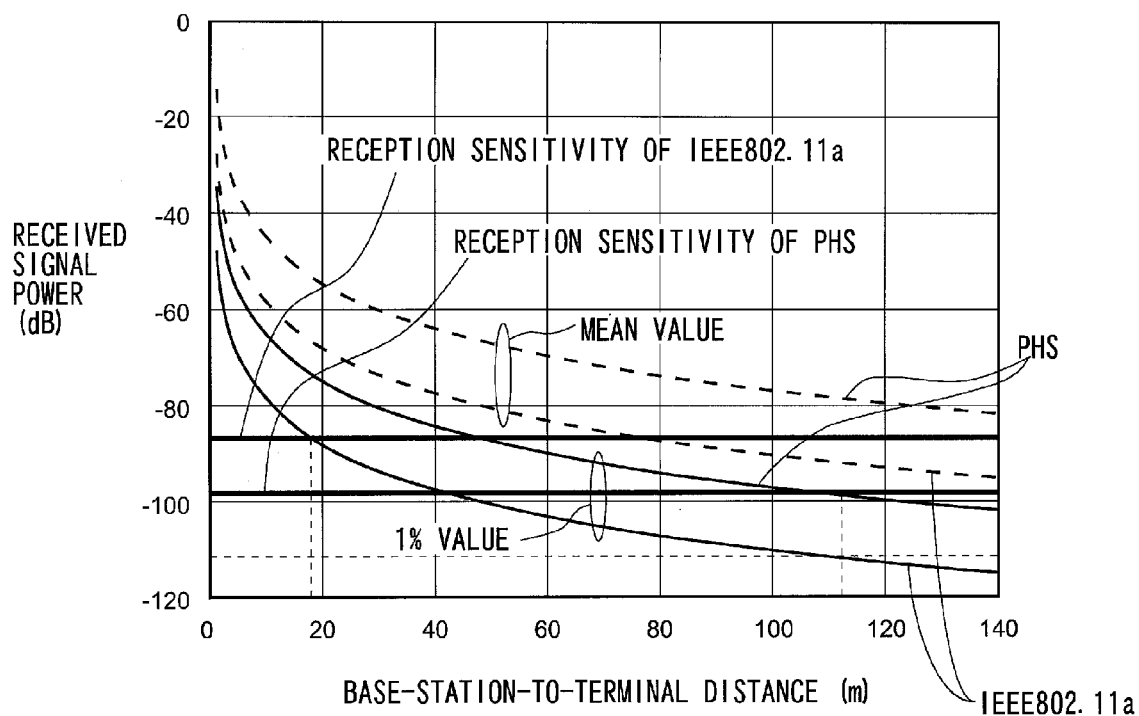
FIG. 37 is a view showing a relationship between a wireless-base-station-to-wireless-terminal distance and received signal power in the IEEE 802.11a system and the PHS system and the reception sensitivity of each system.

FIG. 34 shows a training sequence for IEEE 802.11n antenna selection. The time length of this training sequence is 184 μs. The multipath fading frequency is 100 Hz at most during a high-speed movement, and the situation of the transmission line can be regarded as being substantially constant during a period of 184 μs, and therefore this training sequence can be used in the training of the present invention. Of course, the present invention is not limited to this.

Additionally, M frames with respect to M antennas are not required to be placed in a single training sequence. For example, if the number of receiving antennas is four, process steps can be carried out such that two antennas are optimized in one training sequence, and another antenna is optimized in a subsequent training sequence, and the remaining antenna is optimized in a still subsequent training sequence.

Additionally, if an ACK with respect to each frame of a training signal is returned from an opposite wireless communication device disposed on an opposite side of a communication link, training counter information can also be obtained by detecting the ACK.

The present invention can be used in, for example, vehicle-vehicle communication or vehicle-pedestrian communication. However, without being limited to this, the present invention can be applied to other uses, such as a portable terminal for wireless communication. Additionally, the present invention is not necessarily limited to mobile communication as its applicability, and can be applied to an arbitrary wireless communication system of the autonomous distributed type that employs a multiple access scheme.

REFERENCE SIGNS LIST 10,20 . . . diversity circuit, 11,21 . . . weight processing unit, 12,22 . . . RF signal distributing/synthesizing unit, 13, 23 . . . transmitting/receiving circuit, 31 . . . baseband modulating unit, 32 . . . training signal generating unit, 33 . . . signal synthesizing unit, 34 . . . wireless transmitting unit, 35 . . . duplexer, 36 . . . wireless receiving unit, 37 . . . transmission/reception switching unit, 38 . . . beamforming weight generating unit, 39 . . . baseband demodulating unit, 40,45 . . . reception level information holding unit, 41 . . . reception level information comparing unit, 42 . . . maximum reception level holding unit, 43 . . . training reception information holding unit, 44 . . . baseband received IQ signal holding unit, 46 . . . optimum weight determining unit, 50 . . . phase shifter control unit, 51 . . . non-beamforming state weight generating unit, 52 . . . beamforming state weight generating unit, 53 . . . weight selecting unit, 60 . . . timing unit, 61 . . . frame reception detecting unit, 62 . . . frame end detecting unit, 63 . . . sequence end detecting unit, 64 . . . training counting unit, 65 . . . beamforming valid flag generating unit, 66 . . .

optimum weight updating signal generating unit, A, B . . . wireless communication device, $A_1, A_2, \ldots, A_M, B_1, B_2, \ldots, B_N \ldots$ antenna

The invention claimed is:

1. A multi-antenna wireless communication method in which a plurality of antennas for transmission and a plurality of antennas for reception are used and in which wireless communication is performed with MIMO (Multiple Input Multiple Output) technology, the multi-antenna wireless communication method comprising:
 a first step of determining diversity combining information with respect to each signal of the plurality of antennas that optimizes a diversity reception state as a value optimum thereof in each wireless communication device through two-way training signal transfer between the wireless communication devices that perform transmission and reception;
 a second step of setting the value optimum of each diversity combining information determined by the first step for each wireless communication device; and
 a third step of enabling each wireless communication device to perform beamforming and diversity combining for a time of data transmission/reception in a state in which the value optimum of each diversity combining information has been set by the second step; wherein
 in the first step, in each diversity reception in a plurality of times two-way training signal transfer, diversity combining information that optimizes a diversity reception state is obtained based on training reception information showing a receiving state of a diversity-combining received signal, thereafter diversity combining information is updated by the resulting diversity combining information after diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between a couple of wireless communication devices that perform transmission and reception as the value optimum of diversity combining information with respect to the couple of wireless communication devices.

2. A multi-antenna wireless communication device used to perform the multi-antenna wireless communication method of claim 1, the multi-antenna wireless communication device comprising:
 a diversity combining information generating unit for generating diversity combining information with respect to each signal of the plurality of antennas;
 a diversity combining information setting unit that controls an amplitude and a phase of a signal of each of the plurality of antennas based on the diversity combining information generated by the diversity combining information generating unit; and
 a signal distributing/synthesizing unit that performs beamforming transmission and diversity reception in combination with the diversity combining information setting unit; wherein
 the diversity combining information generating unit comprises:
 a for-initial-acquisition diversity combining information generating unit for generating diversity combining information for initial acquisition with respect to each of the plurality of antennas and enabling drawing from an initial state to a value optimum of diversity combining information; and
 a for-training diversity combining information generating unit for sequentially changing and generating diversity combining information with respect to each signal of the plurality of antennas during diversity reception in two-way training signal transfer between an opposite wireless communication device disposed on an opposite side of a communication link and a wireless communication device corresponding to this opposite wireless communication device;
 a diversity combining information value optimum generating unit for determining diversity combining information that optimizes a receiving state of a diversity-combining received signal based on training reception information showing a receiving state of a training signal received in a diversity reception manner in a state in which each of diversity combining information generated by the training diversity combining information generating unit has been set and for generating a value optimum of diversity combining information used for beamforming and diversity combining for a time of data transmission/reception; wherein
 in each diversity reception in a plurality of times two-way training signal transfer, diversity combining information that optimizes a diversity reception state is obtained based on training reception information showing a receiving state of a training signal received in a diversity reception manner in a state in which each piece of diversity combining information generated by the diversity combining information generating unit has been set, thereafter diversity combining information with respect to a signal of the antenna is updated by the diversity combining information after diversity reception, thereafter the diversity combining information updated thereby is set, and a training signal is transmitted, thereby generating a set of vectors asymptotically approaching to a set of eigenvectors with respect to a maximum eigenvalue of a correlation matrix of a channel matrix in a transfer between a couple of wireless communication devices that perform transmission and reception as the value optimum of diversity combining information with respect to the couple of wireless communication devices.

3. The multi-antenna wireless communication device of claim 2, wherein the training reception information is correlation information between a diversity-combining received signal and a predetermined information sequence or both the correlation information and reception level information.

4. The multi-antenna wireless communication device of claim 2, wherein
 if a value optimum of the diversity combining information has been set through an immediately previous two-way training signal transfer, the diversity combining information value optimum generating unit newly generates a value optimum of diversity combining information while using this value optimum of the diversity combining information as an initial value, and, if a value optimum of the diversity combining information has not been set, the diversity combining information value optimum generating unit newly generates a value optimum of a diversity combining information while using a random initial value.

5. The multi-antenna wireless communication device disposed on a side of a terminal of claim 2, wherein
 a first training sub-signal is transmitted in an immediately previous two-way training signal transfer to perform beamforming and diversity combining in data transmission/reception to/from the wireless communication device disposed on a side of a base station.

6. The multi-antenna wireless communication device disposed on a side of a base station of claim 2, wherein
in the diversity combining information generating unit, the diversity combining information is newly determined while always using a random initial value in a case in which a two-way training signal transfer has been performed immediately before and in a case in which a two-way training signal transfer has not been performed immediately before.

7. The multi-antenna wireless communication device of claim 2, wherein
in transmission of broadcast frames or multicast frames from the wireless communication device disposed on the side of the base station that performs wireless communication with a plurality of wireless communication devices, a same frame is transmitted a plurality of times by using a plurality of pieces of diversity combining information that differ from each other.

8. The multi-antenna wireless communication device of claim 2, wherein
in transmission of broadcast frames or multicast frames from the wireless communication device disposed on the side of the base station that performs wireless communication with a plurality of wireless communication devices, each of the broadcast frames or each of the multicast frames is transmitted to each of the plurality of wireless communication devices by use of a value optimum of the diversity combining information obtained through a two-way training signal transfer.

9. The multi-antenna wireless communication device of claim 2, wherein
in the wireless communication device disposed on a base station that performs wireless communication with a plurality of wireless communication device, a diversity combining information value optimum storing unit is provided for storing a value optimum of the diversity combining information obtained through a two-way training signal transfer, for each wireless communication device disposed on the side of the terminal that performs wireless communication with the base station, and, before data transmission/reception to and from a terminal-side wireless communication device disposed on a side of a terminal, a value optimum of the diversity combining information with respect to this terminal-side wireless communication device, that is held by the diversity combining information value optimum storing unit, is set by the diversity combining information setting unit.

10. The multi-antenna wireless communication device of claim 2, wherein
the diversity combining information setting unit and the signal distributing/synthesizing unit operate in an RF band, and multi-antenna beamforming transmission and multi-antenna diversity reception are performed by use of a single transmission/reception system.

11. A multi-antenna wireless communication method in which a plurality of antennas for transmission and a plurality of antennas for reception are used and in which wireless communication is performed with MIMO (Multiple Input Multiple Output) technology, the multi-antenna wireless communication method comprising:
a first step of determining diversity combining information with respect to each signal of the plurality of antennas that optimizes a diversity reception state as a value optimum thereof in each wireless communication device through two-way training signal transfer between the wireless communication devices that perform transmission and reception;
a second step of setting the value optimum of each diversity combining information determined by the first step for each wireless communication device; and
a third step of enabling each wireless communication device to perform beamforming and diversity combining for a time of data transmission/reception in a state in which the value optimum of each diversity combining information has been set by the second step; wherein
the training signal is composed of a plurality of training sub-signals, and, in the first step, in diversity reception of the training sub-signals, one piece of diversity combining information with respect to each signal of the antennas of the wireless communication devices is sequentially changed, thereafter diversity combining information with respect to a signal of the antenna is updated by diversity combining information having a more excellent receiving state of a diversity-combining received signal before and after a sequential changing operation of the diversity combining information, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between a couple of wireless communication devices that perform transmission and reception as the value optimum of diversity combining information with respect to the couple of wireless communication devices.

12. A multi-antenna wireless communication device used to perform the multi-antenna wireless communication method of claim 11, the multi-antenna wireless communication device comprising:
a diversity combining information generating unit for generating diversity combining information with respect to each signal of the plurality of antennas;
a diversity combining information setting unit that controls an amplitude and a phase of a signal of each of the plurality of antennas based on the diversity combining information generated by the diversity combining information generating unit; and
a signal distributing/synthesizing unit that performs beamforming transmission and diversity reception in combination with the diversity combining information setting unit; wherein
the diversity combining information generating unit comprises:
a for-initial-acquisition diversity combining information generating unit for generating diversity combining information for initial acquisition with respect to each of the plurality of antennas and enabling drawing from an initial state to a value optimum of diversity combining information;
a for-training diversity combining information generating unit for sequentially changing and generating diversity combining information with respect to each signal of the plurality of antennas during diversity reception in a plurality of times two-way training signal transfer between an opposite wireless communication device disposed on an opposite side of a communication link and a wireless communication device corresponding to this opposite wireless communication device;
a reception-state determining unit that determines a diversity reception state in each setting based on training reception information showing a receiving state of a training signal received in a diversity reception manner in a state in which each piece of diversity combining information generated by the diversity combining information generating unit has been set; and a diversity combining information value optimum generating unit for determining diversity combining information that optimizes a diversity reception state determined by the reception-state determining unit as a value optimum of the diversity combining information and for generating a value optimum of diversity combining information used for beamforming and diversity combining at a time of data transmission/reception; wherein the training signal is composed of a plurality of training sub-signals, and, in diversity reception of the training sub-signals, one piece of diversity combining information with respect to each signal of the antennas of the wireless communication devices is sequentially changed, and thereafter diversity combining information with respect to a signal of the antenna is updated by diversity combining information having a more excellent receiving state of a diversity-combining received signal before and after a sequential changing operation of the diversity combining information, thereafter the diversity combining information updated thereby is set, and a training signal is transmitted, thereby generating a set of vectors asymptotically approaching to a set of eigenvectors with respect to a maximum eigenvalue of a correlation matrix of a channel matrix in a transfer between a couple of wireless communication devices that perform transmission and reception as the value optimum of diversity combining information with respect to the couple of wireless communication devices.

13. The multi-antenna wireless communication device of claim 12, wherein the diversity combining information is 1-bit information, and the diversity combining information generating unit generates diversity combining information with respect to a signal of each of the plurality of antennas while sequentially subjecting the diversity combining information to phase inversion, and the reception-state determining unit makes a comparison between reception level information as the training reception information obtained before and after performing the phase inversion, and determines a diversity reception state from this comparison, and the diversity combining information value optimum generating unit generates a value optimum of the diversity combining information in the antenna based on the diversity reception state determined by the reception-state determining unit.

14. The multi-antenna wireless communication device of claim 12, wherein the reception-state determining unit determines a diversity reception state while using a diversity-combining received signal level or a gain of an AGC amplifier as an indicator.

15. The multi-antenna wireless communication device of claim 12, wherein the training signal contains a plurality of frames or symbols as the training sub-signals, and the reception-state determining unit determines a diversity reception state while using an amplitude of a baseband IQ signal or an IF signal of each frame or each symbol as an indicator.

16. A multi-antenna wireless communication method in which a plurality of antennas for transmission and a plurality of antennas for reception are used and in which wireless communication is performed with MIMO (Multiple Input Multiple Output) technology, the multi-antenna wireless communication method comprising:

a first step of determining diversity combining information with respect to each signal of the plurality of antennas that optimizes a diversity reception state as a value optimum thereof in each wireless communication device through plurality of times two-way training signal transfer between the wireless communication devices that perform transmission and reception;

a second step of setting the value optimum of each diversity combining information determined by the first step for each wireless communication device; and a third step of enabling each wireless communication device to perform beamforming and diversity combining for a time of data transmission/reception in a state in which the value optimum of each diversity combining information has been set by the second step; wherein the training signal is composed of a plurality of training sub-signals, and, in the first step, in diversity reception of the plurality of training sub-signals, diversity combining information with respect to each signal of the antennas of the wireless communication devices are sequentially changed, thereafter diversity combining information that optimizes a receiving state of a diversity-combining received signal is determined based on training reception information showing a receiving state corresponding to each of the diversity combining information, thereafter diversity combining information is updated by the resulting diversity combining information after diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between a couple of wireless communication devices that perform transmission and reception as the value optimum of diversity combining information with respect to the couple of wireless communication devices.

17. A multi-antenna wireless communication device used to perform the multi-antenna wireless communication method of claim 16, the multi-antenna wireless communication device comprising:

a diversity combining information generating unit for generating diversity combining information with respect to each signal of the plurality of antennas;

a diversity combining information setting unit that controls an amplitude and a phase of a signal of each of the plurality of antennas based on the diversity combining information generated by the diversity combining information generating unit; and a signal distributing/synthesizing unit that performs beamforming transmission and diversity reception in combination with the diversity combining information setting unit; wherein the diversity combining information generating unit comprises:

a for-initial-acquisition diversity combining information generating unit for generating diversity combining information for initial acquisition with respect to each of the plurality of antennas and enabling drawing from an initial state to a value optimum of diversity combining information;

a for-training diversity combining information generating unit for sequentially changing and generating diversity combining information with respect to each signal of the plurality of antennas during diversity reception in a plurality of times two-way training signal transfer between an opposite wireless communication device disposed on an opposite side of a communication link and a wireless communication device corresponding to this opposite wireless communication device;

a training receiving state holding unit that holds training reception information showing a receiving state of a training signal received in a diversity reception manner in a state in which each piece of diversity combining information generated by the diversity combining information generating unit has been set; and a diversity combining information value optimum generating unit for determining diversity combining information that optimizes a diversity reception state based on the training reception information held by the training receiving state holding unit as a value optimum of the diversity combining information and for generating a value optimum of diversity combining information used for beamforming and diversity combining at a time of data transmission/reception; wherein the training signal is composed of a plurality of training sub-signals, and, in diversity reception of the training sub-signals, diversity combining information with respect to each signal of the plurality of antennas of the wireless communication devices is sequentially changed, thereafter training reception information corresponding to each piece of diversity combining information is stored in the training reception information holding unit, thereafter diversity combining information that optimizes a receiving state of a diversity-combining received signal is determined based on information held in the training reception information holding unit, thereafter diversity combining information with respect to a signal of the antenna is updated by the diversity combining information, thereafter the diversity combining information updated thereby is set, and a training signal is transmitted, thereby generating a set of vectors asymptotically approaching to a set of eigenvectors with respect to a maximum eigenvalue of a correlation matrix of a channel matrix in a transfer between a couple of wireless communication devices that perform transmission and reception as the value optimum of diversity combining information with respect to the couple of wireless communication devices.

18. The multi-antenna wireless communication device of claim 17, wherein the diversity combining information is n-bit information (n is a natural number of 2 or greater), and the diversity combining information generating unit generates diversity combining information with respect to a signal of each of the plurality of antennas while sequentially subjecting the diversity combining information to phase inversion, and the training receiving state holding unit holds baseband reception IQ information or both the baseband reception IQ information and reception level information as the information showing receiving state obtained before and after performing the phase inversion, and the diversity combining information value optimum generating unit generates a value optimum of the diversity combining information in the antenna based on the information held by the training receiving state holding unit.

19. A multi-antenna wireless communication method in which a plurality of antennas for transmission and a plurality of antennas for reception are used and in which wireless communication is performed with MIMO (Multiple Input Multiple Output) technology, the multi-antenna wireless communication method comprising:

a first step of determining diversity combining information with respect to each signal of the plurality of antennas that optimizes a diversity reception state as a value optimum thereof in each wireless communication device through a plurality of times training signal transfer between the wireless communication devices that perform transmission and reception;

a second step of setting the value optimum of each diversity combining information determined by the first step for each wireless communication device; and a third step of enabling each wireless communication device to perform beamforming and diversity combining for a time of data transmission/reception in a state in which the value optimum of each diversity combining information has been set by the second step; wherein the training signal is composed of a plurality of training sub-signals, and, in the first step, in each diversity reception in a plurality of times two-way training sub-signal, diversity combining information with respect to each signal of the antennas of the wireless communication devices is sequentially changed, thereafter diversity combining information that optimizes a receiving state of a diversity-combining received signal is determined based on training reception information showing a receiving state corresponding to each of diversity combining information, thereafter diversity combining information is updated by diversity-reception combining weight information after each diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between a couple of wireless communication devices that perform transmission and reception as the value optimum of diversity combining information with respect to the couple of wireless communication devices.

20. A multi-antenna wireless communication device used to perform the multi-antenna wireless communication method of claim 19, the multi-antenna wireless communication device comprising:

a diversity combining information generating unit for generating diversity combining information with respect to each signal of the plurality of antennas;

a diversity combining information setting unit that controls an amplitude and a phase of a signal of each of the plurality of antennas based on the diversity combining information generated by the diversity combining information generating unit; and a signal distributing/synthesizing unit that performs beamforming transmission and diversity reception in combination with the diversity combining information setting unit; wherein the diversity combining information generating unit comprises:

a for-initial-acquisition diversity combining information generating unit for generating diversity combining information for initial acquisition with respect to each of the plurality of antennas and enabling drawing from an initial state to a value optimum of diversity combining information;

a for-training diversity combining information generating unit for sequentially changing and generating diversity combining information with respect to each signal of the plurality of antennas during diversity reception in a plurality of times two-way training signal transfer between an opposite wireless communication device disposed on an opposite side of a communication link and a wireless communication device corresponding to this opposite wireless communication device;

a training reception information holding unit for holding training reception information showing a receiving state of a training signal received in a diversity reception manner in a state in which each piece of diversity combining information generated by the diversity combining information generating unit has been set; and a diversity combining information value optimum generating unit for determining combining weight information that optimizes a receiving state of a diversity-combining received signal based on training reception information held by the training reception information holding unit as a value optimum of diversity combining information and for generating a value optimum of diversity combining information used for beamforming and diversity combining for a time of data transmission/reception; wherein the training signal is composed of a plurality of training sub-signals, in each diversity reception in a plurality of times two-way training signal transfer, pieces of diversity combining information with respect to each signal of the plurality of antennas of the wireless communication devices are sequentially changed, thereafter training reception information corresponding to each piece of diversity combining information is stored in the training reception information holding unit, thereafter combining weight information that optimizes a receiving state of a diversity-combining received signal is determined based on information held by the training reception information holding unit, thereafter diversity combining information is updated by diversity-reception combining weight information after each diversity reception, thereafter the diversity combining information updated thereby is set, and a training signal is transmitted, thereby generating a set of vectors asymptotically approaching to a set of eigenvectors with respect to a maximum eigenvalue of a correlation matrix of a channel matrix in a transfer between a couple of wireless communication devices that perform transmission and reception as the value optimum of diversity combining information with respect to the couple of wireless communication devices.

* * * * *